United States Patent
Katayama et al.

(10) Patent No.: US 8,647,741 B2
(45) Date of Patent: Feb. 11, 2014

(54) POLYPROPYLENE FIBER, METHOD OF PRODUCING THE SAME AND UTILIZATION OF THE SAME

(75) Inventors: Takashi Katayama, Kurashiki (JP); Yoshihiro Iwasaki, Okayama (JP); Masakazu Nishiyama, Kurashiki (JP)

(73) Assignee: Kuraray Co., Ltd., Kurashiki-shi (JP)

(*) Notice: Subject to any disclaimer, the term of this patent is extended or adjusted under 35 U.S.C. 154(b) by 594 days.

(21) Appl. No.: 12/532,898

(22) PCT Filed: Mar. 24, 2008

(86) PCT No.: PCT/JP2008/055370
§ 371 (c)(1),
(2), (4) Date: Feb. 19, 2010

(87) PCT Pub. No.: WO2008/123173
PCT Pub. Date: Oct. 16, 2008

(65) Prior Publication Data
US 2010/0173547 A1    Jul. 8, 2010

(30) Foreign Application Priority Data

Mar. 26, 2007  (JP) ................. 2007-078738
Mar. 27, 2007  (JP) ................. 2007-080699
May 25, 2007   (JP) ................. 2007-139453
Sep. 10, 2007  (JP) ................. 2007-234212
Sep. 25, 2007  (JP) ................. 2007-247137
Nov. 27, 2007  (JP) ................. 2007-305859
Dec. 6, 2007   (JP) ................. 2007-315587

(51) Int. Cl.
*D02G 3/00* (2006.01)

(52) U.S. Cl.
USPC ......... 428/364; 264/210.8; 428/357; 428/399

(58) Field of Classification Search
USPC .......... 428/367, 399, 364, 357; 442/193, 195, 442/309, 336, 337
See application file for complete search history.

(56) References Cited

U.S. PATENT DOCUMENTS 6,270,892 B1    8/2001  Park et al.
2006/0194100 A1*  8/2006  Tanaka et al. .............. 429/142

FOREIGN PATENT DOCUMENTS

JP    56 9268    1/1981
JP    61 301     1/1986
(Continued)

OTHER PUBLICATIONS

English translation of JP 3799202 B2 Original Japanese Language Document, Jul. 19, 2006.*

*Primary Examiner* — Lynda Salvatore
(74) *Attorney, Agent, or Firm* — Oblon, Spivak, McClelland, Maier & Neustadt, L.L.P.

(57) ABSTRACT

The present invention aims to provide a polypropylene fiber (PP fiber) excellent in strength, heat resistance, and water-absorption properties, a method of producing the same, and a hydraulic composition, a rope, a sheet-shaped fiber structure, and a composite material with an organic polymer each using the PP fiber. The present invention provides: a PP fiber having a fiber having a fiber strength of 7 cN/dtex or more and having either or both of (i) DSC properties such that the endothermic peak shape by DSC is a single shape having a half width of 10° C. or lower and the melt enthalpy change (ΔH) is 125 J/g and (ii) irregular properties such that the single fiber fineness is 0.i to 3 dtex and irregularities are formed on the surface.

40 Claims, 2 Drawing Sheets

(56) References Cited

FOREIGN PATENT DOCUMENTS

| | | |
|---|---|---|
| JP | 61 26510 | 6/1986 |
| JP | 4 41710 | 2/1992 |
| JP | 05 009810 | 1/1993 |
| JP | 06 057055 | 3/1994 |
| JP | 7 90785 | 4/1995 |
| JP | 11 116297 | 4/1999 |
| JP | 2000 144523 | 5/2000 |
| JP | 2000 169203 | 6/2000 |
| JP | 3130288 | 11/2000 |
| JP | 2001 020132 | 1/2001 |
| JP | 2002 20926 | 1/2002 |
| JP | 2002 105748 | 4/2002 |
| JP | 2002 266158 | 9/2002 |
| JP | 2002 302825 | 10/2002 |
| JP | 2003 293216 | 10/2003 |
| JP | 2004 018352 | 1/2004 |
| JP | 3799202 B2 * | 7/2006 |
| WO | 2006 016499 | 2/2006 |

* cited by examiner

POLYPROPYLENE FIBER, METHOD OF PRODUCING THE SAME AND UTILIZATION OF THE SAME

This application is a 371 of PCT/JP2008/055370 filed Mar. 24, 2008.

TECHNICAL FIELD

The present invention relates to a polypropylene fiber which is excellent in strength, heat resistance, and water retentivity, method of producing the polypropylene fiber, a hydraulic composition, a hydraulic product, a rope structure, a sheet-shaped fiber structure, a composite material, and molded product using the polypropylene fiber.

BACKGROUND OF THE INVENTION

The polypropylene fiber is widely used for various applications because the polypropylene fiber is excellent in properties such as chemical resistance and lightweight property, can be readily melt, is excellent in recycling efficiency, can be readily subjected to incineration disposal while generating no harmful gas such as halogen gas even when the polypropylene fiber is incinerated, and the like. However, the heat resistance of the polypropylene fiber is not sufficiently high among synthetic fibers, and therefore improvement in the heat resistance has been demanded.

For example, as a sheet excellent in recycling efficiency and strength, a polyolefin sheet which has been reinforced with a polypropylene fiber is known. In production of the fiber-reinforced sheet, it is necessary to melt polyolefin at a temperature as high as possible for adhesion of a polyolefin sheet base and the polypropylene fiber from the viewpoints of improvement in productivity, adhesiveness between the polypropylene fiber and the polyolefin sheet base, and the like. However, due to poor heat resistance of the polypropylene fiber, the polyolefin cannot be melt at a high temperature to be formed into a sheet at the time of producing the fiber-reinforced sheet. Therefore, the production rate cannot be increased, and moreover, the adhesion between the polypropylene fiber and the polyolefin sheet is insufficient, resulting in reduced productivity, insufficient strength of a fiber-reinforced polyolefin sheet to be obtained, etc.

Moreover, a fabric formed of the polypropylene fiber is used as a filter. Because the filter is sometimes used in a high temperature environment, the improvement in the heat resistance of the polypropylene fiber has been demanded.

As a conventional technology aiming at the improvement in the heat resistance of the polypropylene fiber, a polypropylene fiber having a heat shrinkage rate at 170° C. for 10 minutes of 10% or lower and a melt peak temperature of 178° C. or higher is known. The polypropylene fiber is obtained by melting and molding a homopolypropylene resin having an isotactic pentad fraction of 96% or more and lower than 98.5% and a melt flow rate (230° C., load of 2.16 kg) of 0.1 to 30 g/10 minutes, and then drawing the resultant (see Patent Document 1).

However, the endothermic peak shape of the polypropylene fiber is a broad double shape or a single shape and the crystals thereof are not uniform. Thus, the heat resistance thereof is not yet sufficiently high.

As another conventional technology, a polypropylene fiber having two DSC endothermic peaks at 155 to 170° C. is known which is obtained by subjecting a polypropylene homopolymer having an isotactic index of 90 to 99% to melt spinning or subjecting the polypropylene homopolymer to melt spinning, and then to drawing (see Patent Document 2).

However, in the polypropylene fiber, the endothermic peak at a lower temperature among the two DSC endothermic peaks serves as an index of the heat resistance of the polypropylene fiber, the endothermic peak shape is broad, and the crystals thereof are not uniform. Therefore, the heat resistance thereof is not sufficient.

Moreover, the polypropylene fiber is a widely used synthetic fiber applied to various industrial materials, and the hydrophobicity poses a problem in many applications. For example, in the applications such as paper and a nonwoven fabric, a fiber as a main component has been required to have a high hydrophilicity in many cases. Moreover, a fiber used as a reinforcement material for various matrix materials has been required to have hydrophilicity from the viewpoints of uniform dispersibility in a matrix, adhesion strength to the matrix, and the like. However, because the polypropylene fiber is hydrophobic and has a poor hydrophilicity, the polypropylene fiber, as it is, is hard to apply to paper, a nonwoven fabric, a reinforcement material, etc., which require hydrophilicity.

Thus, technologies aiming at the improvement in the hydrophilicity and water retentivity of the polypropylene fiber have been conventionally proposed. For example, it is known to produce a water absorbing polypropylene fiber by subjecting, to melt spinning, polypropylene in which a water absorbing resin in the form of particles is uniformly dispersed in a resin using polyethylene wax (Patent Document 3). However, in the case of employing the method, polypropylene, to which particles have been added, is subjected to spinning and drawing, which makes it impossible to avoid influences on spinning property and drawing property. Thus, a polypropylene fiber having a sufficient strength cannot be obtained.

Moreover, it is known to produce a polypropylene fiber having irregularities on the surface by irradiating a polypropylene fiber with ionizing radiation, subjecting a polypropylene fiber to embossing and drawing, or subjecting a polypropylene fiber to melt spinning while changing the taking up speed of the polypropylene fiber, and then drawing the resultant (Documents 4 to 6). However, those methods are applied to a polypropylene fiber having a large fineness, i.e., a single fiber fineness as high as 50 to 100,000 denier, and are difficult to apply to a polypropylene fiber having a small fineness, i.e., a single fiber fineness of 10 dtex or smaller, because the fiber is seriously damaged.

In particular, Patent Document 4 describes a technology of obtaining a monofilament having a fineness of 50 to 50,000 denier, and particularly 3,000 to 12,000 denier, by performing irradiation with ionizing radiation before and after drawing. However, when the method is applied to a polypropylene fiber having a single fiber fineness of 10 dtex or lower, and particularly 3 dtex or lower, the strength is reduced, fluffs are frequently generated, unevenness in the form is noticeable, and there arise problems in the process passing property, quality, and grade.

Moreover, a polypropylene fiber having a single fiber strength of 9 cN/dtex or more and a striated rough-surfaced structure formed along the curved fiber surface is known. The polypropylene fiber is produced by drawing a polypropylene undrawn yarn at 125 to 155° C. in a hot air bath (Patent Document 7). However, in the polypropylene fiber, the intervals between the striated rough-surfaced structures that exist on the fiber surface and the height thereof are small. Therefore, the fiber does not have sufficient water retentivity and the compatibility with a matrix is insufficient.

Further, a method of producing a drawn yarn by drawing a polypropylene undrawn yarn in a single step using pressurized saturated steam of 3.0 to 5.0 kg/cm$^2$ (temperature: 133 to 151° C.) is known (Patent Document 8). However, in the polypropylene drawn yarn (polypropylene fiber) obtained by the method, the formation of irregularities on the fiber surface is insufficient, the intervals between the irregularities and the height thereof are small, the fiber does not have sufficient water retentivity, and the compatibility with a matrix is insufficient.

Moreover, a hydraulic product formed by hydration-curing (hereinafter sometimes referred to as "water curing") of a hydraulic composition containing hydraulic substances such as cement, gypsum, and water-granulated slag, has generally a low strength and is likely to develop cracks at the time of drying shrinkage.

Thus, a reinforcement fiber has been conventionally added to a hydraulic substance such as cement. As the reinforcement fiber for a hydraulic substance, asbestos has been conventionally used. However, asbestos is harmful to a human body and is not desirable in terms of safety and hygiene. Thus, the use thereof is being regulated now.

In recent years, various inorganic fibers and synthetic fibers are used as the reinforcement fiber for hydraulic substances in place of asbestos. As the synthetic fiber, a polypropylene fiber, a polyvinyl alcohol fiber, an acrylic fiber, etc., are mainly used. Of those, the polypropylene fiber is excellent in alkali resistance and impact resistance, is lightweight, and can be subjected to autoclave curing. Therefore, the consumed amount of the polypropylene fiber has been particularly increased in recent years.

It is known that when autoclave curing is performed at a higher temperature at the time of producing a hydraulic product from a hydraulic substance such as cement, the curing can be completed in a short time. In view of the above, when a reinforcement fiber having high heat resistance can be used, curing time is shortened, which saves a curing space. Further, because the turnover of jigs such as a mold is increased, autoclave curing at a higher temperature is advantageous for the production of the hydraulic product. Moreover, it is known that the autoclave curing temperature influences on the dimensional stability of the hydraulic product. When the curing temperature is higher, the dimensional stability of the hydraulic product to be obtained tends to increase.

However, at present, a polypropylene fiber for reinforcing a hydraulic substance which has a high heat resistance such that the fiber is resistant against autoclave curing, high strength, and excellent compatibility with a hydraulic substance such as cement, has not yet been obtained.

For example, Patent Document 1 mentioned above describes using, as a cement reinforcing material, a polypropylene fiber having a heat shrinkage rate at 170° C. for 10 minutes is 10% or lower and having a melt peak temperature of 178° C. or higher, which is obtained in Patent Document 1. However, in the polypropylene fiber obtained in Patent Document 1, the endothermic peak shape is a broad double shape or a broad single shape, the crystals thereof are not uniform, and the heat resistance is not yet sufficiently high as described above. Therefore, the polypropylene fiber of Patent Document 1 is not suitable for autoclave curing at a high temperature, particularly at a temperature exceeding 150° C., and more particularly at a temperature as high as 170° C. or higher. When the polypropylene fiber of Patent Document 1 is subjected to autoclave curing at a high temperature, the reduction in the strength, degradation, etc., of a polypropylene fiber are likely to occur.

The above-mentioned Patent Documents 4 to 6 describe using a polypropylene fiber obtained in these inventions, which has irregularities on the surface, for reinforcing a hydraulic substance. The polypropylene fibers described in Patent Documents 4 to 6 have a large fineness, i.e., a single fiber fineness of 50 to 100,000 denier. Thus, the compatibility of each of the polypropylene fibers with a hydraulic substance is likely to become insufficient, and moreover, in order to uniformly disperse the polypropylene fibers throughout a hydraulic substance for sufficient reinforcement, a large amount (large mass) of the polypropylene fibers needs to be blended. Moreover, when the methods of forming irregularities described in Patent Documents 4 to 6 are applied to a polypropylene fiber having a fine size, i.e., a single fiber fineness of 10 dtex or smaller, the fiber is remarkably damaged. Thus, it is actually difficult to apply the formation methods to the polypropylene fiber having a fine size.

Of those, the polypropylene fiber described in Document 4 has a large fineness and is difficult to exhibit sufficient reinforcement effects to a hydraulic substance.

Moreover, Patent Document 7 describes using a polypropylene fiber having a single fiber strength of 9 cN/dtex or more and a striated rough-surfaced structure formed along the curved fiber surface for reinforcing concrete. However, as described above, because the polypropylene fiber does not have sufficient water retentivity, the compatibility with a hydraulic substance is insufficient.

Further, the above-mentioned Patent Document 8 refers to a reinforcement fiber for cement as one of the applications of the polypropylene drawn yarn obtained in the invention of Patent Document 8. However, as described above, in the polypropylene drawn yarn (polypropylene fiber) obtained by the method of Patent Document 8, the formation of irregularities on the fiber surface is insufficient, the intervals between the irregularities and the height thereof are small, and the polypropylene fiber does not have sufficient water retentivity. Therefore, the compatibility with a hydraulic substance forming a matrix is insufficient.

A rope formed of a fiber has so many applications, for example, land/marine transportation, fishery, agriculture, and construction sites. As a fiber material for a rope formed of a fiber, both a natural fiber and a synthetic fiber are used. In recent years, a rope formed of a synthetic fiber is mainly used. As the rope formed of a synthetic fiber, a nylon fiber, a vinylon fiber, a polyester fiber, a polypropylene fiber, a polyethylene fiber, a polyvinyl chloride fiber, etc., are mentioned. Of those, a rope formed of a polypropylene fiber has advantages in that the rope formed of a polypropylene fiber is excellent in chemical resistance, lightweight property, etc., can be readily melt, is excellent in recycling efficiency, is subjected to incineration disposal while generating no harmful gas such as halogen gas even when the polypropylene fiber is incinerated, and the like. Therefore, various proposals on the rope formed of a polypropylene fiber, a method of producing a polypropylene fiber for use in the rope, etc., have been suggested (see Documents 9 and 10).

However, among synthetic fibers, a heat resistance of the polypropylene fiber is not high. Thus, the improvement in the heat resistance of a rope formed by using the polypropylene fiber has been demanded. This is because, when the rope formed by using the polypropylene fiber is exposed to a high temperature or subjected to frictional heat at the time of rubbing or scratching, the polypropylene fiber forming the rope melts, causing, for example, meltdown of the rope, which results in that physical properties such as strength are likely to decrease and the drawing of the rope under a high temperature is high.

As described above, Patent Document 1 discloses a polypropylene fiber whose heat resistance has been attempted to increase, which has heat shrinkage rate at 170° C. for 10 minutes of 10% or lower and melt peak temperature of 178° C. or higher. The polypropylene fiber is obtained by melting and molding a homopolypropylene resin having an isotactic pentad fraction of 96% or more and lower than 98.5% and a melt flow rate (230° C., load of 2.16 kg) of 0.1 to 30 g/10 minutes, and then drawing the resultant. However, in the polypropylene fiber, the crystals are not uniform and the heat resistance is not yet sufficiently high. Therefore, even when a rope is formed by using the polypropylene fiber, meltdown and reduction in physical properties due to frictional heat or the like are likely to occur. Thus, the drawing at a high temperature is likely to become high.

Moreover, similarly as in ropes formed of other synthetic fibers, it is important also in the rope formed of a polypropylene fiber that, when fibers are twisted, there is no slipping between fibers and between fiber strands and engagements among the fibers and among the fiber strands are firm and in tight twist, in terms of the inhibition of untwist of the fibers or the fiber strands and the improvement in the strength, drawing resistance, wearing resistance, and shape retentivity.

However, with a rope formed of a conventional polypropylene fiber, slipping between polypropylene fibers and slipping between polypropylene fiber strands are high, and it is difficult to sufficiently firmly and tightly twist the fibers.

As a method of reducing slipping between polypropylene fibers and slipping between polypropylene fiber strands, irregularities are formed on the surface of polypropylene fiber and the surface of the polypropylene fiber is roughened. However, in a conventionally known polypropylene fiber on the surface of which irregularities have been formed and a polypropylene fiber whose surface has been roughened, the irregularities (surface roughened) are insufficient and the formation of irregularities is regulated. Even when a rope is formed using the polypropylene fibers, it is difficult to tightly and firmly twist the polypropylene fibers (polypropylene yarn and strand). Thus, a rope formed of the polypropylene fiber which is excellent in strength, drawing resistance, wearing resistance, shape retentivity, etc., cannot be obtained.

For example, in the polypropylene fibers each having irregularities on the surface for reinforcing a hydraulic substance, which are described in Patent Documents 4 to 6 mentioned previously, the damage thereto is likely to be generated. Thus, such polypropylene fibers are applied to the production of a rope, a rope formed of a polypropylene fiber which is excellent in mechanical property, wearing resistance, shape retentivity, etc., cannot be not obtained.

Moreover, with respect to the polypropylene fiber for reinforcing concrete described in Patent Documents 7 mentioned previously, the intervals between the striated rough-surfaced structures that exist on the fiber surface and the height thereof are small. Therefore, the anti-slip effect between fibers is insufficient, and even when the polypropylene fiber is applied to production of a rope, the fibers are not tightly and firmly twisted. Thus, a rope which is excellent in mechanical properties, wearing resistance, untwisting resistance, shape retentivity, etc., cannot be obtained.

Further, with respect to the polypropylene drawn yarn (polypropylene fiber) described in Patent Document 8 mentioned previously, the formation of irregularities on the fiber surface is insufficient and the intervals between the irregularities and the height thereof are small. Therefore, the anti-slip effect between fibers is insufficient, and even when the polypropylene fiber is applied to production of a rope, the fibers are not tightly and firmly twisted. Thus a rope which is excellent in mechanical properties, wearing resistance, untwisting resistance, shape retentivity, etc., cannot be obtained.

Moreover, the polypropylene fiber is used for the production of a sheet-shaped fiber structure such as a woven or knitted fabric, a nonwoven fabric, a synthetic paper, and a net-like article while taking advantage of the properties such as chemical resistance, lightweight property, easiness of recycling, and non-generation of harmful gas at the time of incineration.

Depending on the intended use of the sheet-shaped fiber structure formed of a polypropylene fiber, heat resistance has been demanded. For example, as described above, in production of a polyolefin sheet reinforced with a fabric formed of a polypropylene fiber, a polyolefin base sheet needs to be melted at a high temperature for adhesion between the polyolefin sheet base and the fabric formed of a polypropylene fiber from the viewpoints of the improvement in productivity and adhesiveness between the fabric formed of a polypropylene fiber and the polyolefin sheet base. However, since the heat resistance of the fabric formed of a polypropylene fiber is insufficient, the polyolefin sheet base cannot be melted at a high temperature, which causes the reduction in productivity, lack of adhesion strength between the fiber formed of a polypropylene fiber and the polyolefin base, etc. Further, also when a sheet-shaped fiber structure formed of a polypropylene fiber is used for a filter, a separator, clothes (in particular, sportswear and the like), etc., the improvement in the heat resistance has been demanded. This is because the sheet-shaped fiber structure formed of a polypropylene fiber is sometimes used under a high temperature environment or a state where friction is generated.

The polypropylene fibers described in Patent Documents 1 and 2, whose heat resistance has been attempted to increase, may be used for the production of a sheet-shaped fiber structure. However, in the polypropylene fibers described in Patent Documents 1 and 2, the crystals are not uniform and the heat resistance is not yet sufficiently high. Thus, a sheet-shaped fiber structure excellent in heat resistance cannot be obtained.

Moreover, a synthetic paper and a nonwoven fabric formed of a polypropylene fiber are used for industrial materials such as a filter and a separator. However, due to poor hydrophobicity, the synthetic paper and the nonwoven fabric formed of a polypropylene fiber, as they are, are difficult to be applied to an aqueous filtration and an alkali secondary battery separator that require high hydrophilicity.

As described above, Patent Document 3 describes a water-absorbing polypropylene fiber obtained by subjecting, to melt spinning, polypropylene in which a water-absorbing resin in the form of particles has been added and dispersed using polyethylene wax. However, the polypropylene fiber has insufficient strength, and thus, sufficient strength cannot be obtained when formed into a sheet-shaped fiber structure such as a woven knitted fabric, a nonwoven fabric, a synthetic paper, and a net-like article.

Moreover, even when the polypropylene fibers, described in Patent Documents 4 to 8, each having irregularities on the surface are used for the production of a sheet-shaped fiber structure, such as a woven or knitted fabric, a nonwoven fabric, a synthetic paper, and a net-like article, a sheet-shaped fiber structure which has high water retentivity and is excellent in strength cannot be obtained. This is because the irregularities (surface roughened) are insufficient, so the formation of the irregularities is limited, and because the strength of a polypropylene fiber itself is low.

To be specific, with respect to the polypropylene fibers (in particular, a polypropylene fiber having a small fineness, i.e., a single fiber fineness of 10 dtex or lower) obtained by the methods of forming irregularities described in Patent Documents 4 to 6, particularly in Patent Document 4, the generation of damage is remarkable. Therefore, even when a sheet-shaped fiber structure is formed using the polypropylene fiber, a sheet-shaped fiber structure excellent in strength cannot be obtained.

Moreover, with respect to the polypropylene fiber described in Patent Document 7, the intervals between the striated rough-surfaced structures that exist on the fiber surface and the height thereof are small. Thus, even when the polypropylene fiber is used, a sheet-shaped fiber structure excellent in water retentivity cannot be obtained. Further, with respect to the polypropylene fiber described in Patent Document 8, the formation of the irregularities on the fiber surface is insufficient and the intervals between the irregularities and the height thereof are small. Thus, even when the polypropylene fiber is used, a sheet-shaped fiber structure excellent in water retentivity cannot be obtained.

Further, as one of the applications of a polypropylene fiber, the use thereof as a reinforcement fiber for organic polymers is mentioned. As a specific example thereof, the above-mentioned polypropylene fiber-reinforced polyolefin sheet is mentioned. However, because the heat resistance of the polypropylene fiber is insufficient, the productivity decreases and the adhesion strength between the polypropylene fiber and the polyolefin base is insufficient as described above.

Moreover, when the polypropylene fiber is used as a reinforcement fiber for organic polymers other than polyolefin to produce a composite material containing the polypropylene fiber and an organic polymer and a molded product, a sufficient reinforcement effect is sometimes not acquired due to low heat resistance of the polypropylene fiber and low adhesiveness of the polypropylene fiber to the organic polymer. From those viewpoints, a polypropylene fiber excellent in heat resistance and, moreover, is excellent in adhesiveness to an organic polymer has been demanded. However, the heat resistance of each of the polypropylene fibers described in Patent Documents 1 and 2 is not yet sufficiently high. Thus, the polypropylene fibers described in Patent Documents 1 and 2 are not necessarily effective as the reinforcement fiber for organic polymers.

Further, with respect to the polypropylene fibers having irregularities on the surface described in Patent Documents 4 to 8, the irregularities on the surface (surface roughened) are insufficient, the formation of irregularities is regulated, and the strength is insufficient. Therefore, even when these polypropylene fibers are applied to a reinforcement fiber for organic polymers, it is impossible to obtain a composite material containing an organic polymer and the polypropylene fiber, a molded product, etc., which are excellent in strength and the like due to insufficient adhesion with organic polymers.

Patent Document 1: JP 2002-302825 A
Patent Document 2: JP 2001-20132 A
Patent Document 3: JP 04-41710 A
Patent Document 4: JP 61-26510 B
Patent Document 5: JP 56-9268 A
Patent Document 6: JP 61-301 B
Patent Document 7: JP 2003-293216 A
Patent Document 8: JP 3130288 B
Patent Document 9: JP 07-90785 A
Patent Document 10: JP 2002-20926 A
Non Patent Document 1: "Macromolecules", vol. 6, 1973, p925
Non Patent Document 2: "Macromolecules", vol. 8, 1975, p687

DISCLOSURE OF THE INVENTION

Problems to be Solved by the Invention

An object of the present invention is to provide a polypropylene fiber which has a uniform crystal structure and is excellent in heat resistance and also in strength.

Another object of the present invention is to provide a polypropylene fiber which has high water retentivity and is excellent in strength.

Further, still another object of the present invention is to provide a polypropylene fiber which is excellent in strength, heat resistance, and water retentivity.

Further, still another object of the present invention is to provide a method of smoothly producing the polypropylene fiber.

Still further object of the present invention is to provide a hydraulic composition and a hydraulic product containing the hydraulic composition. The hydraulic composition includes a polypropylene fiber excellent in heat resistance and strength as a reinforcement fiber, can form a hydraulic product excellent in strength and durability regardless of variations of curing temperatures, shows no degradation and reduction in the strength of a polypropylene fiber even in the case of autoclave curing at a high temperature, and can provide a hydraulic composition excellent in strength and durability in a shortened curing time.

Moreover, another object of the present invention is to provide a hydraulic composition and a hydraulic product formed of the hydraulic composition. The hydraulic composition includes a polypropylene fiber which is excellent in heat resistance, strength, water retentivity, and compatibility with a hydraulic substance forming a matrix, and which can form a hydraulic product excellent in strength and durability.

Further, another object of the present invention is to provide a rope structure formed of a polypropylene fiber, which has high strength and excellent heat resistance, in which melting, meltdown, and reduction in the physical properties of the polypropylene fiber forming the rope do not arise even when the rope structure is exposed to a high temperature and is rubbed or scratched, the rope is hard to cut and draw under a high temperature due to the properties, in which slipping between the fibers forming the rope and slipping between the fiber strands forming the rope are low, in which the gathering of fibers and the gathering of fiber strands are each twisted firmly and tightly, and which is excellent in strength, drawing resistance, wearing resistance, shape retentivity, etc.

Further, another object of the present invention is to provide a sheet-shaped fiber structure formed of a polypropylene fiber which is excellent in water retentivity and also in strength, such as a nonwoven fabric, a synthetic paper, a woven or knitted fabric, and a net-like article.

Moreover, another object of the present invention is to provide a sheet-shaped fiber structure formed of a polypropylene fiber which is excellent in strength and also in heat resistance.

Moreover, another object of the present invention is to provide a sheet-shaped fiber structure formed of a polypropylene fiber which is excellent in water retentivity, strength, and heat resistance.

Further, an object of the present invention is to provide a composite material of a polypropylene fiber and an organic polymer which is excellent in mechanical properties such as strength, heat resistance, and durability, the composite material including, in a matrix formed of an organic polymer, a polypropylene fiber which has high strength, excellent heat resistance, and excellent adhesiveness with an organic polymer, in which melting, meltdown, and reduction in physical properties do not arise even when exposed to a high temperature.

Another object of the present invention is to provide a molded product which contains the composite material and is excellent in mechanical properties, heat resistance, and durability.

Means for Solving the Problems

The inventors of the present invention conducted extensive research in order to achieve the above-mentioned objects. As a result, by the use of polypropylene having an isotactic pentad fraction (IPF) higher than specified, a nonconventional polypropylene fiber has been successfully obtained which shows specific endothermic/melting properties in differential scanning calorimetry (DSC) measurement, has a uniform crystal structure, has a high heat resistance, and is excellent also in strength.

Further, the inventors of the present invention have successfully obtained, using the polypropylene having an isotactic pentad fraction (IPF) higher than specified, a nonconventional polypropylene fiber, which has, on the fiber surface, irregularities having a given average interval and a given average height as a result of alternate presence of a protruded portion having a large diameter and a non-protruded portion having a small diameter along its fiber axis, the nonconventional polypropylene fiber having small single fiber fineness, excellent strength, and high water retentivity. Moreover, the inventors of the present invention have successfully obtained a nonconventional polypropylene fiber which has both the endothermic/melting properties and an irregular structure of the fiber surface and is excellent in strength, heat resistance, and water retentivity.

More specifically, the inventors of the present invention have successfully produced a nonconventional polypropylene fiber which shows specific endothermic/melting properties in differential scanning calorimetry (DSC) measurement, has a uniform crystal structure, and is excellent in heat resistance and strength, the nonconventional polypropylene fiber being produced by subjecting polypropylene having an isotactic pentad fraction (IPF) higher than specified to melt spinning, then cooling the resultant to solidify to thereby produce a polypropylene undrawn fiber, and then subjecting the resulting polypropylene undrawn fiber to pre-drawing and post-drawing under specific conditions.

Further, the inventors of the present invention found that: when a polypropylene fiber having a single fiber fineness of 3 dtex or lower, and particularly 0.1 to 3 dtex, is produced by the specific method described above, a polypropylene fiber is obtained, which has irregularities having a given average interval and a given average height as a result of alternate presence of a protruded portion having a large diameter and a non-protruded portion having a small diameter along its fiber axis, and which is excellent in water retentivity and strength; and by specifying the endothermic/melting properties in differential scanning calorimetry (DSC) measurement in the polypropylene fiber, the crystal structure of the polypropylene fiber becomes uniform, and the heat resistance becomes excellent besides properties such as high water retentivity and high strength.

The inventors of the present invention have attempted to prepare a hydraulic composition by blending the polypropylene fiber obtained above in a hydraulic substance such as cement, and to produce a hydraulic product using the hydraulic composition. As a result, the inventors of the present invention found that a hydraulic product (hydraulic molded product) obtained by molding a mixture in which water has been mixed in the hydraulic composition containing the polypropylene fiber obtained above, and curing the resultant has extremely high strength. In particular, the inventors of the present invention found that: when producing a hydraulic product such as a hydraulic molded product using the hydraulic composition containing the polypropylene fiber obtained above, a hydraulic product having a high strength can be obtained regardless of curing temperatures; the strength of the hydraulic product becomes high by any of curing at a high temperature exceeding 100° C., curing at room temperature, and curing at a temperature from room temperature to a high temperature exceeding 100° C.; and, in particular, when autoclave curing is performed at a high temperature exceeding 100° C., among such high temperatures, at a high temperature exceeding 150° C., and particularly at a high temperature of 170° C. or higher, a hydraulic product which has high strength equivalent to the case where curing is performed at room temperature can be produced with high productivity in curing time reduced to a large extent as compared with the case of room temperature curing due to high compatibility with the hydraulic product resulting from the specific irregular structure of the fiber surface of the polypropylene fiber while not causing degradation and reduction in the strength of the polypropylene fiber contained in the hydraulic composition and maintaining the initial high strength.

Further, the inventors of the present invention have attempted to produce a rope using the polypropylene fiber obtained above. As a result, the inventors of the present invention found that when a rope is formed using the polypropylene fiber obtained above, a rope having the following properties can be obtained: the rope has high strength and excellent heat resistance, in which melting, meltdown, reduction in the physical properties, etc., of the polypropylene fiber which forms the rope are hard to occur even when the rope is exposed to a high temperature and is rubbed or scratched; the rope is hard to cut and shows less drawing under a high temperature due to the above-mentioned properties; and slipping between the fibers forming the rope and slipping between the fiber strands forming the rope are low, and the gathering of fibers and the gathering of fiber strands are each twisted firmly and tightly, so the rope is excellent in strength, drawing resistance, wearing resistance, shape retentivity, etc.

Moreover, the inventors of the present invention found that, when a sheet-shaped fiber structure such as a woven or knitted fabric a nonwoven fabric, a synthetic paper, and a net-like article has been produced using the polypropylene fiber obtained above, the sheet-shaped fiber structure has high water retention rate and is excellent in water retentivity, strength, and heat resistance.

Further, the inventors of the present invention have attempted to produce, using the polypropylene fiber obtained above as a reinforcement fiber for an organic polymer, a composite material containing the polypropylene fiber in a matrix formed of the organic polymer, and then produce a molded product from the composite material. As a result, with respect to the composite material and molded product thus obtained, the polypropylene fiber contained in the matrix formed of the organic polymer has high strength and is excellent in heat resistance. Thus, even when exposed to a high temperature, melting, meltdown, reduction in physical properties, etc., are unlikely to be generated. Moreover, due to an anchoring effect to the organic polymer matrix due to the specific irregularities of the surface of polypropylene fiber, mechanical properties such as tensile strength, impact strength, modulus of elasticity in bending, and bending strength are excellent. Based on the above-mentioned findings, the present invention has been accomplished.

That is, the present invention provides: (1) a polypropylene fiber including polypropylene having an isotactic pentad fraction (IPF) of 94% or more, in which: the polypropylene fiber has a fiber strength of 7 cN/dtex or more; and an endothermic peak shape of the polypropylene fiber by differential scanning calorimetry (DSC) is a single shape having a half width of 10° C. or lower, and a melt enthalpy change (ΔH) of the polypropylene fiber by the DSC is 125 J/g or more (hereinafter may be referred to as "polypropylene fiber A");

(2) a polypropylene fiber including polypropylene having an isotactic pentad fraction (IPF) of 94% or more, in which: the polypropylene fiber has a fiber strength of 7 cN/dtex or more; the polypropylene fiber has a single fiber fineness of 0.1 to 3 dtex; and the polypropylene fiber has, on its surface, irregularities having an average interval of 6.5 to 20 μm and an average height of 0.35 to 1 μm as a result of alternate presence of a protruded portion having a large diameter and a non-protruded portion having a small diameter along its fiber axis (hereinafter may be referred to as "polypropylene fiber B");

(3) a polypropylene fiber including polypropylene having an isotactic pentad fraction (IPF) of 94% or more, in which: the polypropylene fiber has a fiber strength of 7 cN/dtex or more; the polypropylene fiber has a single fiber fineness of 0.1 to 3 dtex; an endothermic peak shape of the polypropylene fiber by differential scanning calorimetry (DSC) is a single shape having a half width of 10 ° C. or lower, and a melt enthalpy change (ΔH) of the polypropylene fiber by the DSC is 125 J/g or more; and the polypropylene fiber has, on its surface, irregularities having an average interval of 6.5 to 20 μm and an average height of 0.35 to 1 μm as a result of alternate presence of a protruded portion having a large diameter and a non-protruded portion having a small diameter along its fiber axis (hereinafter may be referred to as "polypropylene fiber C"); and (4) a polypropylene fiber according to the item (2) or (3), in which the polypropylene fiber has a water retention rate of 10 mass % or more.

In addition, the present invention provides: (5) a method of producing the polypropylene fiber according to any one of the items (1) to (4), including: subjecting polypropylene having an isotactic pentad fraction (IPF) of 94% or more to melt spinning; cooling the resultant to solidify so that a polypropylene undrawn fiber is produced; subjecting the polypropylene undrawn fiber to pre-drawing at a temperature of 120 to 150° C. and a drawing magnification of 3 to 10 times; and subjecting the resultant to post-drawing at a drawing magnification of 1.2 to 3.0 times under conditions of a temperature of 170 to 190° C., a deformation rate of 1.5 to 15 times/min., and a draw tension of 1.0 to 2.5 cN/dtex;

(6) a production method according to the item (6), in which a total drawing magnification of the pre-drawing and the post-drawing is 3.9 to 20 times; and (7) a production method according to the item (5) or (6), in which a product (A×B) of a melt spinning rate A (m/min.) at a time of the production of the polypropylene undrawn fiber and a total drawing magnification B (times) of the pre-drawing and the post-drawing is 3,000 to 17,000 (m·times/min.).

Further, the present invention provides: (8) a hydraulic composition including the polypropylene fiber according to anyone of the items (1) to (4);

(9) a hydraulic product which is formed by using the hydraulic composition according to the item (8); and

(10) a hydraulic product according to the item (9), in which the hydraulic product includes a molded product.

Further, the present invention provides: (11) a rope structure which is formed by using the polypropylene fiber according to any one of the items (1) to (4).

Further, the present invention provides: (12) a sheet-shaped fiber structure including the polypropylene fiber according to any one of the items (1) to (4);

(13) a sheet-shaped fiber structure according to the item (12), in which a content of the polypropylene fiber according to any one of the items (1) to (4) is 50 mass % or more; and

(14) a sheet-shaped fiber structure according to the item (12) or (13), in which the sheet-shaped fiber structure has a water retention rate of 10 mass % or more.

In addition, the present invention provides: (15) a composite material including the polypropylene fiber according to any one of the items (1) to (4) in a matrix composed of an organic polymer;

(16) a composite material according to the item (15), in which the polypropylene fiber in the matrix composed of the organic polymer is of a short fiber form, a long fiber form, a fiber bundle form, a yarn form, a woven or knitted fabric form, a nonwoven fabric form, or a net form;

(17) a composite material according to the item (15) or (16), in which the organic polymer includes at least one kind of an organic polymer selected from a thermoplastic resin, a thermosetting resin, and an elastomeric polymer; and

(18) a molded product including the composite material according to any one of the items (15) to (17).

Effect of the Invention

The polypropylene fiber (polypropylene fibers A to C) of the present invention has a fiber strength as high as 7 cN/dtex or more.

Among the polypropylene fibers of the present invention, the polypropylene fibers (polypropylene fiber A, polypropylene fiber C) contain polypropylene having an isotactic pentad fraction (IPF) of 94% or more and having properties such that the endothermic peak shape by differential scanning calorimetry (DSC) measurement is a single shape having a half width of 10° C. or lower and the melt enthalpy change (ΔH) is 125 J/g or more. Due to the properties, the polypropylene fibers (polypropylene fiber A, polypropylene fiber C) have high crystallinity; have a uniform crystal structure; are extremely excellent in heat resistance; do not easily melt even when exposed to a high temperature or rubbed; and can maintain excellent fiber shape and fiber strength.

Among the polypropylene fibers of the present invention, the polypropylene fibers (polypropylene fiber B, polypropylene fiber C) having, on the surface, irregularities having an average interval of 6.5 to 20 μm and an average height of 0.35 to 1 μm as a result of alternate presence of a protruded portion having a large diameter and a non-protruded portion having a small diameter along its fiber axis have a water retention rate as high as 10% or more and are excellent in adhesiveness with a hydraulic substance, an organic polymer, and other materials due to the anchor effect resulting from the irregular structure of the fiber surface.

In particular, the polypropylene fiber (polypropylene fiber C) of the present invention having specific DSC properties defined in the present invention and the above-mentioned specific irregular structure of the fiber surface has high fiber strength, high crystallinity, and a uniform crystal structure and is excellent in heat resistance, water retentivity, and adhesiveness with other materials as well.

Taking advantage of the above-mentioned outstanding properties, the polypropylene fiber of the present invention can be effectively used in various applications in the form of a short fiber, a long fiber, a fiber bundle, etc., or in the form of a fiber structure, such as a woven or knitted fabric, a nonwoven fabric, a net-like article, and paper.

According to the production method of the present invention, the polypropylene fiber of the present invention having the above-mentioned specific DSC properties, the polypropylene fiber of the present invention having the above-mentioned specific irregular structure of the fiber surface, and the polypropylene fiber of the present invention having both the above-mentioned specific DSC properties and the above-mentioned specific irregular structure of the fiber surface can be smoothly produced.

Even when the hydraulic composition of the present invention containing the polypropylene fibers (polypropylene fiber A, polypropylene fiber C) of the present invention which have a fiber strength as high as 7 cN/dtex or more and specific DSC properties defined in the present invention; and which are excellent in heat resistance and strength are cured at a high temperature exceeding 100° C., particularly 150° C. or higher, and more particularly 170° C. or higher, the polypropylene fiber contained in the hydraulic composition maintains the fiber shape and the outstanding strength. By the use of the hydraulic composition, a hydraulic product which is excellent in strength and durability can be smoothly produced with high productivity in a shortened curing time.

The polypropylene fibers (polypropylene fiber B, polypropylene fiber C) of the present invention which have a fiber strength as high as 7 cN/dtex or more and have the above-mentioned specific irregular structure of the fiber surface defined in the present invention have a water retention rate as high as 10% or more, and thus the compatibility thereof with a hydraulic substance, such as cement, is high. Moreover, due to the above-mentioned specific irregular surface structure, the frictional force on the fiber/cement interface is also high. Thus, the strength of the polypropylene fiber at the time of, for example, breakage of a hydraulic product is used effectively. Therefore, by the use of the hydraulic composition of the present invention containing the polypropylene fiber, a hydraulic product having a high strength can be smoothly obtained.

In particular, among the hydraulic compositions of the present invention, the hydraulic composition of the present invention containing, as a polypropylene fiber, the polypropylene fiber (polypropylene fiber C) which has a single fiber fineness of 0.1 to 3 dtex, a fiber strength of 7 cN/dtex or more, the above-mentioned specific DSC properties defined in the present invention, and, on the fiber surface, the above-mentioned irregular structure of the fiber surface defined in the present invention forms a hydraulic product excellent in strength, even when subjected to any curing such as curing at a high temperature exceeding 100° C., particularly 150° C. or higher, and more particularly 170° C. or higher, normal temperature curing, natural curing (e.g., 80° C. or lower), or curing at the intermediate temperature of the above-mentioned temperatures.

A rope structure of the present invention formed using the polypropylene fibers (polypropylene fiber A and polypropylene fiber C) having the above-mentioned specific DSC properties and fiber strength defined in the present invention have high strength; are excellent in heat resistance; and show no melting, meltdown, reduction in the physical properties, etc., of the polypropylene fiber which forms the rope even when the rope is exposed to a high temperature; or is rubbed or scratched. Thus, the rope structure is hard to cut and damage, shows less drawing under a high temperature, can maintain mechanical properties, such as strength, over a long period of time, and is excellent in durability.

Further, a rope structure of the present invention formed using the polypropylene fibers (polypropylene fiber B and polypropylene fiber C) having the above-mentioned fiber strength, single fiber fineness, and irregular properties of the fiber surface defined in the present invention are free from slipping between the polypropylene fibers due to the specific irregular structure of the fiber surface. With respect to the rope structure, the fibers and the fiber strands are tightly and firmly twisted in a state where the polypropylene fibers are engaged with each other and the polypropylene fiber strands are engaged with each other. Therefore, the rope structure is excellent in strength, drawing resistance, wearing resistance, shape retentivity, and the like.

In particular, a rope structure of the present invention formed using the polypropylene fiber (polypropylene fiber C) of the present invention having the above-mentioned specific fiber strength, DSC properties, single fiber fineness, and irregular structure of the fiber surface which are defined in the present invention has high strength and is excellent in heat resistance. Moreover, with respect to the rope structure, the fibers and the fiber strands which form the rope structure are twisted firmly and tightly; and strength, drawing resistance, wearing resistance, shape retentivity, etc., are more excellent.

A sheet-shaped fiber structure of the present invention formed using the polypropylene fibers (polypropylene fiber A and polypropylene fiber C) of the present invention having the above-mentioned specific fiber strength and DSC properties defined in the present invention have high strength; are excellent in heat resistance; can maintain mechanical properties, such as strength, over a long period of time even when exposed to a high temperature; and is excellent in durability.

A sheet-shaped fiber structure of the present invention formed using the polypropylene fibers (polypropylene fiber B, polypropylene fiber C) which have the above-mentioned fiber strength, single fiber fineness, and irregular properties of the fiber surface defined in the present invention have high water retention rate (generally water retention rate of 10 mass % or more) and are excellent in water retentivity and strength.

In particular, a sheet-shaped fiber structure of the present invention formed using the polypropylene fiber (polypropylene fiber C) of the present invention having the above-mentioned specific fiber strength, DSC properties, single fiber fineness, and irregular structure of the fiber surface which are defined in the present invention are excellent in all of heat resistance, strength, durability, and water retentivity.

The sheet-shaped fiber structure (a woven or knitted fabric, a nonwoven fabric, a synthetic paper, a net-like article, etc.) of the present invention can be effectively used, taking advantage of the above-mentioned properties, in various applications, such as, a filter, a separator, a reinforcement material, clothes, a wiper, and a makeup remover.

A composite material of the present invention in which the polypropylene fibers (polypropylene fiber A, polypropylene fiber C) of the present invention having the above-mentioned specific fiber strength and DSC properties defined in the present invention are contained in a matrix containing an organic polymer; and a molded product containing the composite material are excellent in mechanical properties such as tensile strength, impact strength, modulus of elasticity in bending, and bending strength, and moreover are excellent in heat resistance and durability. This is because the polypropylene fiber is extremely excellent in heat resistance, and thus the polypropylene fiber does not easily melt even when exposed to a high temperature, and maintains favorable fiber shape and fiber strength.

A composite material in which the polypropylene fibers (polypropylene fiber B, polypropylene fiber C) of the present invention having the above-mentioned fiber strength, single fiber fineness, and irregular properties of the fiber surface defined in the present invention are contained in a matrix containing an organic polymer, and a molded product containing the composite material are excellent in mechanical properties, such as tensile strength, impact strength, modulus of elasticity in bending, and bending strength, and moreover, excellent in durability due to high fiber strength of the polypropylene fiber and high adhesiveness of the polypropylene fiber with the organic polymer due to the anchoring effect to the organic polymer matrix resulting from the specific irregular structure of the fiber surface.

In particular, a composite material in which the polypropylene fiber (polypropylene fiber C) of the present invention having the above-mentioned specific fiber strength, DSC properties, single fiber fineness, and irregular structure of the fiber surface which are defined in the present invention is contained in a matrix containing an organic polymer and a molded product containing the composite material are, due to the above-mentioned outstanding properties of the polypropylene fiber, more excellent in mechanical properties, such as tensile strength, impact strength, modulus of elasticity in bending, and bending strength, and moreover more excellent in heat resistance and durability.

BEST MODE FOR CARRYING OUT THE INVENTION

Figure 1:
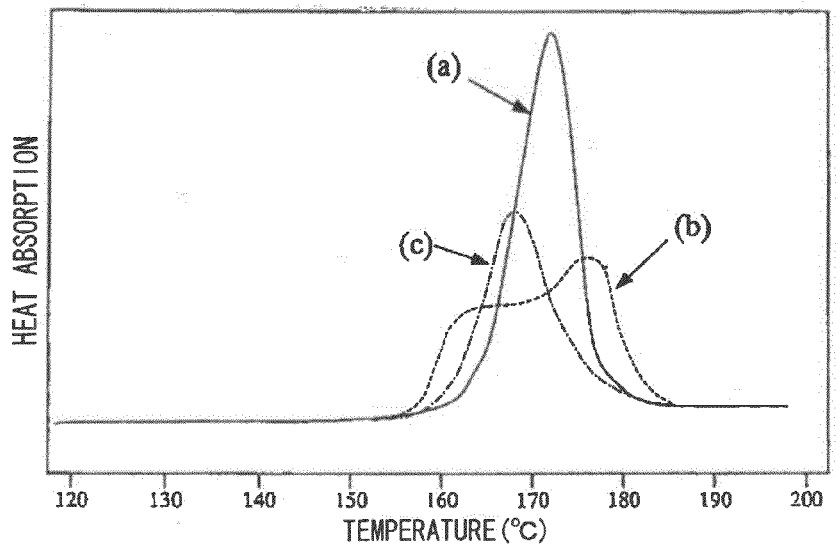
FIG. 1 is a view schematically illustrating the endothermic peak shape by DSC measurement in a polypropylene fiber.

Hereinafter, the present invention will be described in detail.

The polypropylene fiber of the present invention contains polypropylene having an isotactic pentad fraction (hereinafter sometimes simply referred to as "IPF") of 94% or more. It is preferable that the polypropylene fiber contain polypropylene having an IPF of 95 to 99%, and it is more preferable that the polypropylene fiber contain polypropylene having an IPF of 96 to 99%.

When the IPF of polypropylene is lower than 94%, a uniform crystal structure is difficult to form in the polypropylene fiber, which makes it impossible to obtain a polypropylene fiber of the present invention having a sufficient strength and heat resistance. In contrast, since polypropylene having an IPF exceeding 99% is difficult to industrially mass-produce, the polypropylene is low in practicability in terms of cost and the like.

The polypropylene fiber of the present invention may be formed of one kind of a propylene homopolymer or may be formed of a propylene copolymer of propylene and another copolymerizable monomer insofar as the IPF falls under the above-mentioned range. Or, when the IPF in the whole mixture falls under the above-mentioned range, the polypropylene fiber of the present invention may be formed of a mixture of two or more propylene homopolymers; a mixture of one or two or more propylene homopolymers and one or two or more propylene copolymers; or a mixture of two or more propylene copolymers.

Moreover, insofar as the IPF in the whole propylene polymer forming the polypropylene fiber falls under the above-mentioned range, the polypropylene fiber of the present invention may be a conjugated spun fiber or a mixed spun fiber having a conjugated form and a mixed form formed using two or more propylene homopolymers and/or propylene copolymers, such as a sheath-core type, a sea-island type, and a side by side type; or a conjugated fiber formed of polypropylene and another polymer, such as a sheath-core type, a sea-island type, or a side by side type.

The IPF of polypropylene is an index showing the stereoregularity, and influences on the crystallinity when polypropylene is formed into a fiber. In general, when polypropylene has a higher IPF, the stereoregularity thereof is higher. The IPF of polypropylene can be determined from a $^{13}$C-NMR signal, and the IPF value of polypropylene as used in the specification refers to a value calculated by a method described in Examples described later.

The fiber strength of the polypropylene fiber of the present invention is 7 cN/dtex or more, preferably 7 to 13 cN/dtex, more preferably 8 to 13 cN/dtex, still more preferably 9 to 13 cN/dtex, and yet still more preferably 10 to 13 cN/dtex.

Here, the fiber strength (single fiber fineness strength) of the polypropylene fiber as used in the specification refers to fiber strength measured by a method described in Examples described later.

Due to the above-mentioned fiber strength, the polypropylene fiber of the present invention can be effectively used in various applications. When the fiber strength of the polypropylene fiber is lower than 7 cN/dtex, it becomes difficult to produce various products excellent in strength using the polypropylene fiber and it is required to use a large amount of polypropylene fibers so as to achieve a given strength. Thus, the lightweight property which are originally imparted to the polypropylene fiber cannot be utilized. For example, when a rope is formed of a polypropylene fiber having a fiber strength of 7 cN/dtex or lower, it becomes difficult to obtain a rope having a high strength. Thus, in order to obtain a rope having a sufficiently high strength, a lot of polypropylene fibers must be used to form a rope having a large fiber fineness, which degrades the lightweight property.

In contrast, a polypropylene fiber having a fiber strength exceeding 13 cN/dtex has a problem in terms of practical use because conditions in which the mass productivity is low need to be employed.

Among the polypropylene fibers of the present invention, the polypropylene fibers (polypropylene fiber A, polypropylene fiber C) having specific DSC properties such that "the endothermic peak shape by differential scanning calorimetry (DSC) measurement (hereinafter sometimes simply referred to as "DSC measurement") is a single shape having a half width of 10° C. or lower and the melt enthalpy change (ΔH) is 125 J/g or more" besides the above-mentioned property such that the fiber strength is 7 or more cN/dtex are excellent in heat resistance due to the properties.

Since the polypropylene fiber in which the endothermic peak shape by DSC measurement is a narrow (sharp) single shape having a half width of 10° C. or lower and the melt enthalpy change (ΔH) is 125 J/g or more is excellent in heat resistance, meltdown and reduction in physical properties are less likely to occur, even when exposed to a high temperature.

Here, the above-mentioned "endothermic peak shape" and "melt enthalpy change (ΔH)" by DSC measurement as used in the present invention refer to an endothermic peak shape and melt enthalpy change (ΔH) by DSC measurement performed according to methods described in Examples described later.

In DSC measurement of an isotactic polypropylene fiber, the endothermic peak observed at 160° C. or higher generally originates from melting of α crystals. A polypropylene fiber in which the endothermic peak temperature is 160° C. or higher, and, in some cases, 175° C. or higher, is conventionally known. However, in such a conventional polypropylene fiber, crystallization has not been sufficiently performed. Therefore, the endothermic peak shape is a double peak shape or a wide (broad) single peak shape, resulting in that the crystal structure lacks in uniformity as a whole.

In contrast, in the polypropylene fiber (polypropylene fiber A, polypropylene fiber C) of the present invention, the endothermic peak shape by DSC measurement is a narrow (sharp) single shape having a half width of 10° C. or lower and has a uniform crystal structure.

Further, in the polypropylene fiber of the present invention, the melt enthalpy change (ΔH) by DSC measurement is as high as 125 J/g or more; the crystallinity is high; the crystal structure is uniform; and the heat resistance is excellent.

Here, the "endothermic peak shape by DSC measurement" and the "half width" as used in the specification will be described.

First, FIG. 1 is view schematically illustrating the endothermic peak shape of a polypropylene fiber by DSC measurement.

In FIG. 1, (a) corresponds to a typical example of the endothermic peak curve of the polypropylene fiber of the present invention. The endothermic peak curve has the only one endothermic peak (single peak). The single peak is sharp and large. The melt enthalpy change (ΔH) also has a larger value as compared with a conventional polypropylene fiber.

In contrast, in FIG. 1, (b) represents an example of the endothermic peak curve of a conventional polypropylene fiber. The endothermic peak curve has two endothermic peaks (double peak), and the peak width (half width) is large and the melt enthalpy change (ΔH) is small.

Moreover, in FIG. 1, (c) represents another example of the endothermic peak curve of a conventional polypropylene fiber. The endothermic peak curve has one endothermic peak (single peak) and the melt enthalpy change (ΔH) is small.

Figure 2:
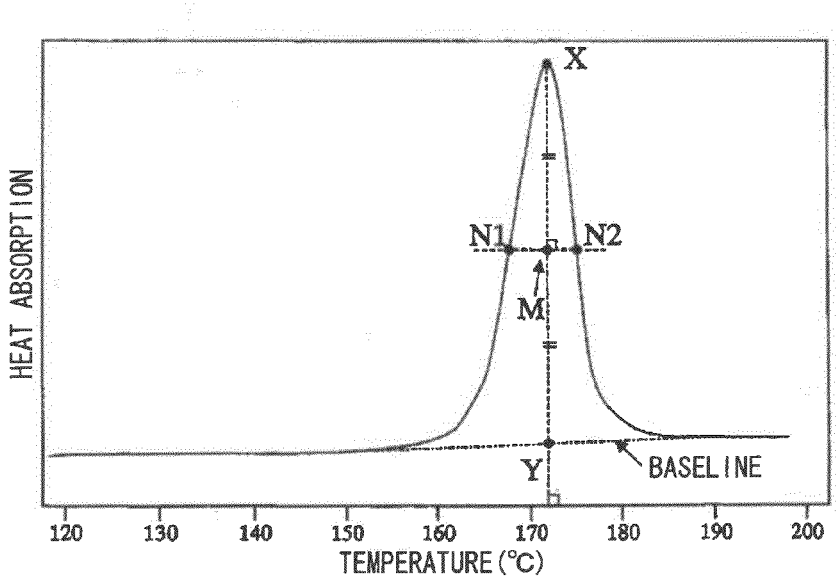
FIG. 2 is a view illustrating how to determine a half width of the endothermic peak by DSC measurement in a polypropylene fiber.

Next, FIG. 2 is a view illustrating how to determine the half width of the endothermic peak of a polypropylene fiber by DSC measurement.

FIG. 2 represents a typical example of the endothermic properties (melting properties) of the polypropylene fiber of the present invention by DSC measurement. More specifically, when the intersection point of the perpendicular line from the top X of the only endothermic peak (single peak) to the temperature axis and the baseline of the endothermic peak is defined as Y, the point which bisects the line-segment X-Y is defined as M. Then, when the intersection points of a straight line parallel to the temperature axis through M and the endothermic curve are defined as N1 and N2, respectively, the length (temperature width) of the line-segment N1–N2 is equivalent to the "half width (° C.)" as used in the specification.

When the endothermic peak curve of a polypropylene fiber has two endothermic peaks (double peak) as illustrated in (b) of FIG. 1 or has three or more endothermic peaks, the half width is determined as follows. When the top of the highest endothermic peak is defined as X; the intersection point of the perpendicular line from the top X to the temperature axis and the baseline of the endothermic peak is defined as Y; the point which bisects the line-segment X-Y is defined as M; and among the intersection points of a straight line parallel to the temperature axis through M and the endothermic curve, the intersection point at the lowest temperature is defined as N1 and the intersection at the highest temperature is defined as N2, the length (temperature width) of the line-segment N1–N2 is equivalent to the "half width (C)" as used in the specification. In this case, the half width (° C.) generally is broad.

Then, in the endothermic peak curve, an area surrounded by the baseline of the endothermic peak (see FIG. 2) and the endothermic peak curve above the baseline is equivalent to the "melt enthalpy change (ΔH)" as used in the specification.

When the crystal formation in a polypropylene fiber is insufficient, another endothermic peak or exothermic peak may newly appear due to, for example, the rearrangement of the crystals at the time of DSC measurement, resulting in a complicated DSC curve. Further, when the crystal formation in a polypropylene fiber is insufficient, the endothermic peak or exothermic peak may appear or disappear, resulting in that the endothermic peak curve may change even in the case of using the same sample, depending on the differences in the temperature elevation rate at the time of DSC measurement.

In contrast, among the polypropylene fibers of the present invention, with respect to the polypropylene fibers (polypropylene fiber A, polypropylene fiber C) having specific DSC properties such that "the endothermic peak shape by DSC measurement is a single shape having a half width of 10° C. or lower and the melt enthalpy change (ΔH) is 125 J/g or more", the endothermic peak curve is sharp and large single peak shape having only one endothermic peak and has a high melt enthalpy change (ΔH) in the range of a temperature elevation rate of 1 to 50° C./min. at the time of DSC measurement due to the DSC properties even when the temperature elevation rate differs. This verifies that, among the polypropylene fibers of the present invention, the polypropylene fiber having the above-mentioned DSC properties has uniform and high crystallinity, and as a result high heat resistance.

When the melt enthalpy change (ΔH) of a polypropylene fiber is lower than 125 J/g, the heat resistance may become insufficient.

Note that even in the case of a polypropylene fiber not having a requirement such that "the endothermic peak shape by DSC measurement is a single shape having a half width of 10° C. or lower and the melt enthalpy change ΔH is 125 J/g or more", the polypropylene fiber (polypropylene fiber B) of the present invention having the properties of "containing polypropylene having an IPF of 94% or more; having a single fiber fineness of 0.1 to 3 dtex; having a fiber strength of 7 cN/dtex or more; and having, on the surface, irregularities having an average interval of 6.5 to 20 μm and an average height of 0.35 to 1 μm as a result of alternate presence of a protruded portion having a large diameter and a non-protruded portion having a small diameter along its fiber axis" can form a hydraulic product, a composite material, etc., which are excellent in mechanical properties, such as tensile strength, impact resistance, modulus of elasticity in bending, and bending strength, due to the above-mentioned specific irregularities on the fiber surface. This is because when the polypropylene fiber (polypropylene fiber B) of the present invention is incorporated in a hydraulic material, an organic polymer, etc., adhesiveness with the hydraulic material or the organic polymer matrix is improved due to a high water retention rate, anchoring effect, engagement effect, etc., based on the irregularities as described later. When the polypropylene fiber is used for the production of a rope, a rope having a high strength can be formed.

When the melt enthalpy change (ΔH) of a polypropylene fiber is higher, heat resistance becomes higher. However, a polypropylene fiber exceeding 165 J/g is difficult to produce unless the production rate is sharply reduced, and moreover for the production of such a polypropylene fiber, polypropylene whose IPF is substantially 100% needs to be used. Thus, the effectiveness is low in terms of industrial aspect.

In view of the above-mentioned respects, the polypropylene fiber of the present invention preferably has a melt enthalpy change (ΔH) of 125 to 165 J/g, more preferably 130 to 165 J/g, still more preferably 135 to 165 J/g, and yet still more preferably 140 to 165 J/g.

The fiber fineness (single fiber fineness) of the polypropylene fiber of the present invention is not particularly limited. From the viewpoints of easiness of production at the time of producing a polypropylene fiber (especially, easiness of drawing), durability, etc., the fiber fineness (single fiber fineness) of polypropylene fiber is generally preferably 0.01 to 500 dtex, more preferably 0.05 to 50 dtex, and still more preferably 0.1 to 5 dtex.

When a polypropylene fiber whose fiber fineness (single fiber fineness) is extremely low is used for a structure or the like or after produced, melting, yarn breakage, and the like of the polypropylene fiber arise, sometimes resulting in degradation, insufficient strength, etc., of the structure. In contrast, when the single fiber fineness of polypropylene fiber is extremely large, the drawing property for obtaining a polypropylene fiber decrease. Thus, a polypropylene fiber which has high strength and which has been highly crystallized may not be obtained. Moreover, when the fiber fineness of polypropylene fiber is extremely large, a woven or knitted fabric, a nonwoven fabric, a net, etc., may be difficult to produce.

The present invention encompasses the polypropylene fibers (polypropylene fiber B, polypropylene fiber C) having properties such that "a single fiber fineness of 0.1 to 3 dtex; and irregularities are formed on the surface, the irregularities which have an average interval of 6.5 to 20 μm and an average height of 0.35 to 1 μm as a result of alternate presence of a protruded portion having a large diameter and a non-protruded portion having a small diameter along its fiber axis" besides the property of having a fiber strength of 7 cN/dtex or more or besides the property such that the fiber strength is 7 cN/dtex or more and the above-mentioned DSC properties defined in the present invention such that "the endothermic peak shape by DSC measurement is a single shape having a half width of 10° C. or lower and the melt enthalpy change (ΔH) is 125 J/g or more".

With respect to the polypropylene fiber having the above-mentioned specific irregular properties of the fiber surface besides the property of having a fiber strength of 7 cN/dtex or more, or besides the property of having a fiber strength of 7 cN/dtex or more and the above-mentioned specific DSC properties, in order to smoothly produce the polypropylene fiber (polypropylene fiber B, polypropylene fiber C) having the irregular properties of the fiber surface, the single fiber fineness of polypropylene fiber is preferably 0.1 to 3 dtex, more preferably 0.2 to 2.5 dtex, and more preferably 0.3 to 2.4 dtex.

In the polypropylene fiber having the above-mentioned irregular properties of the fiber surface, when the fiber fineness of polypropylene fiber is lower than 0.1 dtex, spinning is carried out using a spinneret having an extremely large number of spinning holes in order to maintain mass productivity. Thus, in order to sufficiently secure the interval between the spinning holes of the spinneret, a facility needs to be drastically reformed (e.g., enlargement of the scale of a spinning device). Moreover, since the fiber fineness is low, a yarn breakage trouble and generation of fluffs are likely to occur in a drawing process. In contrast, when the fiber fineness of polypropylene fiber exceeds 3 dtex, the specific irregularities described above are hard to develop on the outer circumference of the fiber, and thus the specific surface area of the fiber becomes small. Therefore, sufficient water retentivity cannot be secured. Moreover, the drawing property decrease, which makes it impossible to achieve a sufficient fiber strength.

It is preferable for the polypropylene fiber having the above-mentioned specific irregular properties of the fiber surface to have a fiber fineness (single fiber fineness) of preferably 0.2 to 2.5 dtex, and more preferably 0.3 to 2.4 dtex.

Figure 3:
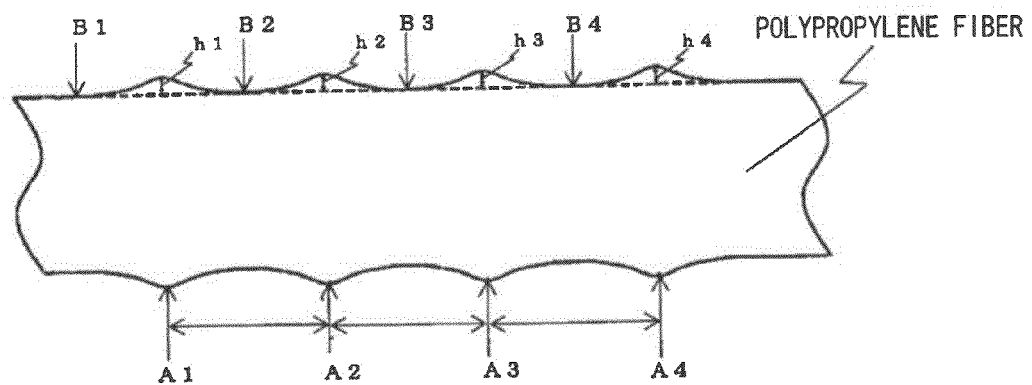
FIG. 3 is a view schematically illustrating irregularities of a polypropylene fiber and illustrating how to determine an average interval and an average height of the irregularities.

Here, the "polypropylene fiber has, on the fiber surface, irregularities as a result of alternate presence of a protruded portion having a large diameter and a non-protruded portion having a small diameter along its fiber axis" as used in the specification refers to that, as schematically illustrated in FIG. 3, the polypropylene fiber does not have a uniform diameter along the longitudinal direction; and protruded portions (convex portions) having a large diameter (A1, A2, A3, A4, ..., in FIG. 3) and non-protruded portions (concave portions) having a smaller diameter (B1, B2, B3, B4, ..., in FIG. 3) are alternately formed along the fiber axis (longitudinal direction of fiber), whereby the fiber surface becomes uneven.

Then, the above-mentioned "average interval" as used in the specification refers to an average value of intervals (distances) between adjacent two protruded portions (convex portions) (the lengths of A1-A2, A2-A3, A3-A4, ..., in FIG. 3) among many irregularities (protruded portions and non-protruded portions) formed along the fiber axis.

Moreover, the above-mentioned "average height" refers to an average value of the lengths of perpendicular lines from the top (h1, h2, h3, h4, ..., in FIG. 3) of each of the protruded portions (convex portions) between two adjacent non-protruded portions (concave portions) among many irregularities (protruded portions and non-protruded portions) formed along the fiber axis to the corresponding imaginary straight lines connecting the minimum diameter portions of the two adjacent non-protruded portions (concave portions) (a straight line connecting B1 and B2, a straight line connecting B2 and B3, a straight line connecting B3 and B4, ..., in FIG. 3).

The average interval and average height of the above-mentioned irregularities formed along the fiber axis of polypropylene fiber can be determined from a photograph of polypropylene fiber taken using a scanning electron microscopy or the like. The above-mentioned average interval and average height of the irregularities in the specification refer to values determined by methods described in Examples described later.

The polypropylene fiber (polypropylene fiber B, polypropylene fiber C) of the present invention having, on the fiber surface, the above-mentioned irregularities having an average interval of 6.5 to 20 μm and an average height of 0.35 to 1 μm along the fiber axis generally has a water retention rate as high as 10% or more; has a high compatibility with a matrix, such as cement, when blended in the matrix; and shows a high reinforcement action. Further, due to the anchoring effect and engagement action resulting from the specific irregular structure of the fiber surface, also when the polypropylene fiber (polypropylene fiber B, polypropylene fiber C) of the present invention is blended in another matrix, such as an organic polymer, adhesiveness with the matrix is improved.

Note that the water retention rate of polypropylene fiber as used in the specification refers to a water retention rate measured by methods described in Examples described later.

In the polypropylene fiber having irregularities on the surface, when the above-mentioned average interval of irregularities is lower than 6.5 μm and/or when the average height thereof is lower than 0.35 μm, the irregularities on the fiber surface become excessively minute, which decreases the water retention rate, anchoring effect, engagement effect, etc. A polypropylene fiber having irregularities having an average interval exceeding 20 μm and/or an average height exceeding 1 μm cannot be produced unless the production rate of the polypropylene fiber is sharply reduced. Moreover, for the production of such a polypropylene fiber, polypropylene whose IPF is substantially 100% needs to be used, which is poor in practicability.

In the polypropylene fiber of the present invention having irregularities on the surface, it is preferable that the average interval of the irregularities formed along the fiber axis direction be 6.6 to 20 μm, and particularly 6.8 to 20 μm and the average height thereof be 0.40 to 1 μm, and particularly 0.45 to 1 μm.

It is preferable for the polypropylene fiber of the present invention to have requirements such that "the single fiber fineness is 0.1 to 3 dtex"; "the endothermic peak shape by differential scanning calorimetry (DSC) measurement is a single shape having a half width of 10° C. or lower and the melt enthalpy change (ΔH) is 125 J/g or more"; and "irregularities are formed on the surface, the irregularities which have an average interval of 6.5 to 20 μm and an average height of 0.35 to 1 μm as a result of alternate presence of a protruded portion having a large diameter and a non-protruded portion having a small diameter along its fiber axis" besides the requirements such that "polypropylene fiber contains polypropylene having an isotactic pentad fraction (IPF) of 94% or more and the fiber strength is 7 cN/dtex or more".

The shape (horizontal cross-sectional shape) of the polypropylene fiber of the present invention is not particularly limited, and may be a solid circular cross-sectional shape or other irregular cross-sectional shapes. In the case where the horizontal cross-sectional shape of fiber is an irregular cross-sectional shape, a flat shape, a cross shape, a Y shape, a T shape, a V shape, a star shape, a multi-leaf shape, an array shape, and a hollow shape can be mentioned as a specific example of the irregular cross-sectional shape. When a polypropylene fiber is used as a reinforcement material, by forming the polypropylene fiber into an irregular cross-sectional shape having a large surface area, and particularly a multi-leaf shape or the like, adhesive strength with a matrix becomes high, whereby, for example, a fiber-reinforced molded product having a high strength can be obtained.

The polypropylene fiber of the present invention can contain one or two or more kinds of a thermostabilizer, a UV absorber, an antioxidant, a colorant, a lubricant, a mold release agent, a filler, an antistatic agent, etc., insofar as the object of the present invention is not hindered. The specific gravity of polypropylene fiber is generally lower than that of water and floats on water as it is. Thus, in order to disperse the polypropylene fiber of the present invention in water, the specific gravity can be suitably adjusted by blending, in a fiber, calcium carbonate, barium sulfate, titanium oxide, zinc oxide, alumina, silica, potassium methacrylate, and the like so as to prevent the polypropylene fiber from floating.

There is no particular limitation on methods of producing the polypropylene fiber of the present invention. The polypropylene fiber of the present invention may be produced by any methods insofar as the following polypropylene fibers of the present invention can be produced: the polypropylene fiber (polypropylene fiber A, polypropylene fiber C) having the above-mentioned DSC properties such that "the endothermic peak shape by DSC measurement is a single shape having a half width of 10° C. or lower and the melt enthalpy change (ΔH) is 125 J/g or more" besides the property such that the fiber strength is 7 cN/dtex or more; the polypropylene fiber (polypropylene fiber B, polypropylene fiber C) having the above-mentioned single fiber fineness and irregular properties of the fiber surface (properties such that the single fiber fineness is 0.1 to 3 dtex and irregularities are formed on the surface, the irregularities which have an average interval of 6.5 to 20 μm and an average height of 0.35 to 1 μm as a result of alternate presence of a protruded portion having a large diameter and a non-protruded portion having a small diameter along its fiber axis) besides the above-mentioned fiber strength; or the polypropylene fiber (polypropylene fiber C) having the above-mentioned fiber strength, DSC properties, single fiber fineness, and irregular properties of the fiber surface.

Of those, the polypropylene fiber of the present invention can be smoothly produced by a method which involves: subjecting polypropylene having an IPF of 94% or more to melt spinning to produce a polypropylene undrawn fiber (undrawn yarn); cooling the polypropylene undrawn fiber to solidify; and then subjecting the cooled and solidified undrawn polypropylene fiber to pre-drawing and post-drawing under specific conditions described later.

In production of the polypropylene fiber of the present invention, polypropylene is used whose melt flow rate (MFR) measured according to JIS K 7210 under the conditions of a temperature of 230° C., a load of 2.16 kg, and time of 10 minutes is preferably 5 to 70 g, more preferably 10 to 50 g, and still more preferably 15 to 40 g from the viewpoints that the melt spinning property, drawing property, etc., at the time of fiber production become excellent and a polypropylene fiber having the above-mentioned specific properties defined in the present invention can be smoothly obtained.

In production of a polypropylene undrawn fiber, a method is preferably employed which involves subjecting polypropylene having an IPF of 94% or more to melt spinning at a spinning rate of 200 to 3,500 m/min., and particularly 300 to 2,000 m/min., and then cooling the resultant to solidify.

The melt spinning of polypropylene and the cooling and solidification of polypropylene fiber which has been subjected to melt spinning can be effected by a usual method. In general, a method is employed which involves subjecting polypropylene to melt kneading at 200 to 300° C.; discharging the resultant from a spinneret having a temperature of 220 to 280° C.; and then spraying a cooling gas (air or the like) having a temperature of 5 to 50° C. to the resultant for cooling solidification.

The single fiber fineness of undrawn polypropylene fiber is not particularly limited, and can be determined in accordance with a drawing magnification in a drawing process, application of a finally obtained polypropylene fiber, etc. In general, it is preferable that the single fiber fineness of undrawn polypropylene fiber be 0.3 to 90 dtex, and particularly 1 to 60 dtex from the viewpoints of easiness of drawing, strength, etc.

When melt spinning is performed at a low spinning rate (when the spinning rate is generally about 200 to 1,000 m/min.) in production of the polypropylene fiber of the present invention, a desired polypropylene fiber having a high heat resistance and high strength, and particularly a polypropylene fiber in which the endothermic peak shape by differential scanning calorimetry (DSC) measurement is a single shape having a half width of 10° C. or lower; the melt enthalpy change (ΔH) is 125 J/g or more; and the fiber strength is 7 cN/dtex or more, can be produced by drawing a polypropylene undrawn fiber (undrawn yarn) obtained by cooling solidification after melt spinning at a high ratio (generally, the total drawing magnification is 5 to 20 times) in the next drawing process.

In contrast, in the case where melt spinning is performed at a high spinning rate (when the spinning rate is generally about 1,000 to 3,500 m/min.), even when the drawing magnification at the time of drawing the polypropylene undrawn fiber (undrawn yarn) obtained by carrying out cooling solidification after melt spinning is low (generally, the total drawing magnification is 3.9 to 7 times), the orientation in the step of cooling the fiber, which has been subjected to melt spinning, to solidify becomes high. As a result, a polypropylene fiber can be produced excellent in heat resistance and strength which has the above-mentioned properties obtained by differential scanning calorimetry (DSC) measurement and a fiber strength of 7 cN/dtex or more.

The cooled and solidified polypropylene undrawn fiber (undrawn yarn) may be successively subjected to drawing treatment as it is without winding or may be once wound and then subjected to drawing treatment while winding out. Of those, it is preferable to once wind the cooled and solidified polypropylene undrawn fiber and then subject the cooled and solidified polypropylene undrawn fiber to successive drawing treatment while winding out in terms of easiness of control and management of drawing conditions.

Subsequently, the cooled and solidified polypropylene undrawn fiber (undrawn yarn) is subjected to pre-drawing at a temperature of 120 to 150° C. and a drawing magnification of 3 to 10 times, and then subjected to post-drawing at a drawing magnification of 1.2 to 3.0 times under conditions of a temperature of 170 to 190° C., a deformation rate of 1.5 to 15 times/min., and a draw tension of 1.0 to 2.5 cN/dtex in such a manner that the total drawing magnification (total drawing magnification of the pre-drawing and the post-drawing) is 3.9 to 20, to thereby produce a polypropylene fiber.

It is preferable to perform the pre-drawing and post-drawing using a hot-air oven or a heat plate in terms of smooth drawing treatment. Both the pre-drawing and the post-drawing may be performed using a hot-air oven, both the pre-drawing and the post-drawing may be performed using a heat plate, the pre-drawing may be performed using a hot-air oven and the post-drawing may be performed using a heat plate, or the pre-drawing may be performed using a heat plate and the post-drawing may be performed using a hot-air oven.

When the pre-drawing and/or the post-drawing are/is performed using a hot-air oven, the above-mentioned temperature at the time of the pre-drawing and the above-mentioned temperature at the time of the post-drawing in the present invention refer to an ambient temperature of a hot-air oven. When the pre-drawing and/or the post-drawing are/is performed using a heat plate, the above-mentioned temperature at the time of the pre-drawing and the above-mentioned temperature at the time of the post-drawing in the present invention refer to the temperature of a heat plate.

The pre-drawing of the cooled and solidified polypropylene undrawn fiber (undrawn yarn) may be performed in a single step or in many steps, and generally preferably performed in 1 to 3 steps.

Further, the post-drawing of a polypropylene drawn fiber (drawn yarn) which has been subjected to the pre-drawing may be performed in a single step or in many steps, and generally preferably performed in 1 to 5 steps.

When performing the drawing treatment, a method may be employed which involves successively subjecting the polypropylene drawn fiber (drawn yarn) obtained by performing the pre-drawing to the post-drawing as it is without winding. Or, a method may be employed which involves cooling (generally about room temperature) the polypropylene drawn fiber (drawn yarn) obtained by performing the pre-drawing, winding the resulting polypropylene drawn fiber, and then post-drawing the polypropylene drawn fiber winding while winding out. Of those, the latter method which involves once winding the polypropylene drawn fiber (drawn yarn) obtained by performing the pre-drawing, and then post-drawing the polypropylene drawn fiber while winding out is preferable from the viewpoint that the desired polypropylene fiber can be more smoothly obtained.

It is preferable to perform the pre-drawing in a single step or many steps at a drawing magnification of 3 to 10 times, and particularly 3 to 5 times while introducing the cooled and solidified polypropylene undrawn fiber (undrawn yarn) into a hot-air oven having a temperature (ambient temperature) of 120 to 150° C., and particularly 125 to 140° C. or bringing the cooled and solidified polypropylene undrawn fiber (undrawn yarn) into contact with a heat plate having a temperature of 120 to 150° C., and particularly 125 to 140° C.

Further, it is preferable to perform the post-drawing in a single step or many steps at a drawing magnification of 1.2 to 3.0 times, and particularly 1.3 to 2.5 times, while introducing the polypropylene drawn fiber (drawn yarn) obtained by pre-drawing under the above-mentioned conditions into a hot-air oven having a temperature (ambient temperature) of 170 to 190° C., particularly 170 to 185° C., and more particularly 170 to 180° C. or bringing the polypropylene drawn fiber (drawn yarn) into contact with a heat plate having a temperature of 170 to 190° C., particularly 170 to 185° C., and more particularly 170 to 180° C.

When the post-drawing is performed using a hot-air oven or a drawing plate, it is preferable to perform the post-drawing by adjusting the ambient temperature of a hot-air oven or the temperature of the drawing plate to a temperature higher by at least 10° C. than the endothermic initiation temperature in the DSC curve of polypropylene fiber immediately before performing the post-drawing.

The total drawing magnification of the pre-drawing and the post-drawing is preferably 3.9 to 20 times, more preferably 4.5 to 11 times, and still more preferably 4.7 to 10.5 times.

Moreover, when a melt spinning rate for producing a polypropylene undrawn fiber (undrawn yarn) is adjusted to A (m/min.) and the total drawing magnification after performing the above-mentioned pre-drawing and the post-drawing is adjusted to B (times), the melt spinning of polypropylene and the above-mentioned pre-drawing and post-drawing are performed in such a manner that the A×B value falls under the range of 3,000 to 17,000 (m·times/min.), particularly 3,500 to 15,000 (m·times/min.), the desired polypropylene fiber can be smoothly produced.

Here, the above-mentioned drawing magnification in the pre-drawing refers to a value obtained by dividing the length of the fiber (yarn) immediately after discharged from the pre-drawing step by the length of the undrawn fiber (undrawn yarn) which has been introduced into the pre-drawing step. Moreover, the above-mentioned drawing magnification in the post-drawing refers to a value obtained by dividing the length of the fiber (yarn) immediately after discharged from the post-drawing step by the length of the fiber (yarn) which has been introduced into the post-drawing step.

Moreover, the total drawing magnification of the pre-drawing and the post-drawing described above refers to a value obtained by dividing the length of the fiber (yarn) immediately after discharged from the post-drawing step by the length of the undrawn fiber (undrawn yarn) which has been introduced into the pre-drawing step.

The post-drawing is performed at the above-mentioned temperature (170 to 190° C.) and a drawing magnification (1.2 to 3.0 times) under the conditions of a deformation rate of 1.5 to 15 times/min. and a draw tension of 1.0 to 2.5 cN/dtex. The desired polypropylene fiber can be obtained by adopting such post-drawing conditions.

The deformation rate at the time of the post-drawing is preferably 1.6 to 12 times/min., and more preferably 1.7 to 10 times/min.

Moreover, the draw tension at the time of the post-drawing is preferably 1.1 to 2.5 cN/dtex, and more preferably 1.3 to 2.5 cN/dtex.

Here, the above-mentioned deformation rate in the post-drawing refers to a value obtained by dividing the drawing magnification (times) in the post-drawing by time (minute) required for the post-drawing (a period of time while the fiber (yarn) has existed in a hot-air passage when the post-drawing is performed in a hot-air oven, and a period of time while the fiber (yarn) has contacted a drawing plate when the post-drawing is performed in the drawing plate). When the post-drawing is performed in many steps, the above-mentioned deformation rate in the post-drawing refers to a value obtained by dividing the final drawing magnification (total drawing magnification) in the post-drawing by a draw treatment time required for the post-drawing.

Moreover, with respect to the above-mentioned draw tension in the post-drawing, the tension of yarn immediately after the final drawing in the post-drawing is measured using a tension meter.

Moreover, in the present invention, the above-mentioned polypropylene fiber may be subjected to thermosetting or shrinkage treatment after drawn under the above-mentioned conditions. The treatment temperature and shrinkage ratio in that case are not particularly limited insofar as the effect of the present invention is hindered.

According to a method which involves subjecting polypropylene having an isotactic pentad fraction (IPF) of 94% or more to melt spinning, cooling the resultant to solidify so that a polypropylene undrawn fiber is produced, subjecting the polypropylene undrawn fiber to the pre-drawing under the above-mentioned conditions, and then subjecting the resultant to the post-drawing under the above-mentioned conditions, a polypropylene fiber excellent in heat resistance and strength, and particularly the polypropylene fibers (polypropylene fiber A, polypropylene fiber C) of the present invention which are excellent in heat resistance and strength and have properties such that the endothermic peak shape by DSC is a single shape having a half width of 10° C. or lower, the melt enthalpy change ($\Delta H$) is 125 J/g or more, and the fiber fineness is 7 cN/dtex or more can be smoothly produced.

Further, when polypropylene having an isotactic pentad fraction (IPF) of 94% or more is subjected to melt spinning; the resultant is cooled to solidify so that a polypropylene undrawn fiber is produced; the polypropylene undrawn fiber is subjected to the pre-drawing under the above-mentioned conditions; and then the resultant is further subjected to the post-drawing under the above-mentioned conditions, the single fiber fineness of the polypropylene undrawn fiber supplied to the pre-drawing step, the drawing magnification in the pre-drawing and/or the post-drawing, etc., are adjusted in such a manner that a polypropylene fiber having a final single fiber fineness of 3 dtex or lower, and particularly 0.1 to 3 dtex can be obtained. In such a case, it is possible to produce the polypropylene fibers (polypropylene fiber B, polypropylene fiber C; particularly polypropylene fiber C) of the present invention having a specific irregular structure of the fiber surface such that "irregularities are formed on the surface, the irregularities which have an average interval of 6.5 to 20 µm and an average height of 0.35 to 1 µm as a result of alternate presence of a protruded portion having a large diameter and a non-protruded portion having a small diameter along its fiber axis" besides the above-mentioned property such that the fiber strength is 7 cN/dtex or more and the above-mentioned specific DSC properties (the endothermic peak shape by DSC is a single shape having a half width of 10° C. or lower and the melt enthalpy change ($\Delta H$) is 125 J/g or more). The polypropylene fibers are excellent in heat resistance and strength. Moreover, due to the above-mentioned specific irregularities on the surface, the polypropylene fibers are excellent in water retentivity and generally have a water retention rate as high as 10% or more.

The polypropylene fiber of the present invention may be used as it is without subjecting the same to surface treatment or may be subjected to suitable surface treatment for the purpose of improvement in compatibility with various substances, antistatic, stabilization of a treatment agent, etc. Specific examples of the surface treatment agent used in the polypropylene fiber of the present invention, but not limited, include polyoxyethylene softanol, a fatty acid potassium soap, potassium alkyl phosphate, dialkyl thiodipropionate, sodium di-2-ethylhexylsulfosuccinate, polyethylene glycol fatty ester, potassium polyoxyethylene decyl ether phosphate, polyoxyethylene castor oil ether, sodium alkane sulfonate, isooctyl palmitate, isooctyl stearate, potassium isocetyl phosphate, palm fatty amide, oleyl alcohol, polyoxyethylene alkyl ether, sodium dioctylsulfosuccinate, amine salts of polyoxyethylene decyl ether phosphate, and polyethylene glycol palm fatty ester.

Moreover, the polypropylene fiber of the present invention may be cut into a suitable length. When surface treatment is performed using the above-mentioned surface treatment agent, the polypropylene fiber may be cut after drying the fiber to evaporate the moisture or may be cut without drying. Moreover, there is no particular limitation on the adherend amount and concentration of the surface treatment agent and water. Moreover, there is no limitation on transportation methods, packing methods, and packing forms at the time of commercializing the cut polypropylene fiber.

The polypropylene fiber of the present invention can be formed into a monofilament, a multifilament, a sliver, a short fiber, a twisted yarn (spun yarn), a false-twisted yarn, an interlaced yarn, and other processed yarns for use.

Then, due to excellent heat resistance, the polypropylene fiber of the present invention and yarn containing the same can be used for a cord and a rope. Using the cod and rope, a sling rope, a fishing net, a curing net, a golf ball net, etc., which are excellent in wear resistance and lightweight property can be produced.

Further, the polypropylene fiber of the present invention can be effectively used in production of fiber structures such as a woven or knitted fabric, a nonwoven fabric, a net-like article, and paper.

The polypropylene fiber of the present invention or a fiber structure formed using the fiber can be effectively used also as a fiber reinforcement material in a fiber-reinforced plastic molded product, a fiber-reinforced rubber molded product, fiber-reinforced hydraulic substance molded products (concrete, mortar, slate, tile, etc.), etc.

Therefore, the present invention encompasses a hydraulic composition containing the above-mentioned polypropylene fiber (any of the polypropylene fibers A to C) of the present invention and a hydraulic product containing the hydraulic composition, a rope structure formed using the polypropylene fiber (any of the polypropylene fibers A to C) of the present invention, a sheet-shaped fiber structure containing the polypropylene fiber (any of the polypropylene fibers A to C) of the present invention, a composite material containing an organic polymer and the polypropylene fiber (any of the polypropylene fibers A to C) of the present invention, and a molded product containing the composite material. Hereinafter, those will be described.

<<Hydraulic Composition and Hydraulic Product>>

With respect to the hydraulic composition of the present invention containing the above-mentioned polypropylene fiber of the present invention, any inorganic substances which react with water to cure can be used as a hydraulic substance without particular limitation.

Preferable examples of the hydraulic substance include various Portland cements, high-early-strength cement, moderate cement, Portland blast furnace cement, alumina cement, a blended cement in which blast furnace slag, fly ash, silica, etc., are mixed in the above-mentioned cements, gypsum, water-granulated slag, calcium hydroxide, magnesium carbonate, and calcium silicate. The hydraulic composition of the present invention may contain only one or two or more kinds of the above-mentioned hydraulic substances. Of those, it is preferable for the hydraulic composition of the present invention to at least contain cement as a hydraulic substance.

The content of the hydraulic substance in the hydraulic composition of the present invention is not particularly limited, and can be determined in accordance with the type of the hydraulic substance, the type of other materials used with the hydraulic substance, the type and application of a hydraulic product obtained by water curing the hydraulic substance, etc. In general, the hydraulic composition of the present invention contains the hydraulic substance preferably in a proportion of 10 to 99 mass %, more preferably 20 to 98 mass %, and still more preferably 30 to 97 mass % based on the total mass of the hydraulic composition before adding water.

The hydraulic composition of the present invention forms a hydraulic product having high strength because the polypropylene fiber of the present invention to be blended in the composition has a fiber strength as high as 7 cN/dtex or more, and preferably 9 to 13 cN/dtex. When the polypropylene fiber to be blended in the hydraulic composition having a fiber strength lower than 7 cN/dtex is blended in a hydraulic substance, such as cement, to produce a hydraulic composition, and then the hydraulic composition is cured to thereby produce a hydraulic product, sufficient reinforcement effect cannot be demonstrated in some cases.

With respect to the hydraulic composition of the present invention containing the polypropylene fibers of the present invention (polypropylene fiber A, polypropylene fiber C) having the above-mentioned DSC properties, that is, "the endothermic peak shape by DSC measurement is a single shape having a half width of 10° C. or lower and the melt enthalpy change ($\Delta H$) is 125 J/g or more" besides the above-mentioned fiber strength, the polypropylene fiber is excellent in heat resistance. Therefore, even when the hydraulic composition is subjected to autoclave curing at a high temperature exceeding 100° C., particularly 150° C. or higher, and more particularly 170° C. or higher, degradation or reduction in strength of polypropylene fiber do not occur. Thus, by performing autoclave curing at a high temperature in a short period of time, the hydraulic product can be produced with high productivity in a shortened period of time.

However, in the case where the hydraulic composition of the present invention is a hydraulic composition for producing a hydraulic product by curing at room temperature or a low temperature of 100° C. or lower, even in the case of a polypropylene fiber not having the above-mentioned DSC properties, a hydraulic product having a sufficiently high strength can be also produced by blending, in the hydraulic substance, the polypropylene fiber (polypropylene fiber B) of the present invention having the properties of "including polypropylene having an IPF of 94% or more; having a single fiber fineness of 0.1 to 3 dtex; having a fiber strength of 7 cN/dtex or more; and having, on the surface, irregularities having an average interval of 6.5 to 20 μm and an average height of 0.35 to 1 μm as a result of alternate presence of a protruded portion having a large diameter and a non-protruded portion having a small diameter along its fiber axis", to thereby produce a hydraulic product.

There is no limitation on the single fiber fineness of the polypropylene fiber of the present invention to be blended in the hydraulic substance. In terms of applicability to the hydraulic composition and durability, the single fiber fineness of polypropylene fiber is generally preferably 0.01 to 500 dtex, more preferably 0.05 to 50 dtex, and still more preferably 0.1 to 5 dtex.

When a polypropylene fiber having an extremely low single fiber fineness is blended in a hydraulic substance to produce a hydraulic composition, melting and yarn breakage occurs due to friction at the time of mixing, resulting in that the reinforcement effect is not demonstrated in some cases. In contrast, when the single fiber fineness of a polypropylene fiber is extremely high, the drawing physical properties for obtaining a polypropylene fiber decrease as described above, resulting in that a polypropylene fiber which has high strength and has been highly crystallized is not obtained in some cases.

Moreover, the hydraulic composition of the present invention encompasses, as a preferable aspect, a hydraulic composition including "the polypropylene fiber of the present invention (polypropylene fiber C) having the properties of: having a fiber strength of 7 cN/dtex or more; the above-mentioned DSC properties defined in the present invention (the endothermic peak shape by DSC measurement is a single shape having a half width of 10° C. or lower and the melt enthalpy change ($\Delta H$) is 125 J/g or more); and further having the single fiber fineness of 0.1 to 3 dtex and irregularities formed on the surface, the irregularities which have an average interval of 6.5 to 20 μm and an average height of 0.35 to 1 μm as a result of alternate presence of a protruded portion having a large diameter and a non-protruded portion having a small diameter along its fiber axis".

The polypropylene fiber of the present invention having the above-mentioned specific irregular properties has high water retentivity due to the specific irregular properties, and generally has a water retention rate of 10% or more. Thus, the polypropylene fiber of the present invention has high compatibility with a hydraulic substance such as cement, and a hydraulic composition containing the polypropylene fiber forms a hydraulic product having high strength.

When a polypropylene fiber having a low water retention rate is blended in a hydraulic substance such as cement, the compatibility with the hydraulic substance decreases, and thus the fiber is not sufficiently adhered to the hydraulic substance. Thus, the mechanical strength of the hydraulic product to be obtained may become insufficient.

With respect to the polypropylene fiber of the present invention to be blended in the hydraulic composition of the present invention, the water retention rate is preferably 10.5% or more, more preferably 11 to 50%, and still more preferably 12 to 50%. In the case of a polypropylene fiber having a water retention rate exceeding 50%, irregularities on the fiber surface need to be considerably enlarged. Thus, such a polypropylene fiber is, in actual practice, difficult to produce with high productivity.

The shape (horizontal cross-sectional shape) of the polypropylene fiber of the present invention to be blended in a hydraulic composition is not particularly limited. The polypropylene fiber of the present invention can be formed into a solid circular cross-sectional shape and the above-mentioned various irregular cross-sectional shapes. When the horizontal cross-sectional shape of the polypropylene fiber has an irregular cross-sectional shape giving a large surface area, particularly a multi-leaf shape or the like, adhesion strength with a hydraulic substance becomes high, whereby a hydraulic product having a high strength can be obtained.

Moreover, by adding, to a polypropylene fiber, a specific-gravity increasing agent such as calcium carbonate, barium sulfate, titanium oxide, zinc oxide, alumina, silica, and potassium methacrylate, to thereby increase the specific gravity of polypropylene fiber whose specific gravity is originally low. Thus, the polypropylene fiber of the present invention can be uniformly dispersed in a hydraulic composition.

Moreover, the polypropylene fiber of the present invention to be blended in a hydraulic substance maybe subjected to surface treatment so as to increase the compatibility with a hydraulic substance. For example, substances capable of being used in surface treatment of the polypropylene fiber of the present invention are one member or two or more members of polyoxyethylene isophthanol, fatty-acid-potassium soap, and other compounds which are mentioned in the above.

The fiber length of polypropylene fiber at the time of mixing the polypropylene fiber of the present invention in a hydraulic substance to thereby prepare a hydraulic composition can be determined according to the type of hydraulic substance, the type of another material used with a hydraulic substance, the blending composition of hydraulic composition, and the type and intended use of a hydraulic product obtained by water curing a hydraulic composition. However, in terms of the reinforcement effect by a polypropylene fiber, uniform mixability with a hydraulic substance or another material, fiber productivity, etc., the fiber length of polypropylene fiber is preferably 1 to 30 mm, more preferably 2 to 25 mm, and still more preferably 3 to 20 mm.

When the fiber length of polypropylene fiber is extremely short, the reinforcement action is likely to become insufficient. In contrast, when the fiber length of polypropylene fiber is extremely long, such a polypropylene fiber is not uniformly mixed and dispersed in a hydraulic composition, and moreover, for example, clogging of piping is likely to occur.

The content of polypropylene fiber of the present invention in a hydraulic composition can be determined according to the type of hydraulic substance, the type of another material used with a hydraulic substance, the blending composition of hydraulic composition, and the type and intended use of a hydraulic product obtained by water curing a hydraulic composition. However, the content of polypropylene fiber is preferably 0.05 to 10 mass %, and more preferably 0.1 to 8 mass % based on the mass of a hydraulic composition before adding water (total mass of hydraulic composition before adding water, including a polypropylene fiber) in terms of the reinforcement effect by a polypropylene fiber, process passing property, cost, etc.

The hydraulic composition of the present invention can contain, as required, an aggregate, an inorganic filler or an organic filler, and another admixture, which are widely used in a hydraulic composition besides a hydraulic substance and the specific polypropylene fiber of the present invention.

As the aggregate or filler which can be used in the hydraulic composition of the present invention, ballast, crushed sand, river sand, sea sand, mountain sand, powder silica sand, various lightweight aggregates (e.g., glass balloon, Shirasu balloon, and polystyrene beads), calcium carbonate, kaolin, sepiolite, bentonite, attapulgite, mica, Wollastonite, various pulps, etc., can be mentioned. Of those, one or two or more members can be contained in the hydraulic composition of the present invention.

As the pulp, a wide variety of pulps can be used. Specific examples thereof include a needle-leaved tree, broad-leaved tree, Manila hemp, Edgeworthia, paper mulberry, Diplomorphia sikokiana, Salago, mulberry, straw, bamboo, reed, Sabai, Raran grass, esparto, bagasse, sisal, kenaf, linter, banana, and waste paper. The hydraulic composition of the present invention may contain one member or two or more members of bleached or non-bleached pulps among the above-mentioned pulps. The freeness of pulp may be suitably controlled. In that case, as the needle-leaved tree, Taxodiaceae, Pinaceae, Cupressaceae, Araucariaceae, etc., can be mentioned. As the broad-leaved tree, Ulmaceae, Fagaceae, Myrtaceae, Cercidiphyllaceae, Oleaceae, Rutaceae, Betulaceae, Aceraceae, Juglandaceae, Tiliaceae, Araliaceae, Sapotaceae, Celastraceae, Nerium indicum, Verbenaceae, Magnoliaceae, Sterculiaceae, etc., can be mentioned.

Moreover, examples of the above-mentioned another admixture include a water reducing agent, a thickener, a foaming agent, an inflating agent, and a shrinkage reducing agent.

Moreover, the hydraulic composition of the present invention may contain organic fibers other than polypropylene fiber and inorganic fibers if needed.

The aggregate, filler, and the above-mentioned other various materials to be mixed, as required, in the hydraulic substance have an effect of improving the physical properties of a hydraulic product, e.g., improvement in anti-freeze and thawing properties, an effect of inhibiting the invasion of a corrosive substance (various acids such as chlorine, sulfuric acid, etc.), an effect of improving adhesiveness between a polypropylene fiber and a hydraulic substance, an effect of improving the efficiency at the time of producing an uncured molded product and a sheet formed by suitably adjusting the viscosity of suspension, an effect of controlling drying shrinkage of a molded product and a sheet formed product, an effect of developing a strength improving effect of a hydraulic product, and an effect of improving a process passing property and moldability at the time of producing a hydraulic product.

In preparation of the hydraulic composition of the present invention, there is no particular limitation on the amount of a hydraulic substance and other materials other than the above-mentioned specific polypropylene fibers of the present invention (aggregate, filler, another admixture, etc.). The amount thereof maybe suitably adjusted according to: the type of a hydraulic substance; the types of the aggregate, the filler, and another admixture; a method of curing a hydraulic composition; and the type and intended use of a hydraulic product to be obtained by curing a hydraulic composition.

The amount of mixing water in a hydraulic composition may differ according to the type of a hydraulic substance or the type of another material, the amount thereof, and the type of a hydraulic product to be produced, etc. In general, an amount of water to be added is preferably 10 to 10,000 parts by mass, more preferably 15 to 8,000 parts by mass, and particularly preferably 20 to 6,000 parts by mass, based on 100 parts by mass of the total mass of all the materials other than water, which are used for preparation of a hydraulic composition, in terms of a process passing property, strength of a hydraulic product to be obtained, etc.

Various hydraulic products such as concrete, mortar, and slate can be produced using the hydraulic composition of the present invention.

When the hydraulic composition of the present invention is a hydraulic composition for producing slate, the pulps, and, as required, an inorganic filler such as a flocculant and silica stone powder and another material are mixed to Ordinary Portland Cement and another hydraulic substance. Simultaneously, the polypropylene fiber having the above-mentioned properties of the present invention is added in a proportion of preferably 0.05 to 10 mass %, and more preferably 0.1 to 8 mass % based on the mass of hydraulic composition before adding water (total mass of hydraulic composition, including a polypropylene fiber) as described above, and then water is added to the resulting mixture, whereby a hydraulic composition for producing slate can be smoothly obtained. The slate obtained by curing the hydraulic composition is excellent in strength or durability.

The content of each of the hydraulic substance, pulp, flocculant, inorganic filler, etc., and the amount of mixing water in the hydraulic composition for producing slate maybe substantially the same as those in a hydraulic composition for producing an ordinary slate.

When the hydraulic composition of the present invention is a hydraulic composition for producing concrete, the aggregates such as ballast and sand, an inorganic filler, and, as required, another material are mixed in Ordinary Portland Cement and another hydraulic substance. Simultaneously, the polypropylene fiber having the above-mentioned properties of the present invention is added in a proportion of preferably 0.05 to 10 mass %, and more preferably 0.1 to 8 mass based on the mass of hydraulic composition before adding water (total mass of hydraulic composition, including a polypropylene fiber), and then water is added to the resulting mixture, whereby a hydraulic composition for producing concrete can be smoothly obtained. The concrete obtained by curing the hydraulic composition is excellent in strength or durability.

The content of each of the hydraulic substance, pulp, flocculant, inorganic filler, etc., and the amount of mixing water in the hydraulic composition for producing concrete may be substantially the same as those in a hydraulic composition for producing an ordinary concrete.

When the hydraulic composition of the present invention is a hydraulic composition for producing mortar, the inorganic filler such as sand, thickener, water reducing agent, and another material are mixed to Ordinary Portland Cement and another hydraulic substance. Simultaneously, the polypropylene fiber having the above-mentioned properties of the present invention is added in a proportion of preferably 0.01 to 10 mass %, and more preferably 0.1 to 8 mass % based on the mass of hydraulic composition before adding water (total mass of hydraulic composition, including a polypropylene fiber), and then water is added to the resulting mixture, whereby a hydraulic composition for producing mortar can be smoothly obtained. The concrete obtained by curing the hydraulic composition is excellent in strength or durability.

The content of each of the hydraulic substance, inorganic filler such as sand, thickener, water reducing agent, and another material and the amount of mixing water in the hydraulic composition for producing mortar may be substantially the same as those in a hydraulic composition for producing an ordinary mortar.

In preparation of the hydraulic composition of the present invention, the addition order, mixing methods, mixing conditions, etc., of the respective materials are not particularly limited. The hydraulic composition of the present invention can be prepared by the same method as that conventionally used for preparing a hydraulic composition.

There is no particular limitation on a mixing device for use in preparation of the hydraulic composition of the present invention, and any mixing device used in preparation of a hydraulic composition can be used. For example, mixing can be performed by using various mixing devices such as a pan mixer, an Eirich mixer, a tilting mixer, a forced biaxial mixer, an Omni mixer, a Hobart mixer, and a hand mixer.

There is no particular limitation on a method of producing a hydraulic product using the hydraulic composition of the present invention. The same method as that conventionally employed can be employed in accordance with the type, intended use, etc., of the desired hydraulic product.

When the hydraulic composition of the present invention is a composition for producing concrete or mortar, a conventionally-employed method for producing concrete or mortar using a hydraulic composition can be employed. For example, molding methods such as casting molding, vibration molding, centrifugal molding, suction molding, extrusion molding, and press molding can be employed. Moreover, there is no particular limitation on a curing method for an uncured molded product obtained by the above-mentioned molding method. For example, curing can be performed by air curing, water curing, wet compress curing, autoclave curing, and combined use of two or more of the above-mentioned curing methods can be employed. As described above, there is no particular limitation on a curing temperature. For example, curing at a low temperature (e.g., curing in a low temperature period, for example, in winter or in a cold district), curing at room temperature, curing at temperature exceeding 100° C., curing at a temperature between room temperature and 100° C., etc., can be employed.

Moreover, when the hydraulic composition of the present invention is a composition for producing slate, a conventionally-employed method for producing slate using a hydraulic composition, e.g., a method of producing a paper-like product using a cylinder mold or a fourdrinier, a method of producing a molded product by flow-on, etc., can be employed. Moreover, there is no particular limitation on a method of curing the uncured paper-like product and molded product obtained by the above-mentioned method. For example, curing can be performed by air curing, water curing, wet compress curing, autoclave curing, and combined use of two or more of the above-mentioned curing methods.

When producing concrete, mortar, slate, etc., the curing may be performed at a temperature under the natural environment, at room temperature, at a temperature higher than room temperature and equal to or lower than 100° C., and at a high temperature exceeding 100° C.

Among the polypropylene fibers of the present invention, the polypropylene fiber having properties such that "the endothermic peak shape by DSC measurement is a single shape having a half width of 10° C. or lower and the melt enthalpy change ($\Delta H$) is 125 J/g or more" is excellent in heat resistance, and shows no melting, deterioration, breakage, etc., even under a high temperature of 100° C. or more, particularly 150° C. or more, and more particularly 170° C. or more, and can maintain the fiber shape and the excellent fiber strength. Therefore, in the case where the polypropylene fiber having the DSC properties is mixed in a hydraulic substance to thereby prepare a hydraulic composition and then a hydraulic product is produced using the hydraulic composition, a hydraulic product excellent in strength can be produced in a shortened curing time with high productivity by autoclave curing or the like at a temperature of 100° C. or more, particularly 150° C. or more, and more particularly 170° C. or more.

<<Rope Structure>>

The rope structure of the present invention is formed using the polypropylene fiber (any of polypropylene fibers A to C) of the present invention.

Here, the "rope structure" used in the present invention is a generic term used to refer to a rope, a cable, a cord, and a string formed by twisting a fiber strand, yarn and/or a fiber.

The rope structure of the present invention has high strength because the rope structure of the present invention is formed using the polypropylene fiber of the present invention having a fiber strength of 7 cN/dtex. When a rope structure is formed using a polypropylene fiber having a fiber fineness smaller than the above-mentioned fiber fineness, the strength of the rope structure may be insufficient.

Among the rope structures of the present invention, with respect to a rope structure formed using the polypropylene fibers (polypropylene fiber A, polypropylene fiber C) having the specific DSC properties defined in the present invention (the endothermic peak shape by DSC measurement is a single shape having a half width of 10° C. or lower and the melt enthalpy change ($\Delta H$) is 125 J/g or more) besides having the fiber strength of 7 cN/dtex or more, the polypropylene fiber forming the rope structure is excellent in heat resistance. Therefore, even if the rope structure is exposed to a high temperature, melting and reduction in physical properties are less likely to occur, and even when the rope structure is rubbed or scratched, melting or damage of the polypropylene fiber due to frictional heat and breakage or damage of the rope structure resulting from the melting and damage of the polypropylene fiber are unlikely to occur. Thus, the rope structure is strong and excellent in durability.

With respect to the polypropylene fiber forming the rope structure of the present invention, the melt enthalpy change ($\Delta H$) is preferably 125 to 165 J/g, more preferably 130 to 165 J/g, still more preferably 135 to 165 J/g, and yet still more preferably 140 to 165 J/g.

Moreover, the present invention encompasses:

a rope structure formed using the polypropylene fiber (polypropylene fiber B) of the present invention "not having the DSC properties but having properties of containing polypropylene having an IPF of 94% or more, having a single fiber fineness of 0.1 to 3 dtex, having a fiber strength of 7 cN/dtex or more, and having, on the surface, irregularities having an average interval of 6.5 to 20 μm and an average height of 0.35 to 1 μm as a result of alternate presence of a protruded portion having a large diameter and a non-protruded portion having a small diameter along its fiber axis"; and a rope structure formed using the polypropylene fiber (polypropylene fiber C) of the present invention "having the single fiber fineness and irregular properties of the fiber surface defined in the present invention (i.e., the single fiber fineness is 0.1 to 3 dtex, and irregularities are formed on the surface, the irregularities which have an average interval of 6.5 to 20 μm and an average height of 0.35 to 1 μm as a result of alternate presence of a protruded portion having a large diameter and a non-protruded portion having a small diameter along its fiber axis) besides the property of having a fiber strength of 7 cN/dtex or more and the DSC properties defined in the present invention".

With respect to the rope structure of the present invention formed using the polypropylene fibers of the present invention having the specific irregularities defined in the present invention on the fiber surface (polypropylene fiber B, polypropylene fiber C), slipping on the fiber surface decreases due to the irregularities and the engagement action due to the irregularities is demonstrated. Therefore, the fibers and the fiber strands forming the rope structure are tightly and firmly twisted due to the engagement action between the fibers and/or between the fiber strands. Thus, the rope structure is excellent in tensile strength, drawing resistance, wearing resistance, shape retentivity, etc.

With respect to the polypropylene fiber of the present invention having irregularities on the surface, when the average interval of the irregularities is lower than 6.5 μm and/or the average height thereof is lower than 0.35 μm, the irregularities on the fiber surface become excessively minute, causing reduction in the engagement action resulting from the irregularities. In contrast, a polypropylene fiber in which the average interval of the irregularities exceeds 20 μm and/or the average height thereof exceeds 1 μm cannot be produced unless the production rate of the polypropylene fiber is considerably reduced, and moreover, polypropylene having an IPF of substantially 100% needs to be used. Thus, the practicability thereof is poor.

When the rope structure of the present invention is formed using the polypropylene fiber of the present invention having the irregular properties, it is preferable to use a polypropylene fiber in which the average interval of the irregularities formed along the fiber axis direction is 6.6 to 20 μm, and particularly 6.8 to 20 μm and the average height thereof is 0.40 to 1 μm, and particularly 0.45 to 1 μm.

There is no particular limitation on the single fiber fineness of the polypropylene fiber forming the rope structure of the present invention. In view of easiness of production at the time of producing a polypropylene fiber (particularly, easiness of drawing), applicability to a rope, and durability, the single fiber fineness of the polypropylene fiber is generally preferably 0.01 to 500 dtex, more preferably 0.05 to 50 dtex, and still more preferably 0.1 to 5 dtex.

When the single fiber fineness of the polypropylene fiber is extremely small, melting, yarn breakage, etc., of the polypropylene fiber occur when or after forming the rope structure, which sometimes causes reduction in strength of the rope structure. In contrast, when the single fiber fineness of the polypropylene fiber is extremely large, the drawing physical properties for obtaining a polypropylene fiber decrease, which sometimes makes it impossible to obtain a polypropylene fiber which has high strength and has been highly crystallized.

There is no particular limitation on the shape (horizontal cross-sectional shape) of a polypropylene fiber for use in the formation of the rope structure of the present invention. The shape thereof may be a solid circular cross-sectional shape and may be other irregular cross-sectional shapes.

The polypropylene fiber forming the rope structure of the present invention may contain, for example, one kind or two or more kinds of the thermostabilizers and other additives insofar as the object of the present invention is not hindered. Moreover, the specific gravity of the polypropylene fiber is generally lower than that of water, and thus the polypropylene fiber floats on water as it is. In order to prevent the polypropylene fiber from floating, one kind or two or more kinds of the calcium carbonate or other specific gravity adjusters can be, as required, blended in the polypropylene fiber forming the rope structure in accordance with the intended use of the rope structure.

The polypropylene fiber forming the rope structure of the present invention may not be subjected to surface treatment or may be subjected to surface treatment with a suitable surface treatment agent in accordance with the intended use and the like of the rope structure.

The rope structure of the present invention may be formed of a long fiber-shaped polypropylene fiber (filament) or may be formed of a spun yarn produced using a polypropylene short fiber. In view of easiness of production of the rope structure and strength of the rope structure, it is preferable that the rope structure be formed of a long fiber-shaped polypropylene fiber.

There is no particular limitation on the type, structure, shape, etc., of the rope structure of the present invention. Any rope structures may be acceptable insofar as the rope structures are formed using the polypropylene fiber of the present invention having the above-mentioned specific physical properties.

The rope structure of the present invention may be formed using only the polypropylene fiber of the present invention having the specific physical properties or may be formed using one kind or two or more kinds of other fibers and filamentary materials together with the polypropylene fiber having the specific physical properties.

In order to obtain a rope structure formed of the polypropylene fiber in which the properties (strength, heat resistance, engagement action resulting from the surface irregularities, etc.) of the polypropylene fiber of the present invention having the above-mentioned specific physical properties are sufficiently utilized, the proportion (mass proportion) of the polypropylene fiber of the present invention is preferably 50 mass % or more, more preferably 60 mass % or more, and still more preferably 70 to 100 mass % based on the mass of the rope structure.

Mentioned as typical examples of the rope structure of the present invention, although not limited, are:

(i) a rope structure obtained by collecting fibers and twisting them to thereby produce a yarn, collecting two to several ten (preferably 2 to 100) yarns produced above to form a strand (double yarn), and then twisting a plurality (preferably 3 to 4) of the strands (double yarns);

(ii) a rope structure obtained by collecting fibers and twisting them to thereby produce a yarn, collecting two to several ten (preferably 2 to 30) yarns produced above to form a first strand (double yarn), collecting two to several ten (preferably 2 to 50) first strands produced above to form a second strand (double yarn), and then twisting a plurality (preferably 3 to 4) of the second strands (double yarns);

(iii) a rope structure obtained by collecting fibers and twisting them to thereby produce a yarn, collecting two to several ten yarns (preferably 2 to 100) produced above to form a strand (double yarn), and then twisting a plurality (preferably 3 to 4) of the strands (double yarns) in the state surrounding a core material, the core material being formed of another fiber or filamentary material; and (iv) a rope structure obtained by collecting fibers and twisting them to thereby produce a yarn, collecting two to several ten yarns (preferably 2 to 100) produced above to form a strand (double yarn); and then twisting one strand (double yarn) produced above or a plurality thereof and one strand (double yarn) formed of other fibers and/or a filamentary material (e.g., a metal wire, filamentary plastic, string, and tape) or a plurality thereof.

The rope structures of the items (i) and (ii) may be formed using only the polypropylene fiber of the present invention (any of the polypropylene fibers A to C) or may be formed using the polypropylene fiber and another fiber.

Moreover, the rope structures of the items (iii) and (iv) are formed using another fiber and/or filamentary material together with the polypropylene fiber of the present invention having the above-mentioned specific physical properties.

When the rope structure of the item (i) is formed using only the polypropylene fiber of the present invention having the above-mentioned specific physical properties, the fiber fineness of a yarn obtained by collecting fibers and twisting them is about 10 to 5,000 dtex, and particularly about 100 to 3,000. It is preferable that the fiber fineness of the strand (double yarn) obtained by collecting fibers and twisting them be 20 to 500,000 dtex, and particularly 200 to 300,000 dtex in terms of handling properties and practicability.

Moreover, when the rope structure of the item (ii) is formed using only the polypropylene fiber of the present invention, it is preferable that the fiber fineness of the yarn obtained by collecting fibers and twisting them be about 10 to 5,000 dtex, and particularly about 100 to 3,000 dtex, that the fiber fineness of the first strand (double yarn) obtained by collecting the yarns and twisting them be 20 to 150,000 dtex, and more particularly 200 to 90,000 dtex, and that the fiber fineness of the second strand (double yarn) obtained by collecting the first strands (double yarns) and twisting them be 40 to 7,500,000 dtex, and particularly 400 to 4,500,000 dtex in terms of handling properties and practicability.

Moreover, also when the rope structure is formed using another fiber and filamentary material with the polypropylene fiber of the present invention, it is preferable to adopt the fiber fineness according to the above.

When the rope structure of the present invention is formed using one kind or two or more kinds of other fibers and filamentary materials together with the polypropylene fiber of the present invention, mentioned as other fibers are, for example: synthetic fibers such as a polypropylene fiber other than the polypropylene fibers of the present invention, a nylon fiber, a vinylon fiber, a polyethylene fiber, a polyester fiber, a polyvinyl chloride fiber, a polyvinylidene chloride fiber, an aramid fiber, and a polyarylate fiber; semi-synthetic fibers such as a rayon fiber; natural fibers such as hemp, cotton, and sheep wool; a metal fiber; and a carbon fiber. Moreover, as other filamentary materials, a metal wire, a filamentary plastic, a plastic tape, a fabric tape, a string produced by weaving and knitting a synthetic fiber and/or a natural fiber, a split yarn, etc., are mentioned.

When the rope structure of the present invention is formed using one kind or two or more kinds of other fibers and filamentary materials together with the polypropylene fiber of the present invention, the following examples are mentioned: the polypropylene fiber and another fiber and/or filamentary material may be combined (mixed) in the strand (double yarn) forming the rope structure; the strand (double yarn) formed of only the polypropylene fiber and the strand (double yarn) and/or filamentary material formed of another fiber may be twisted (e.g., categorized in the rope structure of the item (d)); and another fiber and/or filamentary material may exist as a core in the center of the rope structure and the strands (double yarns) formed of only the polypropylene fiber may be twisted while the polypropylene fiber surrounding the core (e.g., categorized in the rope structure of the item (c)).

The thickness of the rope structure of the present invention is not particularly limited, and can be determined according to the intended use, type of use, handling properties, etc., of the rope structure. In general, it is preferable that the rope structure of the present invention have a diameter of about 0.1 to 100 mm, and particularly 0.2 to 50 mm in terms of easiness of production, handling properties, etc., of the rope structure.

Moreover, the rope structure of the present invention may be, as required, subjected to heat treatment and/or resin processing after the twisting step (rope-making step).

There is no particular limitation on a method of producing the rope structure of the present invention. The rope structure of the present invention can be produced using the same method as that conventionally employed for producing a rope structure using a synthetic fiber or a synthetic fiber and another material.

<<Sheet-Shaped Fiber Structure>>

The sheet-shaped fiber structure of the present invention is formed using the polypropylene fiber of the present invention (any of the polypropylene fibers A to C) having the above-mentioned specific properties.

Here, the "sheet-shaped fiber structure" of the present invention is a generic term used to refer to a fiber structure in the form of a sheet which is produced using the polypropylene fiber of the present invention and/or a yarn formed of the polypropylene fiber. The sheet-shaped fiber structure of the present invention encompasses a woven or knitted fabric, a nonwoven fabric, a synthetic paper, a net-like article, a fiber structure obtained by laminating two or more thereof, etc.

The sheet-shaped fiber structure of the present invention has high strength because the sheet-shaped fiber structure of the present invention is formed using the polypropylene fiber of the present invention having a fiber strength of 7 cN/dtex or more. When a sheet-shaped fiber structure is formed using a polypropylene fiber having a fiber strength smaller than the above fiber strength, the strength of the sheet-shaped fiber structure may be insufficient.

There is no particular limitation on the single fiber fineness of the polypropylene fiber forming the sheet-shaped fiber structure of the present invention. In terms of process properties in producing a sheet-shaped fiber structure, strength and durability of a sheet-shaped fiber structure, etc., the single fiber fineness of the polypropylene fiber is generally preferably 0.01 to 500 dtex, more preferably 0.05 to 50 dtex, and still more preferably 0.1 to 5 dtex.

When the single fiber fineness of the polypropylene fiber is extremely small, yarn breakage or the like of the polypropylene fiber may occur when or after forming the sheet-shaped fiber structure, which may result in reduction in the strength of the sheet-shaped fiber structure. In contrast, when the single fiber fineness of polypropylene fiber is extremely large, the drawing physical properties for obtaining the polypropylene fiber decrease, which makes it impossible to obtain a polypropylene fiber which has high strength and has been highly crystallized.

Among the sheet-shaped fiber structure of the present invention, a sheet-shaped fiber structure of the present invention formed using the polypropylene fibers of the present invention (polypropylene fiber B, polypropylene fiber C) which have the above-mentioned specific single fiber fineness and the above-mentioned specific irregularities which are defined in the present invention besides the fiber strength of 7 cN/dtex or more has high water retention rate (generally water retention rate of 10 mass % or more) and is excellent in water retentivity. This is because the polypropylene fiber forming the sheet-shaped fiber structure has the above-mentioned specific irregularities along the fiber axis. Therefore, the sheet-shaped fiber structure of the present invention formed using the polypropylene fiber also has high water retention rate (generally water retention rate of 10 mass % or more) and is excellent in water retentivity.

When the sheet-shaped fiber structure of the present invention is used for the application requiring high water retention rate, the water retention rate of the sheet-shaped fiber structure is preferably 10 mass % or more, and more preferably 11 to 50 mass %. In order to obtain a sheet-shaped fiber structure formed of a polypropylene fiber having a water retention rate exceeding 50%, the irregularities on the surface of the polypropylene fiber need to be considerably enlarged, which makes it actually difficult to produce such a sheet-shaped fiber structure with high productivity.

It should be noted that the water retention rate of the sheet-shaped fiber structure used for the specification of the present invention refers to a water retention rate measured by methods described in Examples described later.

Among the polypropylene fibers of the present invention, the polypropylene fibers of the present invention (polypropylene fiber A, polypropylene fiber C) which have the above-mentioned specific DSC properties defined in the present invention besides the fiber strength of 7 cN/dtex or more is excellent in heat resistance as described above. Therefore, the sheet-shaped fiber structure of the present invention formed using the polypropylene fiber is excellent in heat resistance.

In order to further enhance the heat resistance of the sheet-shaped fiber structure of the present invention, the melt enthalpy change ($\Delta H$) of the polypropylene fiber forming the sheet-shaped fiber structure is preferably 125 to 165 J/g, more preferably 130 to 165 J/g, still more preferably 135 to 165 J/g, and yet still more preferably 140 to 165 J/g.

When the melt enthalpy change ($\Delta H$) of the polypropylene fiber forming the sheet-shaped fiber structure is less than 125 J/g, the heat resistance thereof may become insufficient.

In contrast, the sheet-shaped fiber structure of the present invention formed using the polypropylene fiber of the present invention (polypropylene fiber B) not having the above-mentioned DSC properties but having properties of having a single fiber fineness of 0.1 to 3 dtex, having a fiber strength of 7 cN/dtex or more, and having, on the fiber surface, the above-mentioned specific irregularities defined in the present invention has high bonding strength between the polypropylene fibers forming the sheet-shaped fiber structure and is excellent in wearing resistance, shape retentivity, water retentivity, etc.

The sheet-shaped fiber structure formed of the polypropylene fiber of the present invention (polypropylene fiber C) having a fiber strength of 7 cN/dtex or more, a single fiber fineness of 0.1 to 3 dtex, the above-mentioned specific DSC properties defined in the present invention, and, on the fiber surface, the above-mentioned specific irregular properties of the fiber surface defined in the present invention is further excellent in properties such as water retentivity heat resistance, and strength.

The shape (horizontal cross-sectional shape) of the polypropylene fiber of the present invention forming the sheet-shaped fiber structure of the present invention is not particularly limited, and may be any of solid circular cross-sectional shapes or the various irregular cross-sectional shapes.

Moreover, the polypropylene fiber of the present invention forming the sheet-shaped fiber structure of the present invention may contain, as required, one kind or two or more kinds of the above-mentioned thermostabilizers and other additives.

The polypropylene fiber forming the sheet-shaped fiber structure of the present invention may not be subjected to surface treatment or may be subjected to surface treatment with a suitable surface treatment agent for the purpose of improvement in compatibility with various substances, prevention of static charge, and stabilization of the treatment agent depending on the intended use or the like of the sheet-shaped fiber structure. As the surface treatment agent for that case, one kind or two or more kinds of the various surface treatment agents can be used, for example.

The sheet-shaped fiber structure of the present invention contains the polypropylene fiber of the present invention having the specific properties in a proportion of preferably 50 mass % or more, more preferably 60 mass % or more, and still more preferably 65 mass % or more based on the mass of the sheet-shaped fiber structure.

When the content of the polypropylene fiber of the present invention in the sheet-shaped fiber structure is extremely low, it becomes impossible to give outstanding performances such as high water retentivity, heat resistance, and strength of the polypropylene fiber to the sheet-shaped fiber structure.

There is no particular limitation on the type and shape of the sheet-shaped fiber structure of the present invention. Any sheet-shaped fiber structures containing the polypropylene fiber of the present invention in a proportion of preferably 50 mass % or more may be used. For example, a woven or knitted fabric, a nonwoven fabric, a synthetic paper, a net-like article, a laminated fiber structure obtained by laminating two or more members thereof, etc., can be mentioned.

When the sheet-shaped fiber structure of the present invention is a woven fabric, any of plain-woven fabric, twill-woven fabric, sateen-woven fabric, screen-like woven fabric, multiaxial woven fabric, multilayer fabric, etc., which are produced using, for example, a jet loom, a Sulzer loom, a Rapier loom, a dobby loom, a Jacquard loom, etc., may be acceptable.

Moreover, when the sheet-shaped fiber structure of the present invention is a knitted fabric, various knitted articles obtained using a circular knitting machine, a warp knitting machine, a weft knitting machine, a tricot machine, etc., may be acceptable.

When the sheet-shaped fiber structure of the present invention is a nonwoven fabric, any of a wet paper-milling nonwoven fabric, needle punch nonwoven fabric, thermal bond nonwoven fabric, air-laid nonwoven fabric, spunlace nonwoven fabric, etc., may be acceptable.

When the sheet-shaped fiber structure of the present invention contains another fiber with the above-mentioned specific polypropylene fiber of the present invention, the type of another fiber is not particularly limited. For example, one kind or two or more kinds of natural fibers such as cotton, silk, sheep wool, and hemp; synthetic fibers such as a polyester fiber, a nylon fiber, an acrylic fiber, a polyvinyl alcohol fiber, a polypropylene fiber other than the polypropylene fiber of the present invention, a polyolefin fiber such as a polyethylene fiber, a polyvinylidene chloride fiber, an aramid fiber, and a polyarylate fiber; semi-synthetic fibers such as viscose and rayon; and inorganic fibers such as a glass fiber and a carbon fiber can be used in combination in a proportion of 50 mass % or lower, preferably 40 mass % or lower, and more preferably 35 mass % or lower.

When another fiber is used together with the polypropylene fiber of the present invention, a combination manner is not particularly limited, and can be suitably selected in accordance with the type, form, intended use, etc., of the sheet-shaped fiber structure. The sheet-shaped fiber structure of the present invention may be, for example: a woven or knitted fabric and a net-like article which have been produced using a yarn formed of the polypropylene fiber of the present invention and a yarn formed of another fiber; a woven or knitted fabric and a net-like article which have been produced using a yarn produced blending the polypropylene fiber of the present invention and another fiber; a nonwoven fabric and a synthetic paper which have been produced cotton-blending the polypropylene fiber of the present invention and another fiber; or a laminate of a woven or knitted fabric or a nonwoven fabric formed of the polypropylene fiber of the present invention and a woven or knitted fabric or a nonwoven fabric formed of another fiber.

Although not limited to the following examples, mentioned as examples of the sheet-shaped fiber structure of the present invention are: a woven fabric, a knitted fabric, and a net-like article produced using a yarn formed of the polypropylene fiber of the present invention alone; a woven fabric, a knitted fabric, and a net-like article produced by using a blended yarn obtained by blending the polypropylene fiber of the present invention, and another synthetic fiber, natural fiber, and/or a semi-synthetic fiber; and a woven fabric, a knitted fabric, and a net-like article produced by combining a yarn formed of the polypropylene fiber of the present invention, and a yarn formed of another synthetic fiber and/or a yarn formed of a natural fiber. For example, when a knitting fabric (knit) is produced by using a yarn obtained by blending the polypropylene fiber of the present invention and cotton or by the combined use of a yarn formed of the polypropylene fiber of the present invention and a cotton-spun yarn, a knitting fabric (knit) suitable for sport garments can be obtained which: is excellent in heat resistance; does not melt even when rubbed against the floor of a gymnasium or the like; is lightweight; has high water retentivity; and is excellent in sweat absorbency.

Moreover, when the sheet-shaped fiber structure of the present invention is a nonwoven fabric and a synthetic paper, the following examples can be mentioned: a felt-like nonwoven fabric produced by imparting waviness to the polypropylene fiber of the present invention, cutting the resultant, and subjecting the resultant to needle punch after carding; a dry type nonwoven fabric obtained by imparting waviness to the polypropylene fiber of the present invention, cutting the resultant, cotton-blending, at the time of carding, a binder fiber (e.g., a sheath-core type composite fiber in which the core part is formed of polypropylene and the sheath part is formed of polyethylene) at least having a surface portion which melts at a lower temperature as compared with the polypropylene fiber, heating the resultant to thereby bind the polypropylene fiber with a binder fiber; and a wet type nonwoven fabric (synthetic paper) obtained by mixing a binder fiber to a short fiber formed of the polypropylene fiber of the present invention to thereby prepare a water dispersion slurry, subjecting the resultant to paper-making, and drying the resultant. The nonwoven fabric of the present invention formed using the polypropylene fibers (particularly polypropylene fiber A, polypropylene fiber c) of the present invention can be produced with a high production rate because the polypropylene fiber has high heat resistance and can be subjected to steps, such as a bonding step and a drying step, at a high temperature.

The sheet-shaped fiber structure of the present invention formed using the polypropylene fiber of the present invention has high water retention rate and is excellent in water retentivity, heat resistance, mechanical properties, chemical resistance, etc. Thus, taking advantage of the properties, the sheet-shaped fiber structure of the present invention can be effectively used for various applications such as an industrial use filter, alkali secondary battery separator, polypropylene fiber-reinforced polyolefin sheet, fabric for clothes (a woven or knitted fabric, a nonwoven fabric, etc.), sanitary materials, and groceries.

<<Composite Material and Molded Product>>

The composite material of the present invention refers to a composite material formed of a matrix containing an organic polymer and the polypropylene fiber (any of the polypropylene fibers A to C) of the present invention contained in the matrix.

The composite material and molded product containing the composite material according to the present invention have high strength because they are formed using the polypropylene fiber of the present invention having a fiber strength of 7 cN/dtex or more. When the composite material and the molded product are produced using a polypropylene fiber whose fiber strength is lower than the above fiber strength, the strength of the composite material and the molded product may be insufficient.

Even when the composite material of the present invention formed using the polypropylene fibers (polypropylene fiber A, polypropylene fiber C), among the polypropylene fibers of the present invention, having the specific DSC properties defined in the present invention besides the fiber strength of 7 cN/dtex or more and the molded product containing the composite material are exposed to a high temperature, they are less likely to melt and decrease in the physical properties and are excellent in mechanical properties such as tensile strength, impact resistance, modulus of elasticity in bending, and bending strength. This is because the polypropylene fibers of the present invention are excellent in heat resistance.

With respect to the polypropylene fibers (polypropylene fiber A, polypropylene fiber C) for use in the composite material of the present invention, the melt enthalpy change ($\Delta H$) is preferably 125 to 165 J/g, more preferably 130 to 165 J/g, still more preferably 135 to 165 J/g, and yet still more preferably 140 to 165 J/g.

When the melt enthalpy change ($\Delta H$) of the polypropylene fiber is lower than 125 J/g, the heat resistance may become insufficient.

Moreover, the present invention encompasses: a composite material produced using the polypropylene fibers (polypropylene fiber B, polypropylene fiber C) of the present invention having the specific irregular properties of the fiber surface defined in the present invention besides a fiber fineness of 7 cN/dtex or more or besides a fiber fineness of 7 cN/dtex or more and the DSC properties defined in the present invention; and a molded product.

When the polypropylene fibers (polypropylene fiber B, polypropylene fiber C) having the irregular structure of the fiber surface defined in the present invention are used as a polypropylene fiber, an anchoring effect to an organic polymer matrix generates and the adhesiveness with the organic polymer matrix increases due to irregularities along the fiber axis, on the surface of the polypropylene fiber, having an average interval of 6.5 to 20 µm and an average height of 0.35 to 1 µm. Thus, a composite material and a molded product which are excellent in mechanical properties such as tensile strength, impact resistance, modulus of elasticity in bending, and bending strength can be obtained. When, in the polypropylene fiber having irregularities on the surface, the average interval of the irregularities is lower than 6.5 µm and/or the average height of the irregularities is lower than 0.35 µm, the irregularities on the fiber surface become extremely minute, which results in reduction in the anchoring effect to an organic polymer matrix. In contrast, a polypropylene fiber having irregularities having an average interval exceeding 20 µm and/or an average height exceeding 1 µm cannot be produced unless the production rate of the polypropylene fiber is reduced by a large degree, and for the production of such a polypropylene fiber, polypropylene whose IPF is substantially 100% needs to be used, resulting in poor practicability.

When the composite material and molded product according to the present invention are formed using the polypropylene fibers (polypropylene fiber B, polypropylene fiber C) having the above irregular properties of the fiber surface, it is preferable to use a polypropylene fiber in which the average interval of the irregularities formed along the fiber axis direction is 6.6 to 20 µm, and particularly 6.8 to 20 µm and the average height thereof is 0.40 to 1 µm, and particularly 0.45 to 1 µm.

There is no particular limitation on the single fiber fineness of the polypropylene fiber for use in the composite material of the present invention. From the viewpoints of easiness of production at the time of producing the polypropylene fiber (particularly easiness of drawing) and durability, the single fiber fineness of the polypropylene fiber is preferably 0.01 to 500 dtex, more preferably 0.05 to 50 dtex, and still more preferably 0.1 to 5 dtex as described above.

When the single fiber fineness of the polypropylene fiber is extremely small, melting, yarn breakage, etc., of the polypropylene fiber occur when or after forming the composite material and the molded product, which sometimes results in reduction in strength of the composite material and the molded product. In contrast, when the single fiber fineness of the polypropylene fiber is extremely large, the drawing physical properties for obtaining the polypropylene fiber decrease, which sometimes makes it impossible to obtain a polypropylene fiber which has high strength and has been highly crystallized. Moreover, when such a polypropylene fiber is formed into a woven or knitted fabric, a nonwoven fabric, a net, etc., for use in a composite material, it sometimes becomes difficult to produce a woven or knitted fabric, a nonwoven fabric, a net, etc.

The shape (horizontal cross-sectional shape) of the polypropylene fiber for use in the composite material of the present invention is not particularly limited, and may be any of solid circular cross-sectional shapes or the above-mentioned various irregular cross-sectional shapes.

The polypropylene fiber of the present invention for use in the composite material of the present invention may contain, as required, one kind or two or more kinds of the above-mentioned thermostabilizers and other additives.

The polypropylene fiber for use in the composite material of the present invention may not be subjected to surface treatment or may be subjected to surface treatment with a suitable surface treatment agent depending on the intended use or the like of the composite material and the molded product.

In the composite material of the present invention, there is no particular limitation on the shape of the polypropylene fiber of the present invention (any of the polypropylene fibers A to C) contained in an organic polymer matrix. For example, any forms such as a short fiber, a long fiber, a fiber bundle, a yarn, a woven or knitted fabric, a nonwoven fabric, and a net are acceptable.

When the polypropylene fiber is in the form of a short fiber, the composite material of the present invention is generally in the form of an organic polymer composition (compound) in which the short fiber of the polypropylene fiber is dispersed and contained in the organic polymer. Moreover, when the polypropylene fiber is in the form other than a short fiber, such as a long fiber, a fiber bundle, a yarn, a woven or knitted fabric, a nonwoven fabric, or a net, the composite material of the present invention can be formed into substances having various forms in which a polypropylene long fiber, polypropylene fiber bundle, yarn formed of a polypropylene fiber, woven or knitted fabric formed of a polypropylene fiber, nonwoven fabric, net, or the like is contained in an organic polymer matrix, e.g., an organic polymer impregnation (FRP) in the form of an arbitrary shape such as a linear shape, rod-like shape, sheet shape, plate shape, tubular shape, and block shape.

When the polypropylene fiber of the present invention is formed into a woven fabric and included in the organic polymer matrix, plain-woven fabric, twill-woven fabric, sateen woven fabric, screen-like woven fabric, a unidirectional woven fabric, a quasi-unidirectional woven fabric, etc., produced using a jet loom, a Sulzer loom, a Rapier loom, a dobby loom, a Jacquard loom, a multiaxial loom, a multilayer loom, etc., can be used as a woven fabric. Moreover, as a knitted fabric, various knitted fabrics obtained using a circular knitting machine, a warp knitting machine, a weft knitting machine, a tricot machine, etc., a stitch fabric, a non-crimped fabric, etc., can be used. These woven fabrics and/or knitted fabrics may be produced only using the polypropylene fiber of the present invention or may be produced using, together with the polypropylene fiber of the present invention, as required, one kind or two or more kinds of other fibers such as natural fibers (e.g., cotton, silk, sheep wool, and hemp), synthetic fibers (e.g., a polyester fiber, a nylon fiber, an acrylic fiber, and a polyvinyl alcohol fiber), semi-synthetic fibers (e.g., viscose and rayon), etc.

In the composite material of the present invention, there is no particular limitation on the existing state (contained state) in the organic polymer matrix of the polypropylene fiber in the form of a short fiber, a long fiber, a fiber bundle, a yarn, a woven or knitted fabric, a nonwoven fabric, or a net, and the existing state can be suitably selected in accordance with the intended use, the purpose of use, etc., of the composite material and the molded product formed of the composite material. For example, the polypropylene fiber may be: uniformly contained in the organic polymer matrix; non-uniformly or randomly contained in the organic polymer matrix; locally contained in the organic polymer matrix; or contained throughout or substantially throughout the organic polymer matrix.

Moreover, in the composite material and the molded product according to the present invention, the polypropylene fiber may be thoroughly buried in the organic polymer matrix, or a part of the polypropylene fiber may be exposed to the outside of the organic polymer matrix. When a part of the polypropylene fiber is exposed to the outside of the organic polymer matrix, the degree of the exposure can be suitably adjusted according to the intended use, the purpose of use, etc., of the composite material and the molded product.

In the composite material of the present invention, as an organic polymer forming a matrix, any organic polymer is acceptable insofar as the polypropylene fiber can be included in an organic polymer matrix without deteriorating the physical properties, irregular structure of the fiber surface, etc. of the polypropylene fiber of the present invention. Any of a thermoplastic resin, a thermosetting resin, and an elastomeric polymer can be used without any particular limitation. Mentioned as such an organic polymer are, for example: a thermoplastic resin and a thermoplastic elastomer (thermoplastic elastomeric polymer) whose melting points are lower than the melting temperature of the polypropylene fiber; a thermosetting resin which cures at a temperature lower than the melting temperature of the polypropylene fiber; a rubber which is vulcanized at a temperature lower than the melting temperature of the polypropylene fiber; and an organic polymer which dissolves in a solvent which does not dissolve the polypropylene fiber.

Specific examples of the organic polymer which can be used for the composite material of the present invention include: thermoplastic resins such as olefin-based resins including polypropylene, polyethylene, polybutene, and an ethylene-vinyl acetate copolymer, polystyrene-based resins including polyvinyl chloride, polystyrene, a high-impact polystyrene, and ABS, an acrylic resin, polylactic acid, a polyester-based resin, a polyamide-based resin, polyvinyl alcohol, polyacrylonitrile, and a thermoplastic polyurethane; thermosetting resins such as an epoxy resin, an unsaturated polyester resin, a phenol resin, a melamine resin, a silicone resin, a thermosetting polyurethane, a melamine resin, and an alkyd resin; and elastomeric polymers such as a natural rubber, polybutadiene, a butadiene styrene rubber, a butadiene acrylonitrile rubber, polychloroprene, polyisoprene, polyisobutylene, a silicone rubber polystyrene-based thermoplastic elastomer, a polyolefin-based thermoplastic elastomer, a polyurethane-based thermoplastic elastomer, a polyethylene-based thermoplastic elastomer, a polyamide-based thermoplastic elastomer, and a polydiene-based thermoplastic elastomer. Those may be used alone or in combination of two or more kinds.

The content ratio of the organic polymer matrix to the polypropylene fiber in the composite material of the present invention is not particularly limited, and varies according to the type of an organic polymer forming a matrix, form of the polypropylene fiber, and intended use of the composite material and the molded product formed thereof. When the composite material of the present invention is a compound in which a short fiber-shaped polypropylene fiber is mixed in the organic polymer matrix, it is generally preferable that the mass ratio of the organic polymer forming a matrix to the polypropylene fiber be 99:1 to 50:50, particularly 98:2 to 55:45, and more particularly 97:3 to 60:40 from the viewpoints of easiness of production of the composite material, handling properties of the composite material, and molding processability. Moreover, when the composite material of the present invention is a substance other than a compound (e.g., substance in which an organic polymer forming a matrix is impregnated in a woven fabric, a non-woven fabric, a fiber bundle, etc., formed of the polypropylene fiber), it is generally preferable that the mass ratio of the organic polymer forming a matrix to the polypropylene fiber be 70:30 to 5:95, particularly 60:40 to 10:90, and more particularly 50:50 to 15:85 from the viewpoints of easiness of production of the composite material, handling properties of the composite material, and molding processability.

The composite material of the present invention can contain, as required, one kind or two or more kinds of a thermostabilizer, a UV absorber, an antioxidant, a colorant, a filler, an antistatic agent, an organic fiber other than the above-mentioned polypropylene fibers, inorganic fiber, etc., besides the organic polymer matrix and the polypropylene fiber insofar as the object of the present invention is not hindered.

In production of the composite material of the present invention, a method of including the polypropylene fiber in the organic polymer matrix without loss of the above-mentioned physical properties and structure of the polypropylene fiber is employed in accordance with the type and physical properties (in particular, thermal properties such as a melting point, a softening point, a curing temperature, a reaction temperature, and a vulcanizing temperature) of an organic polymer forming a matrix, solubility of the organic polymer in a solvent, form of the polypropylene fiber, intended use and purpose of use of the composite material, etc.

When the organic polymer forming a matrix is a thermoplastic polymer which melts at a lower temperature as compared with the polypropylene fiber (thermoplastic resin, thermoplastic elastomer, etc., which melt at a lower temperature as compared with the polypropylene fiber) and the polypropylene fiber is in the form of a short fiber, a composite material can be produced typically employing a method (1a) described below:

(1a) a method of melt-mixing a short fiber-shaped polypropylene fiber and a thermoplastic polymer which is melt-mixed at a lower temperature than the melting point of the polypropylene fiber, using an extruder or another suitable melt-mixing device (melt-kneading device) to thereby produce a composite material (thermoplastic polymer composition, compound) containing a short fiber-shaped polypropylene fiber in the thermoplastic polymer matrix.

It is preferable to add an olefin-based emulsion or the like to the polypropylene fiber at the time of performing the method (1a). This is because troubles at the time of melt-mixing, such as a development of a fiber mass, are less likely to occur. The propylene fibers used in the present invention are excellent in heat resistance and can maintain the fiber shapes without melting even when exposed to a considerable high temperature. Therefore, the propylene fiber can be blended in a thermoplastic polymer, and melt-mixed at a temperature higher than the conventional temperature. Thus, a composite material containing the polypropylene fiber in a thermoplastic organic polymer (thermoplastic polymer composition) can be produced at a production rate higher than the conventional production rate.

Various molded products can be produced by performing conventionally widely-known melt-molding such as injection molding, extrusion molding, compression molding, press molding, blow molding, and extrusion blow molding, using a composite material (thermoplastic polymer composition, compound) obtained by the method (1a).

Moreover, when the organic polymer forming a matrix is a thermoplastic polymer which melts at a lower temperature as compared with the polypropylene fiber (hereinafter, the thermoplastic polymer which melts at a lower temperature as compared with the polypropylene fiber is sometimes referred to as a "low temperature melting thermoplastic polymer") and the polypropylene fiber is in the form of a long fiber, a fiber bundle, a yarn, a woven or knitted fabric, a nonwoven fabric, a net, or the like, the composite material of the present invention can be produced by the methods (1b) to (1e) described below:

(1b) a method of melt-extruding a low temperature melting thermoplastic polymer in such a manner as to cover the entire surface of the polypropylene fiber in the form of a long fiber, a fiber bundle, or yarn to thereby produce a composite material;

(1c) a method of forming a low temperature melting thermoplastic polymer into a sheet shape on a polypropylene fiber (polypropylene fiber structure) in the form of a woven or knitted fabric, a nonwoven fabric, or a net) by melt extrusion, melt casting, calendar, etc., and simultaneously impregnating the polypropylene fiber (polypropylene fiber structure) with the low temperature melting thermoplastic polymer to thereby produce a composite material.

(1d) a method of laminating a film or a sheet, which is produced beforehand using a low temperature melting thermoplastic polymer, on a polypropylene fiber (polypropylene fiber structure) in the form of a woven or knitted fabric, a nonwoven fabric, or a net, heating the film or sheet, pressing, as required, the film or sheet, and impregnating the polypropylene fiber (polypropylene fiber structure) with the low temperature melting thermoplastic polymer to thereby produce a composite material; and (1e) a method of supplying powder of a low temperature melting thermoplastic polymer to a polypropylene fiber (polypropylene fiber structure) in the form of a woven or knitted fabric, a nonwoven fabric, or a net, heating the resultant, pressing, as required, the resultant, and impregnating the polypropylene fiber (polypropylene fiber structure) with the low temperature melting thermoplastic polymer to thereby produce a composite material.

The composite materials obtained by the methods (1b) to (1e) may be used as a molded product or a product as they are or may be further heated or the like to thereby produce a molded product and a final product in accordance with the structure and form of the composite material to be obtained.

Although not limited, mentioned as a specific example of the method (1d) is a method which involves: laminating alternatively a biaxial mesh produced using the polypropylene fiber of the present invention and a polyolefin sheet produced beforehand to form a multilayer (e.g., ten layers in total); and subjecting the resultant to thermocompression bonding at a temperature equal to or higher than the melting temperature of the polyolefin sheet and lower than the melting temperature of the polypropylene fiber to thereby produce a polypropylene fiber-reinforced polyolefin board. The polypropylene fiber-reinforced polyolefin board obtained by the method is remarkably improved in tensile strength and tear strength as compared with a conventional one because the polyolefin fiber as a reinforcement fiber has high strength and high heat resistance, and shows excellent adhesiveness with the polypropylene fiber as described above. Moreover, the polyolefin sheet can be melt at a higher temperature than the conventional temperature due to excellent heat resistance of the polypropylene fiber. Therefore, the polypropylene fiber-reinforced polyolefin board obtained by the method can be produced at sufficiently increased production rate.

In this case, when the polypropylene fiber is formed into a unidirectional prepreg in place of a woven or knitted fabric, the strength utilization factor of the polypropylene fiber can be increased.

Moreover, when the organic polymer forming a matrix is a thermosetting resin which is cured at a temperature lower than the melting point of the polypropylene fiber or an elastomeric polymer which is vulcanized at a temperature lower than the melting point of the polypropylene fiber, the composite material of the present invention can be produced, for example, by methods (2a) and (2b) described below:

(2a) a method of mixing a short fiber-shaped polypropylene fiber and a thermosetting resin or an elastomeric polymer, which is cured or vulcanized at a temperature lower than the melting point of the polypropylene fiber, at a temperature lower than the curing temperature and vulcanizing temperature of the thermosetting resin or the elastomeric polymer to thereby produce a composite material containing the short fiber-shaped polypropylene fiber in the thermosetting resin or the elastomeric polymer matrix; and (2b) a method of supplying, to a polypropylene fiber (polypropylene fiber structure) in the form of a long fiber, a fiber bundle, a yarn, a woven or knitted fabric, a non-woven fabric, or a net), a thermosetting resin or an elastomeric polymer in the form of liquid, paste, powder, or sheet which is cured or vulcanized at a temperature lower than the melting point of the polypropylene fiber, pressing, as required, the resultant, and impregnating the polypropylene fiber (polypropylene fiber structure) with the thermosetting resin or the elastomeric polymer to thereby produce a composite material.

The composite materials obtained by the methods (2a) and (2b) can be formed into the desired molded product and manufactured goods when heated at the curing temperature or vulcanizing temperature of the thermosetting resin or the elastomeric polymer, or molded under heat (e.g., SMC, BMC, etc.). With respect to the polypropylene fiber of the present invention contained in the composite materials obtained by the methods of (2a) and (2b), the polypropylene fiber of the present invention is excellent in heat resistance as compared with a conventional polypropylene fiber and can endure a temperature, generation of heat, and heating at the time of curing the thermosetting resin or at the time of vulcanizing an elastomeric polymer. Thus, the curing temperature or the vulcanization temperature thereof can be increased. Therefore, the productivity of a molded product can be increased and the mechanical properties such as strength of a molded product to be obtained are improved as compared with the case of the production of a thermosetting resin molded product or an elastomeric polymer molded product which is reinforced with a conventional polypropylene fiber.

Moreover, the composite material of the present invention can be produced also by: dissolving the organic polymer forming a matrix in a solvent which dissolves the organic polymer but does not dissolve or swell the polypropylene fiber to thereby prepare an organic polymer solution; impregnating, with the organic polymer solution, the polypropylene fiber (polypropylene fiber in the form of a short fiber, a long fiber, a fiber bundle, a yarn, a woven or knitted fabric, a nonwoven fabric, a net, etc.); and removing the solvent at a temperature lower than the melting point of the polypropylene fiber.

As the solvent which dissolves the organic polymer but does not dissolve or swell the polypropylene fiber, water, acetone, thanol, acetic acid, toluene, phenol, benzene, dimethylformamide, dimethyl sulfoxide, styrene, etc., can be mentioned, for example. One kind or two or more kinds of the above solvents can be used according to the type of the organic polymer.

The composite material thus obtained is molded by a method suitable for each organic polymer in accordance with the type of an organic polymer matrix forming the composite material to thereby form the desired molded product.

When a molded product is produced using the composite material of the present invention containing the polypropylene fiber of the present invention in an organic polymer, various molding methods which are conventionally employed in the technical field of a so-called "FRP" (fiber reinforced plastic) are employable. Mentioned as a molding method employable in the present invention are: the above-mentioned melt-molding methods, such as injection molding method, extrusion molding method, press molding method, calendar molding method, casting method, and blow molding method; a hand lay-up method; a spray up method; a continuous panel molding method; a drawing-out molding method; a filament winding method; a chopping-combined hoop winding method; a centrifugal molding method; a bag method; a cold press method; a resin injection method; an autoclave method; a preform matched die method; a premix method; a sheet molding compound method; an in-oil pressurizing molding method; laminate compression method; etc.

In accordance with each of the above molding methods, a composite material suitable for each method may be produced for use.

The composite material of the present invention and a molded product formed thereof are excellent in mechanical properties such as strength, heat resistance, durability, light-weight properties, and recycling efficiency. Therefore, taking advantage of those properties, the composite material of the present invention and a molded product formed thereof can be effectively used in various applications such as auto parts, electrical/electronic parts, sanitary articles, groceries, leisure/sports articles, stationeries, space/aero parts.

EXAMPLES

Hereinafter, the present invention will be specifically described with reference to Examples and the like, but is not limited to the following Examples.

[I] Polypropylene Fiber and Production Thereof:

In the following Examples 1 to 10 and Comparative Examples 1 to 9, a polypropylene fiber and production thereof will be specifically described.

In the following Examples 1 to 10 and Comparative Examples 1 to 9, the isotactic pentad fraction (IPF) of polypropylene and the draw tension at the time of drawing polypropylene, and the DSC, single fiber fineness, fiber strength, average interval and average height of irregularities on the fiber surface, friction melting resistance, and water retention rate of a polypropylene fiber were measured as follows.

(I-1) Isotactic Pentad Fraction (IPF) of Polypropylene:

The IPF of polypropylene was determined in accordance with the "$^{13}$C-NMR spectrum method" described in Non-patent Document 1 using a superconducting nuclear magnetic resonance apparatus ("Lambda500", manufactured by JEOL Co., Ltd.). Specifically, the content ratio (fraction) (%) of a propylene unit (isotactic pentad unit) in which five propylene monomer units are successively isotactic-combined in the $^{13}$C-NMR spectrum in polypropylene was determined to be defined as IPF. In that case, the attribution of the peak in the $^{13}$C-NMR spectrum was determined in accordance with the method described in Non-patent Document 2.

(I-2) Draw Tension at the Time of Drawing:

The tension of yarn immediately after being discharged out from a drawing furnace (hot-air oven) or yarn immediately after being separated from a drawing plate was measured using a load tension meter ("DTMX-5B", manufactured by NIDEC-SHIMPO CORPORATION) to be defined as a draw tension (cN/dtex).

(I-3) DSC Measurement of Polypropylene Fiber:

A polypropylene fiber was allowed to stand in an atmosphere having a temperature of 20° C. and a relative humidity of 65% for 5 days for humidification. After that, the resultant was cut into a length of 1 mm, and 5 mg thereof was weighed out and put in an aluminum pan (capacity: 100 μL) ("No.51119872", manufactured by METTLER TOLEDO). Then, the aluminum pan was sealed using an aluminum pan cover ("No.51119871", manufactured by METTLER TOLEDO). Then, from the DSC curve (first run) measured at a temperature elevation rate of 10° C./min in a nitrogen atmosphere using a differential scanning calorimetry meter ("DSC2010", manufactured by TA Instruments), the half width (° C.) of the endothermic peak and the melt enthalpy change (ΔH) (J/g) were determined by the method with reference to FIGS. 1 and 2 (particularly FIG. 2).

(I-4) Fiber Fineness (Single Fiber Fineness) of Polypropylene Fiber:

A polypropylene fiber was allowed to stand in an atmosphere having a temperature of 20° C. and a relative humidity of 65% for 5 days for humidification. After that, a given length (900 mm) of the humidified polypropylene fiber (single fiber) was collected, and the mass thereof was measured to thereby calculate the fiber fineness. The same humidified polypropylene fiber was subjected to the same measurement operation 10 times, and the average value thereof was calculated to be defined as the fiber fineness (single fiber fineness) of the polypropylene fiber. When the fiber was thin and the fiber fineness was not able to measure by measuring the mass of the given length sample, the fiber fineness of the same humidified fiber was measured using a fiber fineness measuring device ("VIBROMAT M", manufactured by Textechno).

(I-5) Fiber Strength of Polypropylene Fiber:

A polypropylene fiber was allowed to stand in an atmosphere having a temperature of 20° C. and a relative humidity of 65% for 5 days for humidification. After that, the polypropylene fiber (single fiber) was cut into a length of 60 mm to be used as a sample. The sample was drawn by holding both ends of the sample (polypropylene single fiber having a length of 60 mm) (holding up to 10 mm positions from the ends) at a drawing rate of 60 mm/min in an environment having a temperature of 20° C. and a relative humidity of 65% and using a fiber strength measuring device ("FAFEGRAPH M", manufactured by Textechno), to thereby measure the stress at the time of breakage. Then, the measurement value was divided by the fiber fineness of the polypropylene single fiber to determine the fiber strength (cN/dtex). The same polypropylene fiber was subjected to the same measurement 10 times, and the average value was calculated to be defined as the fiber strength (polypropylene single fiber) of the polypropylene fiber.

(I-6) Average Interval and Average Height of Irregularities on Polypropylene Fiber Surface:

A photograph of a polypropylene fiber (single fiber) was taken at a magnification of 1,000 times from the vertical direction with respect to the fiber axis using a scanning electron microscope ("S-510", manufactured by HITACHI). From the obtained photograph, the average interval and the average height of irregularities on the fiber surface was determined by the above-mentioned method with reference to FIG. 3. In calculating the average interval and the average height, 5 points (interval between each measurement point is 10 cm) were selected per a fiber with respect to 10 polypropylene fibers (single fiber), and then the interval and the height of the irregularity at each measurement point (50 points in total) were measured. The average values thereof were each calculated to be defined as the average interval (μm) and the average height (μm) of the irregularities.

(I-7) Friction Melting Resistance:

(i) The polypropylene fibers obtained in the following Examples or Comparative Examples were bundled to form a multifilament yarn of 1,000 dtex. Then, using the multifilament yarn, a plain-woven fabric was produced in which the base fabric density is 30 pieces/25.4 mm (warp) and 30 pieces/25.4 mm (weft).

(ii) A sample piece (width×length=3.5 cm×8.5 cm) was cut out of the plain-woven fabric obtained in the item (i). The sample piece was pressed against a roller (material: cherry tree) rotating at 1,800 rpm under a load of 1,134 g (2.5 pounds). Then, a period of time from the start of the test to the point when the melting of the test sample began was measured. In measurement, the moment when the friction sound became large was defined as the melt starting point of the test sample. The same sample (plain-woven fabric) was subjected to the same test 3 times, and then the average value was calculated to be defined as an index of friction melting resistance. The longer a time taken for the sample piece to start melting due to friction is, the more excellent the heat resistance is.

(I-8) Water Retention Rate of Polypropylene Fiber:

1 g of polypropylene fiber was dried at 105° C. for 5 hours, and then the mass (M1) thereof was measured. The dried polypropylene fiber was immersed in 30 ml of ion exchange water, and left to stand at 20° C. for 10 minutes. After that, the polypropylene fiber was taken out, and put in a desktop centrifugal machine ("H-27F", manufactured by KOKUSAN) while uncovered (without being wrapped with another material). Then, centrifugal dehydration was performed at a temperature of 20° C. at a rotational speed of 3,000 rpm for 5 minutes. The mass (M2) thereof was measured, and then the water retention rate (%) was determined from Equation (1) shown below.

$$\text{Water retention rate (\%) of polypropylene fiber} = \{(M2-M1)/M1\} \times 100 \quad (1)$$

Example 1

Production of Polypropylene Fiber (a-1)

(1) Polypropylene ["Y2000GV", manufactured by Prime Polymer Co., Ltd., IPF=97%, MFR=18 g/10 min (230° C., load of 2.16 kg)] was put in an extruder of a melt spinning device, and was melt-kneaded at 240° C. Then, the resultant was discharged at an amount of 22.3 g/min from a spinneret [number of holes (circular hole): 24, hole diameter: 0.2 mm] being attached to a spinning head and having a temperature of 245° C. Then, a polypropylene undrawn yarn was produced at a taking up speed of 800 m/min, wound around a bobbin, and stored at room temperature (total fiber fineness of the polypropylene undrawn yarn=288 dtex/24 filaments).

(2) The polypropylene undrawn yarn obtained in the item (1) was wound off from the bobbin, introduced in a hot-air oven having a temperature of 128° C., and subjected to pre-drawing to be drawn by 4.6 times in 2 steps to thereby produce a polypropylene pre-drawn yarn. Then, the polypropylene pre-drawn yarn was wound around the bobbin, and stored at room temperature (total fiber fineness of the polypropylene pre-drawn yarn=63 dtex/24 filaments, heat-absorption starting temperature=153.5° C.).

(3) The polypropylene pre-drawn yarn obtained in the item (2) was wound off from the bobbin, introduced in a hot-air oven having a temperature of 172° C., and subjected to post-drawing under the conditions of a deformation rate of 1.7 times/min and a draw tension of 1.18 cN/dtex to be drawn by 1.3 times in 3 steps to thereby produce a polypropylene drawn yarn having a total drawing magnification of 6.0 times (total fiber fineness=48 dtex/24 filaments) [polypropylene fiber (a-1)].

(4) With respect to the polypropylene drawn yarn [polypropylene fiber (a-1)] obtained in the item (3), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 1.

Figure 4:
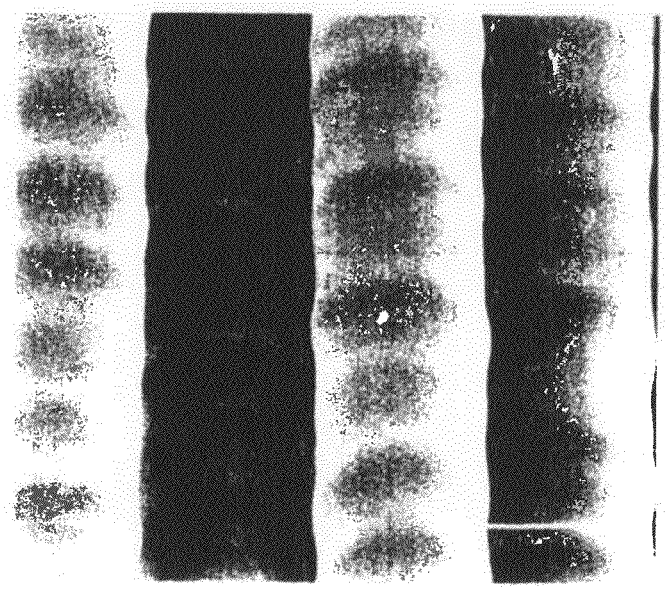
FIG. 4 is a photograph taken by a scanning electron microscope of a polypropylene fiber obtained in Example 1.

Moreover, when a photograph of the polypropylene drawn yarn [polypropylene fiber (a-1)] obtained in the item (3) was taken using a scanning electron microscope ("S-510", manufactured by HITACHI) (at a magnification of 1,000 times). The results were as shown in FIG. 4.

Example 2

Production of Polypropylene Fiber (a-2)

(1) Following the procedure of Example 1(1) except changing the taking up speed of an undrawn yarn to 3,000 m/min, a polypropylene undrawn yarn was produced. The polypropylene undrawn yarn was wound around a bobbin, and stored at room temperature (total fiber fineness of the polypropylene undrawn yarn=214 dtex/24 filaments).

(2) The polypropylene undrawn yarn obtained in the item (1) was wound off from the bobbin, introduced in a hot-air oven having a temperature of 128° C., and subjected to pre-drawing to be drawn by 3.1 times in 2 steps to thereby produce a polypropylene pre-drawn yarn. Then, the polypropylene pre-drawn yarn was wound around the bobbin, and stored at room temperature (total fiber fineness of the polypropylene pre-drawn yarn=69 dtex/24 filaments, heat-absorption starting temperature=155.3° C.)

(3) The polypropylene pre-drawn yarn obtained in the item (2) was wound off from the bobbin, introduced in a hot-air oven having a temperature of 172° C., and subjected to post-drawing under the conditions of a deformation rate of 1.8 times/min and a draw tension of 1.34 cN/dtex to be drawn by 1.5 times in 3 steps to thereby produce a polypropylene drawn yarn having a total drawing magnification of 4.7 times (total fiber fineness=46 dtex/24 filaments) [polypropylene fiber (a-2)].

(4) With respect to the polypropylene drawn yarn [polypropylene fiber (a-2)] obtained in the item (3), the DSC measurements [measurements of endothermic peak shape, half width, and melt enthalpy change ($\Delta H$)] and measurements of fiber strength, friction melting resistance, dimension of the surface irregularities (the average interval and the average height of the irregularities), and water retention rate were performed by the above-mentioned method. The results were as shown in Table 1.

Example 3

Production of Polypropylene Fiber (a-3)

(1) The same polypropylene as used in Example 1(1) was put in an extruder of a melt spinning device, and melt-kneaded at 240° C. Then, the resultant was discharged at an amount of 20.2 g/min from a spinneret [number of holes (cross-shaped hole): 48, hole diameter: 0.2 mm] having a temperature of 245° C. and attached to a spinning head. Then, a polypropylene undrawn yarn was produced at a taking up speed of 800 m/min, wound around a bobbin, and stored at room temperature (total fiber fineness of the polypropylene undrawn yarn=436 dtex/48 filaments).

(2) The polypropylene undrawn yarn obtained in the item (1) was wound off from the bobbin, introduced in a hot-air oven having a temperature of 138° C., and subjected to pre-drawing to be drawn by 3.9 times in 2 steps to thereby produce a polypropylene pre-drawn yarn. Then, the polypropylene pre-drawn yarn was wound around the bobbin, and stored at room temperature (total fiber fineness of the polypropylene pre-drawn yarn=112 dtex/48 filaments, heat-absorption starting temperature=155.2° C.).

(3) The polypropylene pre-drawn yarn obtained in the item (2) was wound off from the bobbin, introduced in a hot-air oven having a temperature of 172° C., and subjected to post-drawing under the conditions of a deformation rate of 2.1 times/min and a draw tension of 1.12 cN/dtex to be drawn by 1.3 times in a single step to thereby produce a polypropylene drawn yarn having a total drawing magnification of 5.1 times (total fiber fineness=86 dtex/48 filaments) [polypropylene fiber (a-3)].

(4) With respect to the polypropylene drawn yarn [polypropylene fiber (a-3)] obtained in the item (3), the DSC measurements [measurements of endothermic peak shape, half width, and melt enthalpy change ($\Delta H$)] and measurements of fiber strength, friction melting resistance, dimension of the surface irregularities (the average interval and the average height of the irregularities), and water retention rate were performed by the above-mentioned method. The results were as shown in Table 1.

Example 4

Production of Polypropylene Fiber (a-4)

(1) A polypropylene undrawn yarn was produced using the same polypropylene as used in Example 1(1) under the same conditions as in Example 1(1), and wound around a bobbin.

(2) The polypropylene undrawn yarn obtained in the item (1) was wound off from the bobbin, and subjected to pre-drawing under the same conditions as in Example 1(2) to thereby produce a polypropylene pre-drawn yarn. The polypropylene pre-drawn yarn was wound around the bobbin.

(3) The polypropylene pre-drawn yarn obtained in the item (2) was wound off from the bobbin, introduced in a hot-air oven having a temperature of 180° C., and subjected to post-drawing under the conditions of a deformation rate of 1.7 times/min and a draw tension of 1.06 cN/dtex to be drawn by 1.3 times in 3 steps to thereby produce a polypropylene drawn yarn having a total drawing magnification of 6.0 times (total fiber fineness=50 dtex/24 filaments) [polypropylene fiber (a-4)].

(4) With respect to the polypropylene drawn yarn [polypropylene fiber (a-4)] obtained in the item (3), the DSC measurements [measurements of endothermic peak shape, half width, and melt enthalpy change ($\Delta H$)] and measurements of fiber strength, friction melting resistance, dimension of the surface irregularities (the average interval and the average height of the irregularities), and water retention rate were performed by the above-mentioned method.

The results were as shown in Table 1.

Example 5

Production of Polypropylene Fiber (a-5)

(1) A polypropylene undrawn yarn was produced using polypropylene ["ZS1337A", manufactured by Prime Polymer Co., Ltd., IPF=96%, MFR=20 g/10 min (230° C., load: 2.16 kg)] under the same melt spinning conditions as in Example 1(1), and wound around a bobbin (total fiber fineness of the polypropylene undrawn yarn=288 dtex/24 filaments).

(2) The polypropylene undrawn yarn obtained in the item (1) was wound off from the bobbin, introduced in a hot-air oven having a temperature of 135° C., and subjected to pre-drawing to be drawn by 4.8 times in 2 steps to thereby produce a polypropylene pre-drawn yarn. Then, the polypropylene pre-drawn yarn was wound around the bobbin, and stored at room temperature (total fiber fineness of the polypropylene pre-drawn yarn=60 dtex/24 filaments, heat-absorption starting temperature=152.0° C.).

(3) The polypropylene pre-drawn yarn obtained in the item (2) was wound off from the bobbin, introduced in a hot-air oven having a temperature of 172° C., and subjected to post-drawing under the conditions of a deformation rate of 1.6 times/min and a draw tension of 1.33 cN/dtex to be drawn by 1.8 times in 3 steps to thereby produce a polypropylene drawn yarn having a total drawing magnification of 8.6 times (total fiber fineness=50 dtex/24 filaments) [polypropylene fiber (a-5)].

(4) With respect to the polypropylene drawn yarn [polypropylene fiber (a-5)] obtained in the item (3), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 1.

Example 6

Production of Polypropylene Fiber (a-6)

(1) A polypropylene undrawn yarn was produced using polypropylene [IPF=98%, MFR=16 g/10 min (230° C., load: 2.16 kg)] under the same melt spinning conditions as in Example 1(1), and wound around a bobbin (total fiber fineness of the undrawn yarn =293 dtex/24 filaments).

(2) The polypropylene undrawn yarn obtained in the item (1) was wound off from the bobbin, introduced in a hot-air oven having a temperature of 128° C., and subjected to pre-drawing to be drawn by 4.6 times in 2 steps to thereby produce a polypropylene pre-drawn yarn. Then, the polypropylene pre-drawn yarn was wound around the bobbin, and stored at room temperature (total fiber fineness of the polypropylene pre-drawn yarn=64 dtex/24 filaments, heat-absorption starting temperature=156.4° C.).

(3) The polypropylene pre-drawn yarn obtained in the item (2) was wound off from the bobbin, introduced in a hot-air oven having a temperature of 178° C., and subjected to post-drawing under the conditions of a deformation rate of 2.8 times/min and a draw tension of 1.54 cN/dtex to be drawn by 2.2 times in 4 steps to thereby produce a polypropylene drawn yarn having a total drawing magnification of 10.1 times (total fiber fineness=29 dtex/24 filaments) [polypropylene fiber (a-6)].

(4) With respect to the polypropylene drawn yarn [polypropylene fiber (a-6)] obtained in the item (3), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 2.

Example 7

Production of Polypropylene Fiber (a-7)

(1) A polypropylene undrawn yarn was produced using a mixture (IPF of the mixture=95.5%) in which polypropylene [IPF=98%, MFR=16 g/10 min (230° C., load: 2.16 kg)] and polypropylene ["Y3002G", manufactured by Prime Polymer Co., Ltd., IPF=93%, MFR=30 g/10 min (230° C., load: 2.16 kg)] were mixed at a mass ratio of 1:1 under the same melt spinning conditions as in Example 1(1), and wound around a bobbin (total fiber fineness of the polypropylene undrawn yarn=288 dtex/24 filaments).

(2) The polypropylene undrawn yarn obtained in the item (1) was wound off from the bobbin, introduced in a hot-air oven having a temperature of 128° C., and subjected to pre-drawing to be drawn by 4.6 times in 2 steps to thereby produce a polypropylene pre-drawn yarn. Then, the polypropylene pre-drawn yarn was wound around the bobbin, and stored at room temperature (total fiber fineness of the polypropylene pre-drawn yarn=63 dtex/24 filaments, heat-absorption starting temperature=152.5° C.).

(3) The polypropylene pre-drawn yarn obtained in the item (2) was wound off from the bobbin, introduced in a hot-air oven having a temperature of 172° C., and subjected to post-drawing under the conditions of a deformation rate of 1.7 times/min and a draw tension of 1.20 cN/dtex to be drawn by 1.3 times in 3 steps to thereby produce a polypropylene drawn yarn having a total drawing magnification of 6.0 times (total fiber fineness=48 dtex/24 filaments) [polypropylene fiber (a-7)].

(4) With respect to the polypropylene drawn yarn [polypropylene fiber (a-7)] obtained in the item (3), the DSC measurements [measurements of endothermic peak shape, half width, and melt enthalpy change (ΔH)] and measurements of fiber strength, dimension of the surface irregularities (the average interval and the average height of the irregularities), and water retention rate were performed by the above-mentioned method. The results were as shown in Table 2.

Example 8

Production of Polypropylene Fiber (a-8)

(1) A spinneret [number of holes (circular hole): 24, hole diameter: 0.2 mm] for producing a sheath-core type composite fiber was attached to a spinning head of a melt spinning device. Polypropylene ("Y3002G", manufactured by Prime Polymer Co., Ltd., IPF=93%) was used as a core component and polypropylene [IPF=98%, MFR=16 g/10 min (230° C., load: 2.16 kg)] was used as a sheath component. Then, the core component and the sheath component were melt-kneaded at 240° C. at a mass ratio of the core component to the sheath component of 1:2. Then, the resultant was discharged at an amount of 22.3 g/min from the spinneret (spinneret temperature: 245° C.), and wound around a bobbin at a taking up speed of 800 m/min to thereby produce a polypropylene undrawn yarn. The polypropylene undrawn yarn was stored at room temperature (total fiber fineness of the polypropylene undrawn yarn=287 dtex/24 filaments).

(2) The polypropylene undrawn yarn obtained in the item (1) was wound off from the bobbin, introduced in a hot-air oven having a temperature of 128° C., and subjected to pre-drawing to be drawn by 4.6 times in 2 steps to thereby produce a polypropylene pre-drawn yarn. Then, the polypropylene pre-drawn yarn was wound around the bobbin, and stored at room temperature (total fiber fineness of the polypropylene pre-drawn yarn=62 dtex/24 filaments, heat-absorption starting temperature=152.2° C.).

(3) The polypropylene pre-drawn yarn obtained in the item (2) was wound off from the bobbin, introduced in a hot-air oven having a temperature of 172° C., and subjected to post-drawing under the conditions of a deformation rate of 1.7 times/min and a draw tension of 1.25 cN/dtex to be drawn by 1.3 times in 3 steps to thereby produce a polypropylene drawn yarn having a total drawing magnification of 6.0 times (total fiber fineness=48 dtex/24 filaments) [polypropylene fiber (a-8)].

(4) With respect to the polypropylene drawn yarn [polypropylene fiber (a-8)] obtained in the item (3), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 2.

Example 9

Production of Polypropylene Fiber (a-9)

(1) A polypropylene undrawn yarn was produced using the same polypropylene as used in Example 1(1) under the same conditions as in Example 1(1), and wound around a bobbin.

(2) The polypropylene undrawn yarn obtained in the item (1) was wound off from the bobbin, introduced in a hot-air oven having a temperature of 128° C., and subjected to pre-drawing to be drawn by 4.6 times in a single step to thereby produce a polypropylene pre-drawn yarn. Then, the polypropylene pre-drawn yarn was wound around the bobbin, and stored at room temperature (total fiber fineness of the polypropylene pre-drawn yarn=63 dtex/24 filaments).

(3) The polypropylene pre-drawn yarn obtained in the item (2) was wound off from the bobbin, and brought into contact with a heat plate having a temperature of 172° C. Then, the resultant was subjected to post-drawing under the conditions of a deformation rate of 13.8 times/min and a draw tension of 1.43 cN/dtex to be drawn by 1.6 times in a single step (period of time contacting the heat plate=15 seconds) to thereby produce a polypropylene drawn yarn having a total drawing magnification of 7.4 times (total fiber fineness=39 dtex/24 filaments) [polypropylene fiber (a-9)].

(4) With respect to the polypropylene drawn yarn [polypropylene fiber (a-9)] obtained in the item (3), the DSC measurements [measurements of endothermic peak shape, half width, and melt enthalpy change ($\Delta H$)] and measurements of fiber strength, friction melting resistance, dimension of the surface irregularities (the average interval and the average height of the irregularities), and water retention rate were performed by the above-mentioned method. The results were as shown in Table 2.

Example 10

[Production of Polypropylene Fiber (a-10)]

(1) A polypropylene undrawn yarn was produced using the same polypropylene as used in Example 1(1) under the same conditions as in Example 1(1), and wound around a bobbin.

(2) The polypropylene undrawn yarn obtained in the item (1) was wound off from the bobbin, and subjected to pre-drawing under the same conditions as in Example 1(2) to thereby produce a polypropylene pre-drawn yarn. The polypropylene pre-drawn yarn was wound around the bobbin.

(3) The polypropylene undrawn yarn obtained in the item (2) was wound off from the bobbin, and a polypropylene drawn yarn was produced under the same conditions as in Example 1(3). The polypropylene pre-drawn yarn was wound around the bobbin.

(4) The polypropylene drawn yarn obtained in the item (3) was wound off from the bobbin, introduced in a hot-air oven having a temperature of 168° C. to be shrank by 2% to thereby produce a polypropylene yarn [polypropylene fiber (a-10)].

(5) With respect to the polypropylene drawn yarn [polypropylene fiber (a-10)] obtained in the item (4), the DSC measurements [measurements of endothermic peak shape, half width, and melt enthalpy change ($\Delta H$)] and measurements of fiber strength, friction melting resistance, dimension of the surface irregularities (the average interval and the average height of the irregularities), and water retention rate were performed by the above-mentioned method. The results were as shown in Table 2.

Example 11

[Production of Polypropylene Fiber (a-11)]

(1) A spinneret [number of holes (circular hole): 24, hole diameter: 0.2 mm] for producing a sheath-core type composite fiber was attached to a spinning head of a melt spinning device. Polyethylene ("HJ490", manufactured by Mitsubishi Kasei, MFR=20 g/10 min) was used as a core component and polypropylene [IPF=98%, MFR=16 g/10 min (230° C., load: 2.16 kg)] was used as a sheath component. Then, the core component and the sheath component were melt-kneaded at 240° C. at a mass ratio of the core component to the sheath component of 1:1. Then, the resultant was discharged at an amount of 22.3 g/min from the spinneret (spinneret temperature: 245° C.), and wound around a bobbin at a taking up speed of 800 m/min to thereby produce a polypropylene undrawn yarn. The polypropylene undrawn yarn was stored at room temperature (total fiber fineness of the polypropylene undrawn yarn=282 dtex/24 filaments).

(2) The polypropylene undrawn yarn obtained in the item (1) was wound off from the bobbin, introduced in a hot-air oven having a temperature of 128° C., and subjected to pre-drawing to be drawn by 4.6 times in 2 steps to thereby produce a polypropylene pre-drawn yarn. Then, the polypropylene pre-drawn yarn was wound around the bobbin, and stored at room temperature (total fiber fineness of the polypropylene pre-drawn yarn=61 dtex/24 filaments, heat-absorption starting temperature=148.7° C.).

(3) The polypropylene pre-drawn yarn obtained in the item (2) was wound off from the bobbin, introduced in a hot-air oven having a temperature of 172° C., and subjected to post-drawing under the conditions of a deformation rate of 1.7 times/min and a draw tension of 1.24 cN/dtex to be drawn by 1.3 times in 3 steps to thereby produce a polypropylene drawn yarn having a total drawing magnification of 6.0 times (total fiber fineness=47 dtex/24 filaments) [polypropylene fiber (a-11)].

(4) With respect to the polypropylene drawn yarn [polypropylene fiber (a-11)] obtained in the item (3), the DSC measurements [measurements of endothermic peak shape, half width, and melt enthalpy change ($\Delta H$)] and measurements of fiber strength, dimension of the surface irregularities (the average interval and the average height of the irregularities), and water retention rate were performed by the above-mentioned method. The results were as shown in Table 2.

Comparative Example 1

[Production of Polypropylene Fiber (b-1)]

(1) A polypropylene undrawn yarn was produced using polypropylene ["Y3002G", manufactured by Prime Polymer Co., Ltd., IPF=93%] under the same melt spinning conditions as in Example 1(1), and wound around a bobbin. The polypropylene undrawn yarn was stored at room temperature (total fiber fineness of the polypropylene undrawn yarn=288 dtex/24 filaments).

(2) The polypropylene undrawn yarn obtained in the item (1) was wound off from the bobbin, introduced in a hot-air oven having a temperature of 128° C., and subjected to pre-drawing to be drawn by 4.6 times in 2 steps to thereby produce a polypropylene pre-drawn yarn. Then, the polypropylene pre-drawn yarn was wound around the bobbin, and stored at room temperature (total fiber fineness of the polypropylene pre-drawn yarn=68 dtex/24 filaments, heat-absorption starting temperature=151.8° C.).

(3) The polypropylene pre-drawn yarn obtained in the item (2) was wound off from the bobbin, introduced in a hot-air oven having a temperature of 172° C., and subjected to post-drawing under the conditions of a deformation rate of 1.7 times/min and a draw tension of 0. 96 cN/dtex to be drawn by 1.3 times in 3 steps to thereby produce a polypropylene drawn yarn having a total drawing magnification of 6.0 times (total fiber fineness=48 dtex/24 filaments) [polypropylene fiber (b-1)].

(4) With respect to the polypropylene drawn yarn [polypropylene fiber (b-1)] obtained in the item (3), the DSC measurements [measurements of endothermic peak shape, half width, and melt enthalpy change (ΔH)] and measurements of fiber strength, friction melting resistance, and water retention rate were performed by the above-mentioned method. The results were as shown in Table 3. It should be noted that the polypropylene fiber obtained in Comparative Example 1 did not have irregularities on the surface.

Comparative Example 2

[Production of Polypropylene Fiber (b-2)]

With respect to the polypropylene pre-drawn yarn [polypropylene fiber (b-2)] obtained in Example 1(2), the DSC measurements [measurements of endothermic peak shape, half width, and melt enthalpy change (ΔH)] and measurements of fiber strength, friction melting resistance, and water retention rate were performed by the above-mentioned method. The results were as shown in Table 3. It should be noted that the polypropylene fiber obtained in Comparative Example 2 did not have irregularities on the surface.

Comparative Example 3

[Production of Polypropylene Fiber (b-3)]

(1) A polypropylene undrawn yarn was produced using the same polypropylene as used in Example 1(1) ["Y2000GV", manufactured by Prime Polymer Co., Ltd., IPF=97%] under the same melt spinning conditions as in Example 1(1), and wound around a bobbin.

(2) The polypropylene pre-drawn yarn obtained in the item (1) was wound off from the bobbin, introduced in a hot-air oven having a temperature of 143° C., and drawn by 6.9 times in a single step to thereby produce a polypropylene drawn yarn (total fiber fineness=42 dtex/24 filaments) [polypropylene fiber (b-3)].

(3) With respect to the polypropylene drawn yarn [polypropylene fiber (b-3)] obtained in the item (2), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 3.

Comparative Example 4

[Production of Polypropylene Fiber (b-4)]

(1) A polypropylene undrawn yarn was produced using the same polypropylene as used in Example 1(1) ["Y2000GV", manufactured by Prime Polymer Co., Ltd., IPF=97%] under the same melt spinning conditions as in Example 1(1), and wound around a bobbin.

(2) The polypropylene undrawn yarn obtained in the item (1) was wound off from the bobbin, and then introduced in a hot water bath having a temperature of 90° C. for pre-drawing by 3.7 times in a single step. Then, the resultant was successively introduced in a hot-air oven having a temperature of 138° C. without winding for post-drawing by 1.2 times, to thereby produce a drawn yarn having a total drawing magnification of 4.4 times (total fiber fineness=65 dtex/24 filaments) [polypropylene fiber (b-4)].

(3) With respect to the polypropylene drawn yarn [polypropylene fiber (b-4)] obtained in the item (2), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 3.

Comparative Example 5

[Production of Polypropylene Fiber (b-5)]

(1) The same polypropylene as used in Example 1(1) ["Y2000GV", manufactured by Prime Polymer Co., Ltd., IPF=97%] was put in an extruder of a melt spinning device, and was melt-kneaded at 270° C. Then, the resultant was discharged at an amount of 9.5 g/min from a spinneret [number of holes (circular hole): 24, hole diameter: 0.2 mm] being attached to a spinning head and having a temperature of 295° C. and taken up at 1,500 m/min, to thereby produce a polypropylene undrawn yarn. The polypropylene undrawn yarn was wound around a bobbin, and stored at room temperature (total fiber fineness of the polypropylene undrawn yarn=65 dtex/24 filaments).

(2) The polypropylene pre-drawn yarn obtained in the item (1) was wound off from the bobbin, introduced in a hot-air oven having a temperature of 130° C., and drawn by 1.5 times in a single step to thereby produce a polypropylene drawn yarn (total fiber fineness=48 dtex/24 filaments) [polypropylene fiber (b-5)].

(3) With respect to the polypropylene drawn yarn [polypropylene fiber (b-5)] obtained in the item (2), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 4.

Comparative Example 6

[Production of Polypropylene Fiber (b-6)]

(1) The same polypropylene as used in Example 1(1) ["Y2000GV", manufactured by Prime Polymer Co., Ltd., IPF=97%] was put in an extruder of a melt spinning device, and was melt-kneaded at 230° C. Then, the resultant was discharged at an amount of 20 g/min from a spinneret [number of holes (circular hole): 30, hole diameter: 0.8 mm] being attached to a spinning head and having a temperature of 300° C. and taken up at 300 m/min, to thereby produce a polypropylene undrawn yarn. The polypropylene undrawn yarn was wound around a bobbin, and stored at room temperature (total fiber fineness of the polypropylene undrawn yarn=535 dtex/24 filaments).

(2) The polypropylene undrawn yarn obtained in the item (1) was wound off from the bobbin, and then drawn by 3.7 times in a single step with a heated roller having a temperature of 110° C. to thereby produce a polypropylene drawn yarn (total fiber fineness=145 dtex/24 filaments).

(3) Both ends of the polypropylene drawn yarn obtained in the item (2) were fixed. After that, the polypropylene drawn yarn was put in an air oven having a temperature of 165° C. for 30 minutes for heat treatment to thereby produce a polypropylene drawn yarn [polypropylene fiber (b-6)].

(4) With respect to the polypropylene drawn yarn [production of polypropylene fiber (b-1)] (polypropylene fiber) obtained in the item (3), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 4.

Comparative Example 7

[Production of Polypropylene Fiber (b-7)]

(1) Polypropylene ["ZS1337A", manufactured by Prime Polymer Co., Ltd., IPF=96%, MFR=20 g/10 min (230° C., load: 2.16 kg)] was put in an extruder of a melt spinning device, and was melt-kneaded at 300° C. Then, the resultant was discharged at an amount of 22.3 g/min from a spinneret [number of holes (circular hole): 24, hole diameter: 0.2 mm] being attached to a spinning head and having a temperature of 320° C. and taken up at 600 m/min, to thereby produce a polypropylene undrawn yarn. The polypropylene undrawn yarn was wound around a bobbin, and stored at room temperature (total fiber fineness of the polypropylene undrawn yarn=304 dtex/24 filaments).

(2) The polypropylene undrawn yarn obtained in the item (1) was wound off from the bobbin, pre-drawn by 1.5 times in a single step with a heated roller having a temperature of 90° C., wound around the bobbin, and then stored at room temperature (total fiber fineness of polypropylene pre-drawn yarn=203 dtex/24 filaments, heat-absorption starting temperature=150.8° C.)

(3) The polypropylene pre-drawn yarn obtained in the item (2) was wound off from the bobbin, introduced in a hot-air oven having a temperature of 138° C., and drawn by 4.9 times in a single step to thereby produce a polypropylene drawn yarn having a total drawing magnification of 7.4 times (total fiber fineness=40.8 dtex/24 filaments) [polypropylene fiber (b-7)].

(4) With respect to the polypropylene drawn yarn [polypropylene fiber (b-7)] obtained in the item (3), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 4.

Comparative Example 8

[Production of Polypropylene Fiber (b-8)]

(1) Polypropylene ["Y2000Gv", manufactured by Prime Polymer Co., Ltd., IPF=97%, MFR=18 g/10 min (230° C., load: 2.16 kg)] was put in an extruder of a melt spinning device, and was melt-kneaded at 255° C. Then, the resultant was discharged at an amount of 35.4 g/min from a spinneret [number of holes (circular hole): 24, hole diameter: 0.2 mm] being attached to a spinning head and having a temperature of 260° C. and taken up at 600 m/min, to thereby produce a polypropylene undrawn yarn. The polypropylene undrawn yarn was wound around a bobbin, and stored at room temperature ("total fiber fineness of the polypropylene undrawn yarn=635 dtex/24 filaments).

(2) The polypropylene undrawn yarn obtained in the item (1) was wound off from the bobbin, and then drawn by 11.5 times in a single step in a steam bath having a temperature of 145° C. to thereby produce a polypropylene drawn yarn (total fiber fineness=55.2 dtex/24 filaments) [polypropylene fiber (b-8)].

(3) With respect to the polypropylene drawn yarn [polypropylene fiber (b-8)] obtained in the item (2), the DSC measurements [measurements of endothermic peak shape, half width, and melt enthalpy change (ΔH)] and measurements of fiber strength, friction melting resistance, dimension of the surface irregularities (the average interval and the average height of the irregularities), and water retention rate were performed by the above-mentioned method. The results were as shown in Table 4.

Comparative Example 9

[Production of Polypropylene Fiber (b-9)]

(1) A polypropylene undrawn yarn was produced using the same polypropylene as used in Example 1(1) ["Y2000GV", manufactured by Prime Polymer Co., Ltd., IPF=97%] under the same melt spinning conditions as in Example 1(1), and wound around a bobbin.

(2) The polypropylene undrawn yarn obtained in the item (1) was wound off from the bobbin, and then introduced in a hot water bath having a temperature of 90° C. for pre-drawing by 3.7 times in a single step. Then, the resultant was successively introduced in a hot-air oven having a temperature of 172° C. without winding for post-drawing by 1.2 times, to thereby produce a drawn yarn having a total drawing magnification of 4.4 times (total fiber fineness=65 dtex/24 filaments) [polypropylene fiber (b-9)].

(3) The polypropylene drawn yarn (polypropylene fiber) obtained in the item (2) had many fluffs, and thus was unusable. Therefore, DSC measurements and measurements of fiber strength, friction melting resistance, dimension of surface irregularities, and water retention rate were not performed.

TABLE 1

|  | Example 1 | Example 2 | Example 3 | Example 4 | Example 5 |
|---|---|---|---|---|---|
| Reference symbol of polypropylene fiber | a-1 | a-2 | a-3 | a-4 | a-5 |
| IPF of raw material polypropylene (%) | 97 | 97 | 97 | 97 | 96 |
| [Fiber production conditions] | | | | | |

TABLE 1-continued

|  | Example 1 | Example 2 | Example 3 | Example 4 | Example 5 |
|---|---|---|---|---|---|
| Production of PP undrawn yarn: | | | | | |
| Melt spinning rate (m/min) | 800 | 3,000 | 800 | 800 | 800 |
| Pre-drawing: | | | | | |
| Drawing temperature (° C.) | 128 | 128 | 138 | 128 | 135 |
| Drawing magnification (times) | 4.6 | 3.1 | 3.9 | 4.6 | 4.8 |
| Heat-absorption starting temperature (° C.)[1)] | 153.5 | 155.3 | 155.2 | 153.5 | 152.0 |
| Post-drawing: | | | | | |
| Drawing temperature (° C.) | 172 | 172 | 172 | 180 | 172 |
| Drawing magnification (times) | 1.3 | 1.5 | 1.3 | 1.3 | 1.8 |
| Deformation rate (times/min) | 1.7 | 1.8 | 2.1 | 1.7 | 1.6 |
| Draw tension (cN/dtex) | 1.18 | 1.34 | 1.12 | 1.06 | 1.33 |
| Total drawing magnification (times) | 6.0 | 4.7 | 5.1 | 6.0 | 8.6 |
| Heat treatment (° C.) | No heat treatment | No heat treatment | No heat treatment | No heat treatment | No heat treatment |
| [Structure and physical properties of polypropylene fiber] | | | | | |
| Single fiber fineness (dtex) | 2.0 | 1.9 | 1.8 | 2.1 | 2.1 |
| Fiber strength (cN/dtex) | 9.6 | 10.4 | 9.4 | 7.4 | 10.2 |
| DSC measurement | | | | | |
| Peak shape | Single | Single | Single | Single | Single |
| Half width of peak (° C.) | 9.5 | 8.8 | 9.6 | 9.6 | 9.1 |
| ΔH (J/g) | 128 | 133 | 128 | 126 | 129 |
| Friction melting resistance (second) | 7.2 | 7.5 | 7.2 | 6.8 | 7.4 |
| Surface irregularities | | | | | |
| Average interval (μm) | 6.6 | 6.8 | 6.9 | 6.6 | 6.6 |
| Average height (μm) | 0.41 | 0.45 | 0.52 | 0.38 | 0.39 |
| Water retention rate (%) | 10.5 | 10.8 | 25.2 | 10.1 | 10.2 |

[1)]Heat-absorption starting temperature of polypropylene drawn fiber after pre-drawing

TABLE 2

|  | Example 6 | Example 7 | Example 8 | Example 9 | Example 10 | Example 11 |
|---|---|---|---|---|---|---|
| Reference symbol of polypropylene fiber | a-6 | a-7 | a-8 | a-9 | a-10 | a-11 |
| IPF of raw material polypropylene (%) | 98 | 95.5 | Core: 93% Sheath: 98% | 97 | 97 | 98[3)] |
| [Fiber production conditions] Production of PP undrawn yarn: | | | | | | |
| Melt spinning rate (m/min) | 800 | 800 | 800 | 800 | 800 | 800 |
| Pre-drawing: | | | | | | |
| Drawing temperature (° C.) | 128 | 128 | 128 | 128 | 128 | 128 |
| Drawing magnification (times) | 4.6 | 4.6 | 4.6 | 4.6 | 4.6 | 4.6 |
| Heat-absorption starting temperature (° C.)[1)] | 156.4 | 152.5 | 152.2 | 153.5 | 153.5 | 148.7 |
| Post-drawing: | | | | | | |
| Drawing temperature (° C.) | 178 | 172 | 172 | 172 | 172 | 172 |
| Drawing magnification (times) | 2.2 | 1.3 | 1.3 | 1.6 | 1.3 | 1.3 |
| Deformation rate (times/min) | 2.8 | 1.7 | 1.7 | 13.8 | 1.7 | 1.7 |
| Draw tension (cN/dtex) | 1.54 | 1.20 | 1.25 | 1.43 | 1.18 | 1.24 |
| Total drawing magnification (times) | 10.1 | 6.0 | 6.0 | 7.4 | 6.0 | 6.0 |

TABLE 2-continued

|  | Example 6 | Example 7 | Example 8 | Example 9 | Example 10 | Example 11 |
|---|---|---|---|---|---|---|
| Heat treatment (° C.) | No heat treatment | No heat treatment | No heat treatment | No heat treatment | 168[2) | No heat treatment |
| [Structure and physical properties of polypropylene fiber] | | | | | | |
| Single fiber fineness (dtex) | 1.2 | 2.0 | 2.0 | 1.6 | 2.1 | 2.0 |
| Fiber strength (cN/dtex) | 11.2 | 8.9 | 9.8 | 10.5 | 9.5 | 8.0 |
| DSC measurement | | | | | | |
| Peak shape | Single | Single | Single | Single | Single | Double |
| Half width of peak (° C.) | 8.0 | 9.7 | 9.0 | 8.6 | 9.4 | 11.8 |
| ΔH(J/g) | 148 | 126 | 129 | 133 | 135 | 120 |
| Friction melting resistance (second) | 8.0 | 7.1 | 7.5 | 7.7 | No measurement | No measurement |
| Surface irregularities | | | | | | |
| Average interval (μm) | 7.3 | 6.6 | 6.8 | 6.6 | 6.6 | 6.6 |
| Average height (μm) | 0.56 | 0.38 | 0.49 | 0.42 | 0.41 | 0.40 |
| Water retention rate (%) | 11.2 | 10.1 | 10.4 | 10.4 | 10.2 | 10.1 |

[1)] Heat-absorption starting temperature of polypropylene drawn fiber after pre-drawing
[2)] 2% shrinkage
[3)] Core: polyethylene (HJ490), Core component:Sheath component = 1:1 (mass ratio)

TABLE 3

|  | Comparative Example 1 | Comparative Example 2 | Comparative Example 3 | Comparative Example 4 |
|---|---|---|---|---|
| Reference symbol of polypropylene fiber | b-1 | b-2 | b-3 | b-4 |
| IPF of raw material polypropylene (%) | 93 | 97 | 97 | 97 |
| [Fiber production conditions] Production of PP undrawn yarn: | | | | |
| Melt spinning rate (m/min) | 800 | 800 | 800 | 800 |
| Pre-drawing: | | | | |
| Drawing temperature (° C.) | 128 | 128 | 143 | 90 |
| Drawing magnification (times) | 4.6 | 4.6 | 6.9 | 3.7 |
| Heat-absorption starting temperature (° C.)[1)] | 151.8 | 153.5 | — | 149.5 |
| Post-drawing: | | | | |
| Drawing temperature (° C.) | 172 | No post-drawing | No post-drawing | 138 |
| Drawing magnification (times) | 1.3 | | | 1.2 |
| Deformation rate (times/min) | 1.7 | | | 1.4 |
| Draw tension (cN/dtex) | 0.96 | | | 0.80 |
| Total drawing magnification (times) | 6.0 | 4.6 | 6.9 | 4.4 |
| Heat treatment (° C.) | No heat treatment | No heat treatment | No heat treatment | No heat treatment |
| [Structure and physical properties of polypropylene fiber] | | | | |
| Single fiber fineness (dtex) | 2.0 | 2.6 | 1.8 | 2.7 |
| Fiber strength (cN/dtex) | 9.6 | 8.5 | 10.0 | 6.7 |
| DSC measurement Peak shape | Double | Double | Double | Double |
| Half width of peak (° C.) | 12.2 | 15.3 | 14.0 | 20.7 |
| ΔH (J/g) | 118 | 110 | 115 | 99 |
| Friction melting resistance (second) | 4.1 | 3.8 | 4.0 | 3.5 |
| Surface irregularities Average interval (μm) | No irregularities | No irregularities | 3.3 | No irregularities |
| Average height (μm) | No irregularities | No irregularities | 0.22 | No irregularities |
| Water retention rate (%) | 4.1 | 3.8 | 8.5 | 3.5 |

[1)] Heat-absorption starting temperature of polypropylene drawn fiber after pre-drawing

TABLE 4

|  | Comparative Example 5 | Comparative Example 6 | Comparative Example 7 | Comparative Example 8 | Comparative Example 9 |
|---|---|---|---|---|---|
| Reference symbol of polypropylene fiber | b-5 | b-6 | b-7 | b-8 | b-9 |
| IPF of raw material polypropylene (%) | 97 | 97 | 96 | 97 | 97 |
| [Fiber production conditions] | | | | | |
| Production of PR undrawn yarn: | | | | | |
| Melt spinning rate (m/min) | 1,500 | 300 | 600 | 600 | 800 |
| Pre-drawing: | | | | | |
| Drawing temperature (° C.) | 130 | 110 | 90 | 145 | 90 |
| Drawing magnification (times) | 1.5 | 3.7 | 1.5 | 11.5 | 3.7 |
| Heat-absorption starting temperature (° C.)[1] | — | — | 150.8 | — | 149.5 |
| Post-drawing: | | | | | |
| Drawing temperature (° C.) | No post-drawing | No post-drawing | 138 | No post-drawing | 172 |
| Drawing magnification (times) | | | 4.9 | | 1.2 |
| Deformation rate (times/min) | | | 4.2 | | 1.6 |
| Draw tension (cN/dtex) | | | 1.20 | | 0.90 |
| Total drawing magnification (times) | 1.5 | 3.7 | 7.4 | 11.5 | 4.4 |
| Heat treatment (° C.) | No heat treatment | 165 | No heat treatment | No heat treatment | No heat treatment |
| [Structure and physical properties of polypropylene fiber] | | | | | |
| Single fiber fineness (dtex) | 1.8 | 6.0 | 1.7 | 2.3 | 2.7 |
| Fiber strength (cN/dtex) | 2.2 | 5.6 | 9.4 | 10.3 | —[2] |
| DSC measurement | | | | | |
| Peak shape | Single | Single | Double | Double | —[2] |
| Half width of peak (° C.) | 9.8 | 9.8 | 11.6 | 16.1 | —[2] |
| ΔH(J/g) | 75 | 82 | 118 | 114 | —[2] |
| Friction melting resistance (second) | 2.7 | 3.3 | 4.0 | 3.6 | —[2] |
| Surface irregularities | | | | | |
| Average interval (μm) | No irregularities | No irregularities | 3.2 | 5.8 | —[2] |
| Average height (μm) | No irregularities | No irregularities | 0.18 | 0.30 | —[2] |
| Water retention rate (%) | 4.2 | 2.8 | 9.0 | 4.8 | —[2] |

[1] Heat-absorption starting temperature of polypropylene drawn fiber after pre-drawing
[2] The obtained polypropylene drawn yarn (polypropylene fiber) had many fluffs, and thus was unusable. Thus, measurement thereof was not performed.

As is clear from Tables 1 and 2 above, in Examples 1 to 10, a polypropylene undrawn fiber which was produced by melt-spinning polypropylene having an IPF of 94% or more, and then cooling the resultant to solidify was subjected to pre-drawing and post-drawing under the conditions defined in the present invention, to thereby produce a polypropylene fiber having a single fiber fineness of 3 dtex or lower. More specifically, pre-drawing was performed at a temperature of 120 to 150° C. at a drawing magnification of 3 to 10 times, and then post-drawing was performed at a drawing magnification of 1.2 to 3.0 times under the conditions of a temperature of 170 to 190° C., a deformation rate of 1.5 to 15 times/min, and a draw tension of 1.0 to 2.5 cN/dtex to thereby produce a polypropylene fiber having a single fiber fineness of 3 dtex or lower. Thus, a polypropylene fiber can be smoothly obtained in which: the endothermic peak shape by DSC measurement is a single shape having a half width of 10° C. or lower; the melt enthalpy change ΔH is 125 J/g or more; a time taken for frictional melting to start is as long as 6.8 to 8.0 seconds in a frictional melting resistance test, which shows that the heat resistance is excellent; the fiber strength is as high as 7 cN/dtex or higher; irregularities are formed on the surface, the irregularities which have an average interval of 6.5 to 20 μm and an average height of 0.35 to 1 μm as a result of alternate presence of a protruded portion having a large diameter and a non-protruded portion having a small diameter along its fiber axis; and the water retention rate is as high as 10% or higher.

Moreover, in Example 11, a polypropylene fiber (sheath-core type polypropylene fiber) can be smoothly obtained which has: a fiber strength as high as 7 cN/dtex or higher; irregularities on the surface having an average interval of 6.5 to 20 μm and an average height of 0.35 to 1 μm as a result of alternate presence of a protruded portion having a large diameter and a non-protruded portion having a small diameter along its fiber axis; and the water retention retention rate as high as 10% or higher.

In contrast, as is clear from Tables 3 and 4, since the conditions outside the scope specified in the present invention are employed in Comparative Examples 1 to 9, the polypropylene fibers obtained in Comparative Examples 1 to 9 do not satisfy all of high fiber strength, high heat resistance, and high water retentivity together. The polypropylene fibers are inferior in at least one of fiber strength, heat resistance, and water retentivity, and most of the polypropylene fibers are inferior in two or more thereof.

[II] Hydraulic Composition and Hydraulic Product:

In the following Examples 12 to 43 and Comparative Examples 10 to 33, a hydraulic composition and a hydraulic product will be specifically described.

In the following Examples 12 to 43 and Comparative Examples 10 to 33, the bending strength of a hydraulic product (slate and mortar) was determined by the method described below.

(II-1) Bending Strength of Slate:

(i) Rectangular test pieces having a width of 25 mm and a length of 80 mm were cut out from slate molded products (slate molded plates) obtained in the following Examples or Production Examples. In the case of a test piece cut out from a slate molded plate obtained by autoclave curing, after the test piece was immersed in water having a temperature of 20° C. for 3 days and the surface water only was wiped off, the center load bending test was performed using "Autograph AG5000-B" manufactured by Shimadzu Corporation as a tester to determine the maximum bending load. In the case of a test piece cut out from a slate molded plate obtained by natural curing, after the test piece was dried at 40° C. for 3 days, the center load bending test was performed using "Autograph AG5000-B" manufactured by Shimadzu Corporation as a tester to determine the maximum bending load. Then, the maximum bending strength was calculated according to Equation (2) shown below.

More specifically, in the center load bending test, the above-mentioned test piece was fixed in the vicinity of both ends with two fixing devices in such a manner that the distance between lower supporting points (bending span) of the fixing devices was adjusted to 50 mm. In such a state, a load was applied to the center of the test piece in the longitudinal direction with a loading head (center load bending span=50 mm). Then, the loading head was gradually lowered to apply a load up to the test piece was broken. The maximum bending load (A) (unit: N) up to the test piece was broken was read, and the maximum bending strength was determined according to Equation (2) shown below.

In calculation of the maximum bending load, the same slate molded product was subjected to the same test 5 times, and then the average value thereof was calculated to be defined as the maximum bending load.

Maximum bending strength $(N/mm^2) = 1.5 \times A \times B / (W \times D^2)$ (2)

In Equation (2):
A=maximum bending load (N);
B=center load bending span (mm);
W=width (mm) of test piece; and
D=thickness (mm) of test piece.

(ii) Subsequently, using the maximum bending strength determined according to Equation (2) above, a correction bending strength which was obtained by standardizing the bulk density of the slate to 1.45 was determined from Equation (3) shown below to define the correction bending strength as bending strength of the slate.

Correction bending strength $(N/mm^2)$=Maximum bending strength $(N/mm^2) \times (1.45/C)^2$ (3)

In Equation (3):
C=slate bulk density (g/cm$^3$).

It should be noted that the slate bulk density (C) (g/cm$^3$) refers to a value obtained by dividing a mass [dry mass (g)] of a test piece after dried at 105° C. for 12 hours by the volume [thickness (cm)×width (cm)×length (cm)] of the dried test piece. The test piece was obtained by cutting out the cured slate molded product by the above-mentioned method and collecting the test pieces having the same size as the above-mentioned size.

(II-2) Bending Strength of Mortar:

Rectangular test pieces having a width of 50 mm and a length of 180 mm were cut out from mortar molded products (mortar molded plates) obtained in the following Examples or Production Examples, and dried at 40° C. for 3 days. After that, the center load bending test was performed to determine the maximum bending load using the same device as used in the item (II-1) ("Autograph AG5000-B" manufactured by Shimadzu Corporation). Then, the maximum bending strength was calculated according to Equation (2) above.

More specifically, in the center load bending test, the above-mentioned test piece was fixed in the vicinity of both ends with two fixing devices in such a manner that the distance between lower supporting points (bending span) of the fixing devices was adjusted to 150 mm. In such a state, a load is applied to the center of the test piece in the longitudinal direction with a loading head (center load bending span=150 mm). Then, the loading head was gradually lowered, and the maximum bending load (A) (unit: N) after the initial cracking developed was read, and the maximum bending strength was determined according to Equation (2) above.

In calculation of the maximum bending load, the same mortar molded product was subjected to the same test 5 times, and then the average value thereof was calculated to be defined as the maximum bending load.

Examples 12 to 22 and Comparative Examples 10 to 17

Production of Naturally Cured Slate (1) 95 parts by mass of ordinary Portland cement (manufactured by Taiheiyo Cement Corporation), 3 parts by mass of refined pulp ("cello fiber", manufactured by PULTEK CORP), 2 parts by mass of each of polypropylene short fibers obtained by cutting, into a fiber length of 3 to 20 mm, each of the polypropylene fibers (a-1) to (a-11) obtained in Examples 1 to 11 and each of the polypropylene fibers (b-1) to (b-8) obtained in Comparative Examples 1 to 8, and 3,000 parts by mass of water were mixed. The mixtures were stirred at a rotation number of 300 rpm or more to thereby prepare hydraulic compositions for slate. Then, each of the hydraulic compositions was poured on a cotton fabric, and then the liquid was squeezed to thereby obtain sheet-shaped articles.

(2) Ten pieces of the sheet-shaped articles obtained in the item (1) were laminated, and then the laminates were pressure-dehydrated at 45 kg/cm² with a press machine to thereby produce uncured molded sheets.

(3) The molded sheet obtained in the item (2) was wrapped with a polyethylene sheet, and subjected to preliminary curing at 50° C. under saturated humidity conditions for 24 hours. Subsequently, the resultant was cured for 13 days at 20° C. under saturated humidity conditions to thereby obtain a cured slate molded product (slate molded plate) (about 4.2 mm in thickness).

(4) The bending strength of each of the slate molded plates obtained in the item (3) was measured by the above-mentioned method. The results were as illustrated in Table 5 below.

TABLE 5

| | Composition of hydraulic composition for slate[1] | | | | Slate bending strength (N/mm²) |
|---|---|---|---|---|---|
| | Portland cement | Refined pulp | Polypropylene fiber Type[2] | Content | Water | |

| | Portland cement | Refined pulp | Type[2] | Content | Water | (N/mm²) |
|---|---|---|---|---|---|---|
| Example 12 | 95 parts | 3 parts | a-1 | 2 parts | 3,000 parts | 23.0 |
| Example 13 | 95 parts | 3 parts | a-2 | 2 parts | 3,000 parts | 24.5 |
| Example 14 | 95 parts | 3 parts | a-3 | 2 parts | 3,000 parts | 23.4 |
| Example 15 | 95 parts | 3 parts | a-4 | 2 parts | 3,000 parts | 22.8 |
| Example 16 | 95 parts | 3 parts | a-5 | 2 parts | 3,000 parts | 23.3 |
| Example 17 | 95 parts | 3 parts | a-6 | 2 parts | 3,000 parts | 26.5 |
| Example 18 | 95 parts | 3 parts | a-7 | 2 parts | 3,000 parts | 22.7 |
| Example 19 | 95 parts | 3 parts | a-8 | 2 parts | 3,000 parts | 23.5 |
| Example 20 | 95 parts | 3 parts | a-9 | 2 parts | 3,000 parts | 24.8 |
| Example 21 | 95 parts | 3 parts | a-10 | 2 parts | 3,000 parts | 23.2 |
| Example 22 | 95 parts | 3 parts | a-11 | 2 parts | 3,000 parts | 21.5 |
| Comparative Example 10 | 95 parts | 3 parts | b-1 | 2 parts | 3,000 parts | 18.4 |
| Comparative Example 11 | 95 parts | 3 parts | b-2 | 2 parts | 3,000 parts | 17.8 |
| Comparative Example 12 | 95 parts | 3 parts | b-3 | 2 parts | 3,000 parts | 18.2 |
| Comparative Example 13 | 95 parts | 3 parts | b-4 | 2 parts | 3,000 parts | 18.0 |
| Comparative Example 14 | 95 parts | 3 parts | b-5 | 2 parts | 3,000 parts | 14.8 |
| Comparative Example 15 | 95 parts | 3 parts | b-6 | 2 parts | 3,000 parts | 15.1 |
| Comparative Example 16 | 95 parts | 3 parts | b-7 | 2 parts | 3,000 parts | 15.2 |
| Comparative Example 17 | 95 parts | 3 parts | b-8 | 2 parts | 3,000 parts | 15.0 |

[1]Part refers to "part by mass".
[2]Polypropylene fiber obtained in each of Examples 1 to 11 and Comparative Examples 1 to 8

As is clear from Table 5 above, in Examples 12 to 22, hydraulic compositions for slate were prepared using any of the polypropylene fibers (a-1) to (a-11) in which polypropylene having an IPF of 94% or more is contained, the fiber strength is 7 cN/dtex or more, and the DSC properties satisfy the requirements defined in the present invention; in which the single fiber fineness and irregular properties of the fiber surface satisfy the requirements defined in the present invention; or in which the DSC properties, single fiber fineness, and irregular properties of the fiber surface satisfy the requirements defined in the present invention, the heat resistance and water retention rate are high, and the compatibility with a hydraulic product is excellent, and slate molded products were produced by water curing the hydraulic compositions. Thus, slate molded products excellent in bending strength can be obtained.

In contrast, in Comparative Examples 10 to 17, hydraulic compositions for slate were prepared using any of the polypropylene fibers (b-1) to (b-8) in which both the DSC properties and irregular properties of the fiber surface were outside the scope defined in the present invention and each of which had insufficient heat resistance and compatibility with a hydraulic product, and slate molded products were produced by water curing the hydraulic compositions. Thus, the bending strength of each of the slate molded products obtained in Comparative Examples 10 to 17 was considerably low as compared with those of the slate molded products obtained in Examples 12 to 22.

Examples 23 to 32 and Comparative Examples 18 to 25

Production of Autoclave Cured Slate (1) 57 parts by mass of ordinary Portland cement (manufactured by Taiheiyo Cement Corporation), 38 part by mass of silica stone powder ("#4000", manufactured by Keiwa Rozai Co., Ltd.), 3 parts by mass of refined pulp ("cello fiber", manufactured by PULTEK CORP), 2 parts by mass of each of polypropylene short fibers obtained by cutting, into a fiber length of 3 to 20 mm, each of the polypropylene fibers (a-1) to (a-10) obtained in Examples 1 to 10 and each of the polypropylene fibers (b-1) to (b-8) obtained in Comparative Examples 1 to 8, and 3,000 parts by mass of water were mixed. The mixtures were stirred at a rotation number of 300 rpm or more to thereby prepare hydraulic compositions for slate. Then, each of the hydraulic compositions was poured on a cotton fabric, and then the liquid was squeezed at room temperature to thereby obtain sheet-shaped articles.

(2) Ten pieces of the sheet-shaped articles obtained in the item (1) were laminated, and then the laminates were pressure-dehydrated at 75 kg/cm² with a press machine to thereby produce uncured molded sheets.

(3) The uncured molded sheets obtained in the item (2) were wrapped with a polyethylene sheet, and subjected to preliminary curing at 50° C. under saturated humidity conditions for 24 hours. Subsequently, the resultants were autoclave cured at a temperature of 170° C. for 15 hours or at a temperature of 175° C. for 15 hours to thereby obtain cured slate molded products (slate molded plates) (about 4.0 mm in thickness).

(4) The bending strength of each of the slate molded plates obtained in the item (3) was measured by the above-mentioned method. The results were as illustrated in Table 6 below.

TABLE 6

| | Composition of hydraulic composition for slate[1] | | | | | | Slate bending strength (N/mm²) | |
|---|---|---|---|---|---|---|---|---|
| | Portland cement | Silica stone powder | Refined pulp | Polypropylene fiber Type[2] | Content | Water | Cured at 170° C. | Cured at 175° C. |
| Example 23 | 57 parts | 38 parts | 3 parts | a-1 | 2 parts | 3,000 parts | 22.7 | 22.6 |
| Example 24 | 57 parts | 38 parts | 3 parts | a-2 | 2 parts | 3,000 parts | 23.0 | 24.0 |
| Example 25 | 57 parts | 38 parts | 3 parts | a-3 | 2 parts | 3,000 parts | 23.0 | 22.9 |
| Example 26 | 57 parts | 38 parts | 3 parts | a-4 | 2 parts | 3,000 parts | 22.5 | 22.5 |
| Example 27 | 57 parts | 38 parts | 3 parts | a-5 | 2 parts | 3,000 parts | 22.8 | 22.9 |
| Example 28 | 57 parts | 38 parts | 3 parts | a-6 | 2 parts | 3,000 parts | 25.3 | 25.5 |
| Example 29 | 57 parts | 38 parts | 3 parts | a-7 | 2 parts | 3,000 parts | 22.6 | 22.5 |
| Example 30 | 57 parts | 38 parts | 3 parts | a-8 | 2 parts | 3,000 parts | 22.9 | 22.8 |
| Example 31 | 57 parts | 38 parts | 3 parts | a-9 | 2 parts | 3,000 parts | 23.2 | 24.1 |
| Example 32 | 57 parts | 38 parts | 3 parts | a-10 | 2 parts | 3,000 parts | 22.7 | 22.8 |
| Comparative Example 18 | 57 parts | 38 parts | 3 parts | b-1 | 2 parts | 3,000 parts | 12.0 | 17.1 |
| Comparative Example 19 | 57 parts | 38 parts | 3 parts | b-2 | 2 parts | 3,000 parts | 11.5 | 16.9 |
| Comparative Example 20 | 57 parts | 38 parts | 3 parts | b-3 | 2 parts | 3,000 parts | 12.1 | 18.3 |
| Comparative Example 21 | 57 parts | 38 parts | 3 parts | b-4 | 2 parts | 3,000 parts | 12.0 | 17.2 |
| Comparative Example 22 | 57 parts | 38 parts | 3 parts | b-5 | 2 parts | 3,000 parts | 11.5 | 12.0 |
| Comparative Example 23 | 57 parts | 38 parts | 3 parts | b-6 | 2 parts | 3,000 parts | 11.7 | 13.0 |
| Comparative Example 24 | 57 parts | 38 parts | 3 parts | b-7 | 2 parts | 3,000 parts | 12.0 | 15.0 |
| Comparative Example 25 | 57 parts | 38 parts | 3 parts | b-8 | 2 parts | 3,000 parts | 11.9 | 15.0 |

[1] Part refers to "part by mass".
[2] Polypropylene fibers (a-1) to (a-10) obtained in Examples 1 to 11 and Polypropylene fibers (b-1) to (b-8) obtained in Comparative Examples 1 to 8

As is clear from Table 6 above, in Examples 23 to 32, hydraulic compositions for slate were prepared using any of the polypropylene fibers (a-1) to (a-10) in which polypropylene having an IPF of 94% or more is contained, the fiber strength is 7 cN/dtex or more, the DSC properties satisfy the requirements defined in the present invention, the heat resistance is excellent, the irregular properties of the fiber surface satisfy the requirements defined in the present invention, the water retention rate is high, and the compatibility with a hydraulic product is excellent, and the hydraulic compositions were autoclave cured at a temperature as high as 170 or 175° C., whereby slate molded products excellent in bending strength can be obtained in a short curing time.

In contrast, in Comparative Examples 18 to 25, hydraulic compositions for slate were prepared using any of the polypropylene fibers (b-1) to (b-8) in which both the DSC properties and irregular properties of the fiber surface were outside the scope defined in the present invention, and the hydraulic compositions were autoclave cured at a temperature as high as 170 or 175° C. However, the polypropylene fibers (b-1) to (b-8) blended in the hydraulic compositions were insufficient in heat resistance. Thus, the bending strength of each of the slate molded products obtained in Comparative Examples 18 to 25 after autoclave curing was considerably low as compared with those of the slate molded products obtained in Examples 23 to 32.

Examples 33 to 43 and Comparative Examples 26 to 33

Production of Mortar (1) 68.7 parts by mass of ordinary Portland cement (manufactured by Taiheiyo Cement Corporation), 30 parts by mass of sand (silica sand No. 7), 0.1 part by mass of methylcellulose ("90SH-4000", manufactured by Shin-Etsu Chemical Co., Ltd.), 0.2 part by mass of water reducing agent ("Rheobuild SP-8N", manufactured by BASF Pozzolith Ltd.), 1 part by mass of each of polypropylene short fibers obtained by cutting, into a fiber length of 3 to 20 mm, each of the polypropylene fibers (a-1) to (a-11) obtained in Examples 1 to 10 and each of the polypropylene fibers (b-1) to (b-8) obtained in Comparative Examples 1 to 8, and 31 parts by mass of water were mixed and kneaded with a Hobart mixer. The resultants were poured in a mold of 10 mm×20 mm×25 mm, and pressure-dehydrated at 20 kg/cm², to thereby form uncured molded products.

(2) The uncured molded products obtained in the item (1) were wrapped with a polyethylene sheet, and subjected to preliminary curing at 50° C. under saturated humidity conditions for 24 hours. Subsequently, the resultants were cured at 20° C. under saturated humidity conditions for 13 days to thereby obtain water-cured mortar molded products (mortar molded plates).

(3) The bending strength of each of the mortar molded plates obtained in the item (2) was measured by the above-mentioned method. The results were as illustrated in Table 7 below.

water curing the hydraulic compositions. Thus, mortar molded products excellent in bending strength can be obtained.

In contrast, in Comparative Examples 26 to 33, hydraulic compositions for mortar were prepared using any of the polypropylene fibers (b-1) to (b-8) in which both the DSC properties and irregular properties of the fiber surface were outside the scope defined in the present invention and each of which had insufficient heat resistance and compatibility with

TABLE 7

|  | Composition of hydraulic composition for mortar[1] | | | | | | Mortar bending strength (N/mm$^2$) |
|---|---|---|---|---|---|---|---|
|  | Portland cement | Sand | Methylcellulose | Water reducing agent | Polypropylene fiber Type[2] | Polypropylene fiber Content | Water |
| Example 33 | 68.7 parts | 30 parts | 0.1 part | 0.2 part | a-1 | 1 part | 31 parts | 11.5 |
| Example 34 | 68.7 parts | 30 parts | 0.1 part | 0.2 part | a-2 | 1 part | 31 parts | 11.8 |
| Example 35 | 68.7 parts | 30 parts | 0.1 part | 0.2 part | a-3 | 1 part | 31 parts | 11.9 |
| Example 36 | 68.7 parts | 30 parts | 0.1 part | 0.2 part | a-4 | 1 part | 31 parts | 11.4 |
| Example 37 | 68.7 parts | 30 parts | 0.1 part | 0.2 part | a-5 | 1 part | 31 parts | 11.5 |
| Example 38 | 68.7 parts | 30 parts | 0.1 part | 0.2 part | a-6 | 1 part | 31 parts | 13.5 |
| Example 39 | 68.7 parts | 30 parts | 0.1 part | 0.2 part | a-7 | 1 part | 31 parts | 11.5 |
| Example 40 | 68.7 parts | 30 parts | 0.1 part | 0.2 part | a-8 | 1 part | 31 parts | 11.5 |
| Example 41 | 68.7 parts | 30 parts | 0.1 part | 0.2 part | a-9 | 1 part | 31 parts | 11.6 |
| Example 42 | 68.7 parts | 30 parts | 0.1 part | 0.2 part | a-10 | 1 part | 31 parts | 11.6 |
| Example 43 | 68.7 parts | 30 parts | 0.1 part | 0.2 part | a-11 | 1 part | 31 parts | 11.2 |
| Comparative Example 26 | 68.7 parts | 30 parts | 0.1 part | 0.2 part | b-1 | 1 part | 31 parts | 10.0 |
| Comparative Example 27 | 68.7 parts | 30 parts | 0.1 part | 0.2 part | b-2 | 1 part | 31 parts | 10.2 |
| Comparative Example 28 | 68.7 parts | 30 parts | 0.1 part | 0.2 part | b-3 | 1 part | 31 parts | 10.0 |
| Comparative Example 29 | 68.7 parts | 30 parts | 0.1 part | 0.2 part | b-4 | 1 part | 31 parts | 10.0 |
| Comparative Example 30 | 68.7 parts | 30 parts | 0.1 part | 0.2 part | b-5 | 1 part | 31 parts | 6.2 |
| Comparative Example 31 | 68.7 parts | 30 parts | 0.1 part | 0.2 part | b-6 | 1 part | 31 parts | 7.0 |
| Comparative Example 32 | 68.7 parts | 30 parts | 0.1 part | 0.2 part | b-7 | 1 part | 31 parts | 6.2 |
| Comparative Example 33 | 68.7 parts | 30 parts | 0.1 part | 0.2 part | b-8 | 1 part | 31 parts | 5.5 |

[1]Part refers to "part by mass".
[2]Polypropylene fibers (a-1) to (a-11) obtained in Examples 1 to 11 and Polypropylene fibers (b-1) to (b-8) obtained in Comparative Examples 1 to 8

As is clear from Table 7 above, in Examples 33 to 43, hydraulic compositions for mortar were prepared using any of the polypropylene fibers (a-1) to (a-11) of the present invention in which polypropylene having an IPF of 94% or more is contained, the fiber strength is 7 cN/dtex or more, and the DSC properties satisfy the requirements defined in the present invention; in which the single fiber fineness and irregular properties of the fiber surface satisfy the requirements defined in the present invention; or in which the DSC properties, single fiber fineness, and irregular properties of the fiber surface satisfy the requirements defined in the present invention, the heat resistance and water retention rate are high, and the compatibility with a hydraulic product is excellent, and mortar molded products were produced by a hydraulic product, and mortar molded products were produced by water curing the hydraulic compositions. Thus, the bending strength of each of the mortar molded products obtained in Comparative Examples 26 to 33 was considerably low as compared with those of the mortar molded products obtained in Examples 33 to 43.

[III] Rope Structure:

A rope structure will be specifically described in Examples 44 to 53 and Comparative Examples 34 to 41 below.

In Examples 44 to 53 and Comparative Examples 34 to 41 below, the Young's modulus of polypropylene yarn and the number of times of grinder twisting friction breakage of a rope were each determined by the method described later.

(III-1) Young's Modulus of Polypropylene Yarn:

Doubling of polypropylene fibers (polypropylene drawn yarn) was performed to achieve a fiber fineness of 2,000 dtex.

The resultants were twisted at 70 T/m to obtain a polypropylene yarn. The obtained polypropylene yarn was left to stand under an atmosphere of a temperature of 20° C. and a relative humidity of 65% for 3 days for humidification according to JIS L 1013. After that, a sample of a given length was collected. Then, both ends of the sample were held in such a manner that the length between holding devices (sample length) was adjusted to 200 mm. Then, the sample was drawn using an "Autograph AG5000-B" manufactured by Shimadzu Corporation at an atmosphere temperature of 120° C. and a tensile rate of 100 mm/min. The tensile stress P(N) when the ductility was 1% was measured, and then the Young's modulus (cN/dtex) was determined from Equation (4) shown later.

The same yarn was subjected to the same operation 10 times to thereby determine the Young's moduli. The average value of the moduli was defined as the Young's modulus at 120 ° C. of the polypropylene yarn per unit dtex:

$$\text{Young's modulus of yarn (cN/dtex)} = P \times 10{,}000/Td \quad (4)$$

where
P=Tensile stress (N) when the ductility is 1%, and
Td=total fiber fineness before drawing polypropylene yarn=2,000 dtex.

Figure 5:
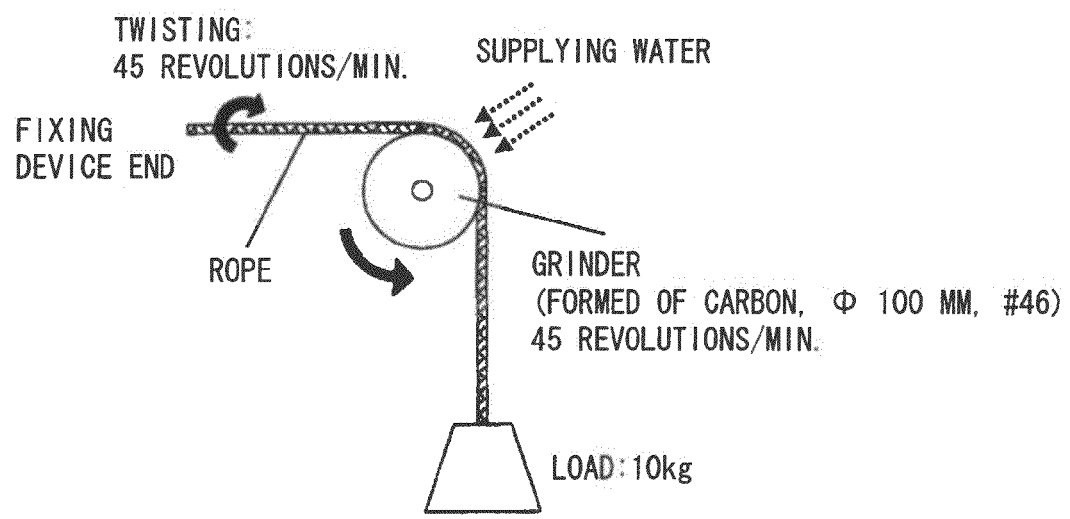
FIG. 5 is a view illustrating the method of measuring the number of times of grinder twisting abrasion breakage of a rope.

(III-2) Number of Times of Grinder Twisting Friction Breakage of Rope:

The sample (rope) was immersed in water at 20° C. for 24 hours, and then twisted under a load of 10 kg at 45 revolutions/min as illustrated in FIG. 5. Simultaneously, a grinder (formed of carbon, diameter=100 mm, particle size #46) was rotated at a rotational speed of 45 revolutions/min while water was supplied so that the rope did not dry, whereby the rope was abraded. Then, the number of revolutions of the grinder at the time of breakage of the rope was read to be defined as a number of times of grinder twisting friction breakage (time).

Examples 44 to 53 and Comparative Examples 34 to 41

(1) Production of Rope Formed of Polypropylene Fiber:

Each of the polypropylene fibers (a-1) to (a-10) (polypropylene drawn yarns) obtained in Examples 1 to 10 and the polypropylene fibers (b-1) to (b-8) (polypropylene drawn yarns) obtained in Comparative Examples 1 to 8 were doubled to achieve a fiber fineness of 1,500 dtex. The resultants were twisted at 80 T/m to form a first strand (double yarn). 4 first strands (double yarns) were twisted at 60 T/m to form a second strand (double yarn). 25 second strands (double yarns) were twisted at 40 T/m to form a third strand (double yarn). Subsequently, 3 third strands (double yarns) were twisted at 30 T/m to form a rope formed of a polypropylene fiber.

The rope formed of a polypropylene fiber thus obtained was measured for the number of times of grinder twisting friction breakage by the above-mentioned method. The results were as shown in Table 8 below.

(2) Measurement of Young's Modulus of Polypropylene Yarn

Each of the polypropylene fibers (a-1) to (a-10) (polypropylene drawn yarns) obtained in Examples 1 to 10 and the polypropylene fibers (b-1) to (b-8) (polypropylene drawn yarns) obtained in Comparative Examples 1 to 8 were doubled to achieve a fiber fineness of 2,000 dtex. The resultants were twisted at 70 T/m to form a polypropylene yarn. The Young's modulus at 120° C. of the polypropylene yarn was determined by the above-mentioned method. The results were as shown in Table 8 below.

TABLE 8

| | Type of polypropylene fiber[1] | Number of times of grinder twisting friction breakage of rope (time) | Young's modulus (cN/dtex) of polypropylene yarn[2] |
|---|---|---|---|
| Example 44 | a-1 | 1,152 | 45 |
| Example 45 | a-2 | 1,211 | 56 |
| Example 46 | a-3 | 1,154 | 48 |
| Example 47 | a-4 | 1,193 | 41 |
| Example 48 | a-5 | 1,201 | 52 |
| Example 49 | a-6 | 1,305 | 68 |
| Example 50 | a-7 | 1,188 | 45 |
| Example 51 | a-8 | 1,197 | 50 |
| Example 52 | a-9 | 1,225 | 55 |
| Example 53 | a-10 | 1,230 | 61 |
| Comparative Example 34 | b-1 | 984 | 26 |
| Comparative Example 35 | b-2 | 977 | 19 |
| Comparative Example 36 | b-3 | 981 | 14 |
| Comparative Example 37 | b-4 | 894 | 12 |
| Comparative Example 38 | b-5 | 792 | 8 |
| Comparative Example 39 | b-6 | 807 | 10 |
| Comparative Example 40 | b-7 | 980 | 23 |
| Comparative Example 41 | b-8 | 968 | 15 |

[1]Polypropylene fibers (a-1) to (a-10) obtained in Examples 1 to 10 and Polypropylene fibers (b-1) to (b-8) obtained in Comparative Examples 1 to 8 (Polypropylene fibers used for the formation of a rope)
[2]Measurement temperature of the Young's modulus = 120° C.

As is clear from Table 8 above, in Examples 44 to 53, ropes were prepared using any of the polypropylene fibers (a-1) to (a-10) of the present invention in which polypropylene having an IPF of 94% or more is contained, the fiber strength is 7 cN/dtex or more, and the DSC properties satisfy the requirements defined in the present invention; in which the single fiber fineness and irregular properties of the fiber surface satisfy the requirements defined in the present invention; or in which the DSC properties, single fiber fineness, and irregular properties of the fiber surface satisfy the requirements defined in the present invention, the heat resistance is high, and given irregularities are formed. Thus, the ropes obtained in Examples 44 to 53 each have a number of times of grinder twisting friction breakage as high as 1,152 to 1,305 times, are less likely to break owing to frictional heat at the time of friction, and are excellent in heat resistance.

In contrast, in Comparative Examples 34 to 41, ropes were prepared using any of the polypropylene fibers (b-1) to (b-8) in which both the DSC properties and irregular properties of the fiber surface were outside the scope defined in the present invention. Thus, the ropes obtained in Comparative Examples 34 to 41 each had a number of times of grinder twisting friction breakage of 792 to 984 times, which is as low as about 60 to 85% of the number of times of grinder twisting friction breakage of each of the ropes of Examples 44 to 53, were inferior to the ropes of Examples 44 to 53 in heat resistance, and were broken owing to frictional heat at an early stage.

Further, as is clear from Table 8 above, in Examples 44 to 53, ropes were prepared using any of the polypropylene fibers (a-1) to (a-10) in which polypropylene having an IPF of 94% or more is contained, the fiber strength is 7 cN/dtex or more, and the DSC properties satisfy the requirements defined in the present invention; in which the single fiber fineness and irregular properties of the fiber surface satisfy the requirements defined in the present invention; or in which the DSC properties, single fiber fineness, and irregular properties of the fiber surface satisfy the requirements defined in the present invention, the heat resistance is high, and given irregularities are formed. Thus, the polypropylene yarn (strand) formed in an early stage in the rope production process: has a Young's modulus at 120° C. as high as 41 to 68 cN/dtex; shows less drawing at a high temperature; is twisted closely; and is excellent in mechanical properties such as drawing resistance, and wearing resistance, and moreover heat resistance.

In contrast, in Comparative Examples 34 to 41, ropes were prepared using any of the polypropylene fibers (b-1) to (b-8) in which both the DSC properties and irregular properties of the fiber surface were outside the scope defined in the present invention. Thus, the polypropylene yarn (strand) formed in an early stage in the rope production process: has a Young's modulus at 120° C. of 8 to 26 cN/dtex, which is considerably lower than that of each of the ropes of Examples 44 to 53; is sharply drawn at a high temperature; and is insufficient in mechanical properties such as drawing resistance and wearing resistance, and moreover heat resistance.

[IV] Sheet-Shaped Fiber Structure:

A sheet-shaped fiber structure will be specifically described in Examples 54 to 61 and Comparative Examples 42 to 46 below.

In Examples 54 to 61 and Comparative Examples 42 to 46 below, measurement of the water retention rate of a sheet-shaped fiber structure and evaluation of process properties of a cylinder drying treatment were performed as described below.

(IV-1) Water Retention Rate of Sheet-Shaped Fiber Structure (Nonwoven Fabric Formed of Polypropylene Fiber):

1 g of a sheet-shaped fiber structure (nonwoven fabric formed of polypropylene fiber) was collected and dried at 105° C. for 5 hours, and its mass (M3) was measured. The above-mentioned dried sample was immersed in 30 ml of ion exchange water, and left to stand at 20° C. for 10 minutes. After that, the sample was taken out, and put in a desktop centrifugal machine ("H-27F", manufactured by KOKU-SAN) while uncovered (without being wrapped with another material). Then, centrifugal dehydration was performed at a temperature of 20° C. and a rotational speed of 3,000 rpm for 5 minutes. The mass (M4) of the sample at that time was measured, and then the water retention rate (mass %) of the sheet-shaped fiber structure was determined from Equation (5) shown later.

Water retention rate (mass %) of sheet-shaped fiber structure=$\{(M4-M3)/M3\} \times 100$    (5)

(IV-2) Process Properties of Cylinder Drying Treatment of Sheet-Shaped Fiber Structure:

The process properties of a cylinder drying treatment of a sheet-shaped fiber structure were evaluated according to the following evaluation criteria.

[Evaluation Criteria of Process Properties of Cylinder Drying Treatment]

Excellent: No adhesion of a polypropylene fiber sheet to a cylinder is observed, the sheet favorably passes through the cylinder, texture after the drying treatment is good, and reduction in water retention rate is not observed.

Poor: Adhesion of a polypropylene fiber sheet to a cylinder is observed, the sheet passes through the cylinder with difficulty, and reduction in, for example, water retention rate after the drying treatment occurs.

Examples 54-61

Production of Sheet-Shaped Fiber Structure (1) Each of the polypropylene fibers (a-1) to (a-3) and (a-5) to (a-9) obtained in Examples 1 to 3 and 5 to 9 was cut into 51 mm of fiber length to form a short fiber. Carding, hydroentanglement, a calendar treatment (temperature of 140° C.), and a cylinder drying treatment (temperature of 170° C., transfer rate of 50 cm/second) were successively performed to produce a sheet-shaped fiber structure (nonwoven fabric formed of polypropylene fiber).

(2) The sheet-shaped fiber structure (nonwoven fabric formed of polypropylene fiber) obtained in the item (1) was measured or evaluated for the water retention rate and the process properties of the cylinder drying treatment by the above-mentioned methods. The results were as shown in Table 9 below.

Examples 42-46

Production of Sheet-Shaped Fiber Structure (1) Each of the polypropylene fibers (b-1) to (b-3), and (b-7) and (b-8) obtained in Comparative Examples 1 to 3, and 7 and 8 was cut into 51 mm of fiber length to form a short fiber. Carding, hydroentanglement, a calendar treatment (temperature of 140° C.), and a cylinder drying treatment (temperature of 170° C., transfer rate of 50 cm/second) were successively performed under conditions identical to those of Examples 51 to 58 to produce a sheet-shaped fiber structure (nonwoven fabric formed of polypropylene fibers).

(2) The sheet-shaped fiber structure (nonwoven fabric formed of polypropylene fibers) obtained in the item (1) was measured or evaluated for the water retention rate and the process properties of the cylinder drying treatment by the above-mentioned method. The results were as shown in Table 9 below.

TABLE 9

| | | Sheet-shaped fiber structure (Nonwoven fabric formed of polypropylene fibers) | |
| --- | --- | --- | --- |
| | Type of polypropylene fiber[1] | Water retention rate (mass %) | Process properties of cylinder drying treatment |
| Example 54 | a-1 | 10.3 | Good |
| Example 55 | a-2 | 11.0 | Good |
| Example 56 | a-3 | 25.0 | Good |
| Example 57 | a-5 | 10.3 | Good |
| Example 58 | a-6 | 11.1 | Good |
| Example 59 | a-7 | 10.5 | Good |
| Example 60 | a-8 | 10.2 | Good |
| Example 61 | a-9 | 10.4 | Good |
| Comparative Example 42 | b-1 | 4.2 | Bad |
| Comparative Example 43 | b-2 | 3.5 | Bad |
| Comparative Example 44 | b-3 | 3.9 | Bad |
| Comparative Example 45 | b-7 | 8.0 | Bad |
| Comparative Example 46 | b-8 | 4.8 | Bad |

[1]Polypropylene fiber obtained in each of Examples 1 to 3 and 5 to 9, and Comparative Examples 1 to 3, 7, and 8

As is clear from Table 9 above, in Examples 54 to 61, sheet-shaped fiber structures (nonwoven fabrics formed of polypropylene fibers) were prepared using any of the polypropylene fibers (a-1) to (a-3) and (a-5) to (a-9) of the present invention in which polypropylene having an IPF of 94% or more is contained, the fiber strength is 7 cN/dtex or more, and the single fiber fineness and irregular properties of the fiber surface satisfy the requirements defined in the present invention; the DSC properties satisfy the requirements defined in the present invention; or in which the single fiber fineness, irregular properties of the fiber surface, and DSC properties satisfy the requirements defined in the present invention. Thus, the sheet-shaped fiber structures (nonwoven fabrics formed of polypropylene fibers) obtained in Examples 54 to 61 each have: a water retention rate as high as 10.2 to 25.0 mass %; excellent water retentivity and excellent heat resistance; and favorable process properties of a cylinder drying treatment.

In contrast, in Comparative Examples 42 to 46, sheet-shaped fiber structures were prepared using any of the polypropylene fibers (b-1) to (b-3), (b-7), and (b-8) in which both irregular properties of the fiber surface and the DSC properties were outside the scope defined in the present invention. Thus, each of the sheet-shaped fiber structures (nonwoven fabrics formed of polypropylene fibers) obtained in Comparative Examples 42 to 46: has a water retention rate of 3.5 to 8.0 mass %, which is considerably low as compared with those of the sheet-shaped fiber structures (nonwoven fabrics formed of polypropylene fibers) obtained in Examples 54 to 61; has poor water retentivity; has bad process properties of a cylinder drying treatment; and moreover is markedly inferior in heat resistance to the sheet-shaped fiber structures (nonwoven fabrics formed of polypropylene fibers) obtained in Examples 54 to 61.

[V] Composite Material and Molded Product Each Containing Polypropylene Fiber:

A composite material and molded product each containing a polypropylene fiber will be specifically described in Examples 62 to 70 and Comparative Examples 47 to 49 below.

In Examples 62 to 70 and Comparative Examples 47 to 49 below, various physical properties of a molded product were measured as described below.

(V-1) Tensile Strength of Injection-Molded Product:

The injection-molded products (test pieces produced by injection molding) obtained in Examples 62 to 64 and Comparative Example 47 below were each measured for a tensile strength according to JIS K7160 (ISO 527-1).

(V-2) Charpy Impact Strength of Injection-Molded Product:

The injection-molded products (test pieces produced by injection molding) obtained in Examples 62 to 64 and Comparative Example 47 below were each measured for a Charpy impact strength with a notch according to JIS 7111 (ISO 179-1).

(V-3) Tensile Strength of Sheet-Shaped Molded Product:

Dumbbell-shaped test pieces (No. 1) were cut out from the sheet-shaped molded products (1 mm in thickness) obtained in Examples 65 to 67 and Comparative Example 48 below according to JIS K6773, and the tensile strength of each of the dumbbell-shaped test pieces was measured according to JIS K6773.

(V-4) Modulus of Elasticity in Bending and Bending Strength of Laminate-Molded Product:

Test pieces (length×width×thickness=90 mm×15 mm×8 mm) were cut out from the laminate-molded products obtained in Examples 68 to 70 and Comparative Example 49 below, and a three-point bending test was performed according to JIS K7017 to thereby determine the modulus of elasticity in bending and bending strength of each of the test pieces.

Examples 62 to 64 and Comparative Example 47

Production of Composite Material (Polyethylene Composition) and Injection-Molded Product Each Containing Short Fiber-Shaped Polypropylene Fiber (1) Each of the polypropylene fibers (a-1) to (a-3) obtained in Examples 1 to 3 and the polypropylene fiber (b-2) obtained in Comparative Example 2 was cut into 5 mm length to form short fibers. Each of the polypropylene short fibers and a low density polyethylene resin ("NEO-ZEX 45200", manufactured by Prime Polymer Co., Ltd., MFR=20 g/10 min) were supplied to an extruder at a mass ratio of the low density polyethylene resin to the polypropylene short fiber of 90:10, and melt-kneaded at 160° C. After that, the resultant was extruded and cut to thereby produce a pellet of a composite material (low density polyethylene composition) containing the polypropylene short fiber in a matrix formed of a low density polyethylene.

(2) The pellet obtained in the item (1) was subjected to injection molding using an electromotive injection molding machine ("EC75N II", manufactured by Toshiba Machine Co., Ltd.) under the conditions of a melting temperature of 165° C. and a mold temperature of 30° C. to thereby produce a multiple-purpose test piece (injection-molded product) according to JIS K7139 (ISO-3167).

(3) The test piece (injection-molded product) obtained in the item (2) was measured for the tensile strength and Charpy impact strength by the above-mentioned methods. The results were as shown in Table 10 below.

TABLE 10

| Type of polypropylene fiber[1] | | Physical properties of injection-molded product | |
|---|---|---|---|
| | | Tensile strength (MPa) | Charpy impact strength with notch (KJ/m$^2$) |
| Example 62 | a-1 | 30 | 13.6 |
| Example 63 | a-2 | 32 | 14.3 |
| Example 64 | a-3 | 38 | 15.1 |
| Comparative Example 47 | b-2 | 21 | 5.1 |

[1]Polypropylene fibers (a-1) to (a-3) obtained in Examples 1 to 3 and polypropylene fiber (b-2) obtained in Comparative Example 2

As is clear from Table 10 above, in Examples 62 to 64, composite materials each containing a polypropylene short fiber in a matrix formed of a low density polyethylene were prepared using any of the polypropylene fibers (a-1) to (a-3) of the present invention in which polypropylene having an IPF of 94% or more is contained, the fiber strength is 7 cN/dtex or more, and the DSC properties satisfy the requirements defined in the present invention; in which the single fiber fineness and irregular properties of the fiber surface satisfy the requirements defined in the present invention; or in which the DSC properties, single fiber fineness, and irregular properties of the fiber surface satisfy the requirements defined in the present invention, the heat resistance is high, and given irregularities are formed. Then, a molded product was produced by injection molding using each of the composite materials. Thus, the molded products obtained in Examples 62 to 64 each have high tensile strength and a high Charpy impact strength, and are each excellent in mechanical properties.

In contrast, in Comparative Example 47, a composite material containing a short fiber formed of the polypropylene fiber (b-2) in which both the DSC properties and irregular properties of the fiber surface were outside the scope defined in the present invention in a matrix formed of a low density polyethylene was prepared using. Then, a molded product was produced by using the composite material. Thus, the molded product obtained in Comparative Example 47 has a tensile strength and a Charpy impact strength both of which are considerably low as compared with those of the molded products obtained in Examples 62 to 64, and is markedly inferior in mechanical properties to the molded products of Examples 62 to 64.

Examples 65 to 67 and Comparative Example 48

Production of Composite Material (Polyethylene Composition) and Sheet-Shaped Molded Product Each Containing Short Fiber-Shaped Polypropylene Fiber (1) Each of the polypropylene fibers (a-1) to (a-3) obtained in Examples 1 to 3 and the polypropylene fiber (b-2) obtained in Comparative Example 2 was cut into 5 mm length to form short fibers. Using each of the polypropylene short fibers, a pellet of a composite material (low density polyethylene composition) containing the polypropylene short fiber in a matrix formed of a low density polyethylene was produced completely in the above item (1) of each of the same manner as in the above item (1) of each of Examples 62 to 64.

(2) The pellet obtained in the item (1) was heat-pressed at a temperature of 150° C. to thereby produce a 1 mm thick sheet-shaped molded product.

(3) A dumbbell-shaped test piece (No. 1) was cut out from the sheet-shaped molded product obtained in the item (2) according to JIS K6773, and its tensile strength was measured by the above-mentioned method. The results were as shown in Table 11 below.

TABLE 11

| | Type of polypropylene fiber[1] | Physical properties of sheet-shaped molded product Tensile strength (g/cm) |
|---|---|---|
| Example 65 | a-1 | 23.5 |
| Example 66 | a-2 | 24.1 |
| Example 67 | a-3 | 25.5 |
| Comparative Example 48 | b-2 | 13.2 |

[1]Polypropylene fibers (a-1) to (a-3) obtained in Examples 1 to 3 and polypropylene fiber (b-2) obtained in Comparative Example 2

As is clear from Table 11 above, in Examples 65 to 67, composite materials each containing a polypropylene short fiber in a matrix formed of a low density polyethylene were prepared using any of the polypropylene fibers (a-1) to (a-3) of the present invention in which polypropylene having an IPF of 94% or more is contained, the fiber strength is 7 cN/dtex or more, and the DSC properties satisfy the requirements defined in the present invention; in which the single fiber fineness and irregular properties of the fiber surface satisfy the requirements defined in the present invention; or in which the DSC properties, single fiber fineness, and irregular properties of the fiber surface satisfy the requirements defined in the present invention, the heat resistance is high, and given irregularities are formed. Then, a sheet-shaped molded product was produced by injection molding using each of the composite materials. Thus, the sheet-shaped molded products obtained in Examples 65 to 67 each have a high tensile strength, and each are excellent in mechanical properties.

In contrast, in Comparative Example 48, a composite material containing a short fiber formed of the polypropylene fiber (b-2) in which both the DSC properties and irregular properties of the fiber surface were outside the scope defined in the present invention in a matrix formed of a low density polyethylene was prepared using the polypropylene short fiber. Then, a sheet-shaped molded product was produced by using the composite material. Thus, the sheet-shaped molded product obtained in Comparative Example 48 has a tensile strength considerably low as compared with those of the sheet-shaped molded products obtained in Examples 65 to 67, and is markedly inferior in mechanical properties to the sheet-shaped molded products obtained in Examples 65 to 67.

Examples 68 to 70 and Comparative Example 49

Production of Composite Material and Laminate-Molded Product Each Containing Polypropylene Fiber Fabric (1) The polypropylene fibers (a-1) to (a-3) obtained in Examples 1 to 3 and the polypropylene fiber (b-2) obtained in Comparative Example 2 were bundled to form a yarn (multifilament yarn) of about 1,000 dtex. Then, using the multifilament yarn, a plain-woven fabric was produced in which a base fabric density was 30 pieces/25.4 mm (warp) and 30 pieces/25.4 mm (weft).

(2) The plain-woven fabric obtained in the item (1) was impregnated with epoxy resin [manufactured by Nagase Chemtec Co., Ltd., Main agent: DENATOOL XNR6708, Curing agent: DENATOOL XNH6708, Main agent/Curing agent=100/33(mass ratio)] to thereby prepare an epoxy resin-impregnated plain-woven fabric [Impregnation amount of epoxy resin=58 mass % (1.4 mass % times the plain-woven fabric)]. 10 epoxy resin-impregnated plain-woven fabrics of this kind were laminated by a hand lay-up method. The laminate was dried at 25° C. for 16 hours. After that, the resultant was dried at 60° C. for 2 hours in a hot air convection dryer, and then thermally cured at 120° C. for 3 hours. After that, the resultant was thermally cured at 160° C. for an additional 1 hour. Thus, a 3 mm thick laminate-molded product was produced.

(3) A test piece was cut out from the laminate-molded product obtained in the item (2), and a three-point bending test was performed by the above-mentioned method to thereby determine the modulus of elasticity in bending and bending strength of the test piece. The results are shown in Table 12 below.

TABLE 12

| | Type of polypropylene fiber[1] | Physical properties of laminate-molded product | |
|---|---|---|---|
| | | Modulus of elasticity in bending (GPa) | Tensile strength (MPa) |
| Example 68 | a-1 | 7.2 | 120 |
| Example 69 | a-2 | 8.1 | 132 |
| Example 70 | a-3 | 10.6 | 143 |
| Comparative Example 49 | b-2 | 3.9 | 98 |

[1]Polypropylene fibers (a-1) to (a-3) obtained in Examples 1 to 3 and polypropylene fiber (b-2) obtained in Comparative Example 2

As is clear from Table 12 above, in Examples 68 to 70, using a plain-woven fabric formed of any of the polypropylene fibers (a-1) to (a-3) of the present invention in which polypropylene having an IPF of 94% or more is contained, the fiber strength is 7 cN/dtex or more, and the DSC properties satisfy the requirements defined in the present invention; in which the single fiber fineness and irregular properties of the fiber surface satisfy the requirements defined in the present invention; or in which the DSC properties, single fiber fineness, and irregular properties of the fiber surface satisfy the requirements defined in the present invention, the heat resistance is high, and given irregularities are formed, composite materials each containing the polypropylene fiber plain-woven fabric) in an epoxy resin were produced. Then, each of the composite materials was cured to produce a laminate-molded product. Thus, the laminate-molded products obtained in Examples 68 to 70 have high moduli of elasticity in bending and bending strengths, and are excellent in mechanical properties.

In contrast, in Comparative Example 49, using a plain-woven fabric formed of the polypropylene fiber (b-2) in which both the DSC properties and irregular properties of the fiber surface were outside the scope defined in the present invention, a composite material containing the polypropylene fiber plain-woven fabric in a matrix formed of an epoxy resin was produced. Then, a laminate-molded product was produced using the composite material. Thus, the laminate-molded product obtained in Comparative Example 49 has a modulus of elasticity in bending and a bending strength both of which are considerably low as compared with those of the laminate-molded products obtained in Examples 68 to 70, and is markedly inferior in mechanical properties to the laminate-molded products obtained in Examples 68 to 70.

Industrial Applicability

Of the polypropylene fibers (polypropylene fibers A to C) of the present invention, the polypropylene fibers A and C each have a fiber strength as high as 7 cN/dtex or more and the above-mentioned specific DSC properties defined in the present invention, and thus are remarkably excellent in heat resistance.

Further, out of the polypropylene fibers of the present invention, the polypropylene fibers (polypropylene fiber B, polypropylene fiber C) of the present invention each having the above-mentioned specific irregularities defined in the present invention on its fiber surface each have a water retention rate as high as 10% or more and an excellent anchor effect by virtue of the irregular structure.

Therefore, each of the polypropylene fibers of the present invention each having the above-mentioned outstanding properties is extremely effective as a reinforcement material for a hydraulic substance, and can be effectively used in various applications typified by a rope structure, sheet-shaped fiber structure, and composite material with an organic polymer.

The invention claimed is:

1. A polypropylene fiber comprising polypropylene having an isotactic pentad fraction (IPF) of 94% or more, wherein:
   the polypropylene fiber has a fiber strength of 7 cN/dtex or more; and
   an endothermic peak shape of the polypropylene fiber by differential scanning calorimetry (DSC) is a single shape having a half width of 10° C. or lower, and a melt enthalpy change (ΔH) of the polypropylene fiber by the DSC is 125 J/g or more.

2. A polypropylene fiber comprising polypropylene having an isotactic pentad fraction (IPF) of 94% or more, wherein:
   the polypropylene fiber has a fiber strength of 7 cN/dtex or more;
   the polypropylene fiber has a single fiber fineness of 0.1 to 3 dtex; and
   the polypropylene fiber has, on its surface, irregularities having an average interval of 6.5 to 20 μm and an average height of 0.35 to 1 μm as a result of alternate presence of a protruded portion having a large diameter and a non-protruded portion having a small diameter along its fiber axis.

3. A polypropylene fiber comprising polypropylene having an isotactic pentad fraction (IPF) of 94% or more, wherein:
   the polypropylene fiber has a fiber strength of 7 cN/dtex or more;
   the polypropylene fiber has a single fiber fineness of 0.1 to 3 dtex;
   an endothermic peak shape of the polypropylene fiber by differential scanning calorimetry (DSC) is a single shape having a half width of 10° C. or lower, and a melt enthalpy change (ΔH) of the polypropylene fiber by the DSC is 125 J/g or more; and
   the polypropylene fiber has, on its surface, irregularities having an average interval of 6.5 to 20 μm and an average height of 0.35 to 1 μm as a result of alternate presence of a protruded portion having a large diameter and a non-protruded portion having a small diameter along its fiber axis.

4. The polypropylene fiber according to claim 2, wherein the polypropylene fiber has a water retention rate of 10 mass % or more.

5. The polypropylene fiber according to claim 3, wherein the polypropylene fiber has a water retention rate of 10 mass % or more.

6. A method of producing the polypropylene fiber claim 1, comprising:
   subjecting polypropylene having an isotactic pentad fraction (IPF) of 94% or more to melt spinning;
   cooling the resultant to solidify so that a polypropylene undrawn fiber is produced;
   subjecting the polypropylene undrawn fiber to pre-drawing at a temperature of 120 to 150° C. and a drawing magnification of 3 to 10 times to produce a resultant fiber; and
   subjecting the resultant to post-drawing at a drawing magnification of 1.2 to 3.0 times under conditions of a temperature of 170 to 190° C., a deformation rate of 1.5 to 15 times/min., and a draw tension of 1.0 to 2.5 cN/dtex.

7. The production method according to claim 6, wherein a total drawing magnification of the pre-drawing and the post-drawing is 3.9 to 20 times.

8. The production method according to claim 6, wherein a product (A×B) of a melt spinning rate A (m/min.) at a time of the production of the polypropylene undrawn fiber and a total drawing magnification B (times) of the pre-drawing and the post-drawing is 3,000 to 17,000 (m·times/min.).

9. A hydraulic composition comprising the polypropylene fiber according to claim 1.

10. A hydraulic product comprising the hydraulic composition according to claim 9.

11. The hydraulic product according to claim 10, wherein the hydraulic product comprises a molded product.

12. A rope structure comprising the polypropylene fiber according to claim 1.

13. A sheet-shaped fiber structure comprising the polypropylene fiber according to claim 1.

14. The sheet-shaped fiber structure according to claim 13, wherein the content of a polypropylene fiber having an isotactic pentad fraction (IPF) of 94% or more is 50 mass % or more.

15. The sheet-shaped fiber structure according to claim 13, wherein the sheet-shaped fiber structure has a water retention rate of 10 mass % or more.

16. The sheet-shaped fiber structure according to claim 14, wherein the sheet-shaped fiber structure has a water retention rate of 10 mass % or more.

17. A composite material comprising the polypropylene fiber according to claim 1 in a matrix composed of an organic polymer.

18. The composite material according to claim 17, wherein the polypropylene fiber in the matrix composed of the organic polymer is of a short fiber form, a long fiber form, a fiber bundle form, a yarn form, a woven and knitted fabric form, a nonwoven fabric form, or a net form.

19. A composite material according to claim 17, wherein the organic polymer comprises at least one kind of an organic polymer selected from a thermoplastic resin, a thermosetting resin, and an elastomeric polymer.

20. A molded product comprising the composite material according to claim 17.

21. A polypropylene fiber comprising polypropylene having an isotactic pentad fraction (IPF) of 95 -99%, wherein:
the polypropylene fiber has a fiber strength of 7 cN/dtex or more; and
an endothermic peak shape of the polypropylene fiber by differential scanning calorimetry (DSC) is a single shape having a half width of 10° C. or lower, and a melt enthalpy change ($\Delta H$) of the polypropylene fiber by the DSC is 125 J/g or more.

22. The polypropylene fiber according to claim 21, wherein the polypropylene fiber comprises polypropylene having an isotactic pentad fraction (IPF) of 96-99%.

23. The polypropylene fiber according to claim 1, wherein the polypropylene fiber has a fiber strength of 7-13 cN/dtex.

24. A polypropylene fiber comprising polypropylene having an isotactic pentad fraction (IPF) of 94% or more, wherein:
the polypropylene fiber has a fiber strength of 10-13 cN/dtex; and
an endothermic peak shape of the polypropylene fiber by differential scanning calorimetry (DSC) is a single shape having a half width of 10° C. or lower, and a melt enthalpy change ($\Delta H$) of the polypropylene fiber by the DSC is 125 J/g or more.

25. The polypropylene fiber according to claim 1, wherein a melt enthalpy change ($\Delta H$) of the polypropylene fiber by the DSC is 125 to 165 J/g.

26. The polypropylene fiber according to claim 25, wherein a melt enthalpy change ($\Delta H$) of the polypropylene fiber by the DSC is 140 to 165 J/g.

27. A polypropylene fiber comprising polypropylene having an isotactic pentad fraction (IPF) of 95-99%;
wherein:
the polypropylene fiber has a fiber strength of 7-13 cN/dtex; and
an endothermic peak shape of the polypropylene fiber by differential scanning calorimetry (DSC) is a single shape having a half width of of 10° C. or lower, and a melt enthalpy change ($\Delta H$) of the polypropylene fiber by the DSC is 125 to 165 J/g.

28. The polypropylene fiber according to claim 24, wherein
the polypropylene fiber comprises polypropylene having an isotactic pentad fraction (IPF) of 96-99%; and
a melt enthalpy change ($\Delta H$) of the polypropylene fiber by the DSC is 140 to 165 J/g.

29. The polypropylene fiber of claim 1, which comprises the polypropylene having an isotactic pentad fraction (IPF) of 95.5% or more.

30. The polypropylene fiber of claim 1, which comprises the polypropylene having an isotactic pentad fraction (IPF) of 96 to 99%.

31. The polypropylene fiber of claim 2, which comprises the polypropylene having an isotactic pentad fraction (IPF) of 95.5% or more.

32. The polypropylene fiber of claim 2, which comprises the polypropylene having an isotactic pentad fraction (IPF) of 96 to 99%.

33. The polypropylene fiber of claim 3, which comprises the polypropylene having an isotactic pentad fraction (IPF) of 95.5% or more.

34. The polypropylene fiber of claim 3, which comprises the polypropylene having an isotactic pentad fraction (IPF) of 96 to 99%.

35. The polypropylene fiber of claim 20, which comprises the polypropylene having an isotactic pentad fraction (IPF) of 95.5% or more.

36. The polypropylene fiber of claim 20, which comprises the polypropylene having an isotactic pentad fraction (IPF) of 96 to 99%.

37. The polypropylene fiber of claim 23, which comprises the polypropylene having an isotactic pentad fraction (IPF) of 95.5% or more.

38. The polypropylene fiber of claim 23, which comprises the polypropylene having an isotactic pentad fraction (IPF) of 96 to 99%.

39. The polypropylene fiber of claim 27, which comprises the polypropylene having an isotactic pentad fraction (IPF) of 95.5% or more.

40. The polypropylene fiber of claim 27, which comprises the polypropylene having an isotactic pentad fraction (IPF) of 96 to 99%.

* * * * *

UNITED STATES PATENT AND TRADEMARK OFFICE
CERTIFICATE OF CORRECTION

PATENT NO. : 8,647,741 B2
APPLICATION NO. : 12/532898
DATED : February 11, 2014
INVENTOR(S) : Katayama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this
Twenty-ninth Day of September, 2015

Michelle K. Lee
*Director of the United States Patent and Trademark Office*